(12) United States Patent
Harada et al.

(10) Patent No.: US 10,471,758 B2
(45) Date of Patent: Nov. 12, 2019

(54) OPTICAL INFORMATION MEDIUM

(71) Applicant: TOPPAN PRINTING CO., LTD., Taito-ku, Tokyo (JP)

(72) Inventors: Satoshi Harada, Tokyo (JP); Kazuhiro Yashiki, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 5 days.

(21) Appl. No.: 15/547,454

(22) PCT Filed: Feb. 2, 2016

(86) PCT No.: PCT/JP2016/000534
§ 371 (c)(1),
(2) Date: Jul. 28, 2017

(87) PCT Pub. No.: WO2016/125488
PCT Pub. Date: Aug. 11, 2016

(65) Prior Publication Data
US 2018/0001691 A1 Jan. 4, 2018

(30) Foreign Application Priority Data

Feb. 3, 2015 (JP) ................................ 2015-019388
May 12, 2015 (JP) ................................ 2015-097409

(51) Int. Cl.
*B42D 25/328* (2014.01)
*G03H 1/00* (2006.01)
(Continued)

(52) U.S. Cl.
CPC .......... *B42D 25/328* (2014.10); *B42D 25/29* (2014.10); *B42D 25/324* (2014.10);
(Continued)

(58) Field of Classification Search
CPC .. B42D 25/328; B42D 25/355; B42D 25/324; B42D 25/29; B42D 25/465; G02B 5/286;
(Continued)

(56) References Cited

U.S. PATENT DOCUMENTS

| 5,663,233 A | 9/1997 | Bederke et al. |
| 2009/0317595 A1 | 12/2009 | Brehm et al. |
| 2012/0229368 A1* | 9/2012 | Watanabe ................ G07D 7/12 345/32 |

FOREIGN PATENT DOCUMENTS

| EP | 0688840 A | 12/1995 |
| JP | S6198751 A | 5/1986 |

(Continued)

OTHER PUBLICATIONS

Form PCT/IB/338 Notification of Transmittal of Translation of International Preliminary Report on Patentability for PCT/JP2016/000534 dated Aug. 17, 2017, 7 pages.

(Continued)

*Primary Examiner* — Justin V Lewis
(74) *Attorney, Agent, or Firm* — Squire Patton Boggs (US) LLP

(57) ABSTRACT

The object of the present invention is to provide an optical information medium having a colored glossy effect which is single- or multi-colored in regions where a reflective layer is present, but colorless in regions where the reflective layer is absent. The optical information medium of the present invention includes a bonding part (receiving layer), at least one image part, and an adhesive layer (protective layer) covering the at least one image part, wherein each of the image part includes a micro-protrusion/depression structure including part having a micro-protrusion/depression structure on at least a part of the surface opposite to the bonding part, a reflective layer, and a mask layer, in the order from the bonding part (receiving layer), the micro-protrusion/

(Continued)

depression structure including part is colorless or colored in one or more translucent or opaque color, and at least one of the micro-protrusion/depression structure including part of the image part is colored in one or more translucent or opaque color.

20 Claims, 37 Drawing Sheets

(51) Int. Cl.
  *G03H 1/02* (2006.01)
  *B42D 25/355* (2014.01)
  *B42D 25/324* (2014.01)
  *D21H 21/42* (2006.01)
  *G02B 5/18* (2006.01)
  *G09F 3/02* (2006.01)
  *B42D 25/29* (2014.01)
  *B42D 25/465* (2014.01)
  *G02B 5/20* (2006.01)
  *G02B 5/28* (2006.01)
  *G07D 7/00* (2016.01)

(52) U.S. Cl.
  CPC ......... *B42D 25/355* (2014.10); *B42D 25/465* (2014.10); *D21H 21/42* (2013.01); *G02B 5/18* (2013.01); *G02B 5/1814* (2013.01); *G02B 5/1828* (2013.01); *G02B 5/203* (2013.01); *G02B 5/286* (2013.01); *G03H 1/0011* (2013.01); *G03H 1/02* (2013.01); *G03H 1/0244* (2013.01); *G09F 3/02* (2013.01); *G02B 5/1861* (2013.01); *G07D 7/003* (2017.05)

(58) Field of Classification Search
  CPC .... G02B 5/203; G02B 5/1828; G02B 5/1814; G02B 5/18; G02B 5/1861; D21H 21/42; G09F 3/02; G03H 1/02; G07D 7/003
  USPC .................. 283/72, 94, 98, 109, 901
  See application file for complete search history.

(56) References Cited

FOREIGN PATENT DOCUMENTS

| | | |
|---|---|---|
| JP | S6323909 A | 2/1988 |
| JP | S6323910 A | 2/1988 |
| JP | 2524092 | 1/1997 |
| JP | 2001-001692 A | 1/2001 |
| JP | 2007118563 A | 5/2007 |
| JP | 408884 | 5/2008 |
| JP | 4194073 B | 12/2008 |
| JP | 2014-164059 A | 9/2014 |
| WO | WO 1993/17060 | 9/1993 |
| WO | WO 1996/20968 | 7/1996 |
| WO | WO 1996/40813 | 12/1996 |
| WO | WO 1997/31073 | 8/1997 |
| WO | WO 1998/53013 | 11/1998 |
| WO | WO 2004/031256 A1 | 4/2004 |
| WO | WO 2005/035613 A1 | 4/2005 |
| WO | WO 2014/118568 A1 | 8/2014 |

OTHER PUBLICATIONS

Form PCT/ISA/210 International Search Report for PCT/JP2016/000534 dated Apr. 19, 2016, 2 pages.

Kohler, E.P., et al., "An apparatus for determining both the quantity of gas evolved and the amount of reagent consumed in reactions with methyl magnesium iodide," J. Am. Chem. Soc., vol. 49, pp. 3181-3188 (Dec. 10, 1927).

Extended European Search Report dated Feb. 6, 2018, in European Patent Application No. 16746320.7, 7 pages.

Official Notice of Rejection dated Aug. 29, 2017, in Japanese Patent Application No. 2013-267803, 4 pages.

* cited by examiner

OPTICAL INFORMATION MEDIUM

CROSS-REFERENCE TO RELATED APPLICATIONS

This application is a 35 U.S.C. § 371 national stage entry of International Patent Application PCT/JP2016/000534, filed on Feb. 2, 2016 (published as WO 2016/125488 A1 on Nov. 8, 2016), which claims priority to Japanese patent application no. 2015-019388, filed on Mar. 2, 2015, and Japanese patent application no. 2015-097409, filed on Dec. 5, 2015.

TECHNICAL FIELD

The present invention relates to an optical information medium having a micro-protrusion/depression structure. Further, the present invention relates to the optical information medium capable of utilizing adhesion to the surface of the substrate of paper or plastic resin, or embedding inside the paper substrate.

BACKGROUND ART

Previously, typical methods for continuously producing a large amount of optical information media having a micro-protrusion/depression structure have included a "pressing method" described in Japanese Patent No. 4190473 (PTL1), a "casting method" described in Japanese Utility Model Registration Laid-Open No. 2524092 (PTL2), a "photopolymer method" described in Japanese Patent No. 4088884 (PTL3), and the like.

In the case where the micro-protrusion/depression structure is produced by the "pressing method", the micro-protrusion/depression structure is shape transferred by heating a resin layer which has been formed as a continuous layer to the softening point or higher and pressing a relief mold (a mold for reproduction of the micro-protrusion/depression structure) against the face of the resin layer where the micro-protrusion/depression structure will be formed. Alternatively, the micro-protrusion/depression structure may be shape transferred by pressing to a resin layer a relief mold which has been heated to the softening point of the resin layer or higher. In either method, a technique of shape transfer is utilized, which involves pressing the relief mold to the resin layer which has been previously formed by whole surface coating or the like. Further, addition of colorants such as dye or pigment allows to color the gloss obtainable after providing a metal reflective layer. However, the pressing method is predicated on the presence of the colored resin layer throughout the whole surface of pressing processing In the "casting method", the shape of the micro-protrusion/depression structure is transferred by melt extruding a resin for forming the micro-protrusion/depression structure which is heated to its melting point or higher onto a relief mold (a mold for reproduction of the micro-protrusion/depression structure), or by casting a solution or dispersion of the resin onto the relief mold. The micro-protrusion/depression structure is obtained by cooling the resin to decrease its flowability to form a continuous layer, and peel it off from the relief mold. Also in this case, coloration is possible by adding a colorant such as dye or pigment to the resin layer. However, similar to the "pressing method", the colored resin layer exists as a continuous layer.

The "photopolymer method" (a 2P method, or a photosensitive resin method) comprises the steps of casting a radiation-curing resin composition between a "relief mold (a mold for reproduction of the micro-protrusion/depression structure)" and a flat substrate (such as a plastic film), curing the resin composition by the radiation to form a continuous layer, and peeling off the cured resin layer as well as the substrate from the relief mold. The micro-protrusion/depression structure of high definition can be obtained by utilizing the "photopolymer method". The optical information medium obtained by the "photopolymer method" has a superior precision in formation of the protrusion/depression structure, high thermal resistance, and high chemical resistance, compared with those obtained by the "pressing method" and "casting method" in which the thermoplastic resin is used. Further, heating is unnecessary during processing, since the radiation-curing resin composition in a liquid form is used.

However, the following problem is present in any of the molding methods of "pressing method", "casting method", and "photopolymer method". In any of the molding methods, the resultant resin layer is obtained as a continuous and unitary layer. For example, it is difficult to continuously duplicate a large amount of the micro-protrusion/depression structures disposed only in desired regions of a resin layer which are not unitary but consist of multiple parts. Also, it is difficult to duplicate continuously a large amount of the micro-protrusion/depression structures disposed only in desired regions of a resin layer which is partially colored. In regard to this point, it might be conceivable to form the micro-protrusion/depression structure by disposing a colored resin layer consisting of multiple parts onto a supporting substrate and adjusting the position where the relief mold is pressed on, in the "pressing method". However, in the case where a resin layer consisting of multiple parts is present, the productivity is reduced in view of register. This is because heat-shrinkage of the supporting substrate becomes uneven.

One of optical information media is an optically variable device (OVD) as, which can be used as media for the purpose of decoration or anti-counterfeiting. Diffraction gratings and scattering structures are mainly used as the micro-protrusion/depression structure in the OVD. Generally, any of the "pressing method", "casting method" and "photopolymer method" are used for forming such micro-protrusion/depression structure. The OVD which has undergone a vapor deposition step for disposing a reflecting layer on the micro-protrusion/depression structure and a coating step for disposing an adhesion layer may be in a form of a transfer leaf, an adhesion label, a thread, or the like.

A unique metallically glossy color can be provided on this OVD by coloring the resin layer constituting the micro-protrusion/depression structure by colorants such as a dye or a pigment. For example, the OVD has a silver metallic gloss when a colorless resin layer is used and a reflective layer is made of aluminum. On the other hand, even in the case where the reflective layer is made of aluminum, the OVD exhibits gold color when the resin layer has been colored in orange (or yellow), or the OVD exhibits copper color when the resin layer has been colored in reddish-brown.

In order to provide higher resistance to counterfeiting, higher design properties and higher chemical resistance, it is possible to subject the OVD to a demetallization treatment. Demetallization treatment generally means a method comprising the steps of: providing a mask layer having a desired pattern onto a reflective layer made of metal, etching and partially remove the metal with an acid or an alkali to obtain the reflective layer having the desired pattern. For example, demetallization-treated holograms are often provided to securities such as bank notes.

However, the following problem exists in the case where the OVD is produced with the demetallization treatment. If the resin layer constituting the micro-protrusion/depression structure is colored in a certain color, the part of the resin layer where the metal is removed by the demetallization treatment is not colorless under visual observation but exhibits the certain color. For example, the demetallized part which is desired to be colorless exhibits orange color, when an OVD exhibiting gold metallically glossy color is produced with the demetallization treatment. Therefore, gold gloss of the non-demetallized part cannot be emphasized to the general public who is a judge of genuineness, since the reflective layer does not appear to be made of gold metal. Further, it is also problematic that the same appearance can be achieved by forming an orange coating onto the whole surface of the counterfeited hologram.

It might be conceivable to make the reflective layer from metal having non-silver gloss, against the above problem. For example, if the micro-protrusion/depression structure is formed with a colorless resin layer, and copper is vapor deposited thereon instead of aluminum, and demetallization treatment is carried out to obtain an OVD, the region where the copper is removed becomes colorless, since copper itself has copper-colored gloss.

However, this production method suffers from the following problems. In appearance, the chemical resistance of copper, including resistance to human sweat, is inferior to that of aluminum whose oxide is white, since oxides of copper are colored. Therefore, copper is not a practical material in the actual distribution. Further, in a method for providing the reflective layer by vapor deposition of copper, only copper-colored reflective layer can be made, unless one or more steps of vapor deposition of metal of other color, one or more masking steps, and/or one or more etching steps are added. For example, vapor deposition and demetallization treatment of gold for providing gold gloss is very expensive and exhibits low productivity compared to the case where the resin layer having the micro-protrusion/depression structure is colored.

In regard to these problems, it is possible to adopt a method of staining a part of a layer which has been formed on the substrate before the resin layer having the micro-protrusion/depression structure. For example, a colored part having a desired pattern can be provided on a surface of the resin layer having the micro-protrusion/depression structure, the surface being opposite to the reflective layer (that is, between a peel layer and the resin layer having the micro-protrusion/depression structure in the hologram transfer leaf). Thus, discontinuous and patterned glossy expression exhibiting a color other than silver is achieved by the colored part and the reflective layer. However, this method suffers from the following problem. It is necessary to form the colored part before formation of the resin layer having the micro-protrusion/depression structure in this method. Therefore, in any of the "pressing method", "casting method", and "photopolymer method", the productivity is reduced in view of register.

Against these problems, a self-alignment patterning is proposed, which is based on difference in transmittance of light of the metallic reflective layer caused by structural difference of the resin layer having the micro-protrusion/depression structure. For example, a moth-eye structure of sub-wavelength scale is introduced into a part of the micro-protrusion/depression structure, and aluminum is vapor deposited onto the micro-protrusion/depression structure.

Here, the layer of the vapor deposited aluminum has a relatively small thickness on the part of the moth-eye structure, since the part of the moth-eye structure has a large surface area compared to other part. Then, a positive-working photolithographic material is further coated onto the reflective layer, as a mask layer, and the mask layer is irradiated with a light for making the photolithographic material soluble, from the side of the micro-protrusion/depression structure-formed layer. In the part of the moth-eye structure, the positive-working photolithographic material becomes soluble, since the thickness of aluminum is small to transmit the light therethrough. In the other part, such as the part not having the moth-eye structure or a diffraction grating, the positive-working photolithographic material does not become soluble, since the light is not transmitted. The colored part can be provided in a self-alignment manner by washing off the solubilized photolithographic material. However, this method suffers from the following problem. In this production method, the colored part is not provided on the front side of the general optical information medium (that is, the side of the resin layer having the micro-protrusion/depression layer), rather it is provided on the back side (that is, on the side of the reflective layer opposite to the resin layer). Therefore, genuineness determination is possible by visual observation from the back side. It is impossible to stain the resin layer having the micro-protrusion/depression structure which is positioned on the front side.

As described above, it is impossible to continuously produce a large amount of demetallized optical information media for observing a reflective layer from the side of the micro-protrusion/depression structure-formed layer, wherein coloration is limited only in the region where the reflective layer is present, and the region where the reflective layer is absent (that is, demetallized part) is colorless, equal to or more than the extent of the conventional demetallized optical information medium having uniform color (including colorless)

CITATION LIST

Patent Literature

PTL1: Japanese Patent No. 4194073
PTL2: Japanese Utility Model Registration Laid-Open No. 2524092
PTL3: Japanese Patent No. 4088884
PTL4: International Publication No. WO 98/53013
PTL5: International Publication No. WO 96/20968
PTL6: European Patent Laid-Open No. 0688840
PTL7: International Publication No. WO 96/40813
PTL8: International Publication No. WO 93/17060
PTL9: International Publication No. WO 97/31073
PTL10: International Publication No. WO 2004/031256
PTL11: International Publication No. WO 2005/035613
PTL12: Japanese Patent Laid-Open No. S61-98751 (1986)
PTL13: Japanese Patent Laid-Open No. S63-23909 (1988)
PTL14: Japanese Patent Laid-Open No. S63-23910 (1988)
PTL15: Japanese Patent Laid-Open No. 2007-118563

Non-Patent Literature

NPL1: E. P. Kohler et al., J. Am. Chem. Soc., Vol. 49, pp. 3181-3188 (1927)

SUMMARY OF INVENTION

Technical Problem

One of the problems of the present invention is to provide an optical information medium exhibiting a colored glossy effect in which regions where a reflective layer exists are colored in one or more colors and regions where the reflective layer does not exist are colorless. Further, another problem of the preset invention is to provide an optical information medium exhibiting different colored glossy effect when observed from the front and back sides, in the regions where the reflective layer exists. Also, another problem of the present invention is to provide an optical information medium exhibiting two or more colored glossy effects and having superior design properties and superior counterfeit resistance, wherein the medium has a plurality of separated regions where a reflective layer exists, each of the regions being colored in different one or more colors, and the regions where the reflective layer does not exist are colorless.

Solution to Problem

The optical information medium of the first embodiment of the present invention comprises, in this order: a bonding part (receiving layer); at least one image part; and an adhesive layer (protective layer) covering the at least one image part, wherein each of the image part comprises a micro-protrusion/depression structure including part which has a micro-protrusion/depression structure on at least a part of a surface opposite to the bonding part, a reflective layer, and a mask layer, in the order from the bonding part (receiving layer), the micro-protrusion/depression structure including part is colorless or colored in one or more translucent or opaque color, and at least one of the micro-protrusion/depression structure including part of the image part is colored in one or more translucent or opaque color. Here, the at least one image part may be a non-separated unitary image part or two or more image parts separated from each other. Further, in each of the image part, the micro-protrusion/depression structure including part may be colorless or colored in one color. Alternatively, the micro-protrusion/depression structure including part may be colored in two or more color, in at least one of the image parts. Alternatively, the micro-protrusion/depression structure including part may have a peripheral area colored in one color, and an internal area surrounded by the peripheral area and colored in one or more color different from the color of the peripheral area, in at least one of the image parts. Further, the micro-protrusion/depression structure including part in one of the image parts may be colored in color different from the colors of the micro-protrusion/depression structure including part in the other image part.

In the optical information medium of a variation of the first embodiment of the present invention, the mask layer may be colorless or colored in one or more colors, in each of the image parts. Here, the mask layer in one of the image parts may be colored in color different from the colors of the mask layer in the other image parts. Also, the mask layer may be colored in two or more color, in at least one of the image parts. Further, the mask layer may have a peripheral area colored in one color, and an internal area surrounded by the peripheral area and colored in one or more color different from the color of the peripheral area, in at least one of the image parts.

In the above-described optical information medium, the bonding part and the adhesive layer may be colorless. Alternatively, the adhesive layer may be colored in one or more translucent or opaque colors.

Further, in the above-described optical information medium, at least two of the image parts may have different area(size). Alternatively, the micro-protrusion/depression structure including part in one of the image parts may have the micro-protrusion/depression structure different from that of the micro-protrusion/depression structure including part in the other image parts.

A transfer leaf of the second embodiment of the present invention comprises: the optical information medium according to the first embodiment or variation thereof; and a carrier substrate which is in contact with the bonding part (receiving layer), wherein it is able to be peeled at an interface between the bonding part (receiving layer) and the carrier substrate.

A label of the third embodiment of the present invention comprises: the optical information medium according to the first embodiment or variation thereof; and a removable substrate (peel sheet) being in contact with the adhesive layer (protective layer), wherein the adhesive layer (protective layer) has tackiness, and it is able to be peeled at an interface between the adhesive layer (protective layer) and the removable substrate (peel sheet).

A papermaking thread of the fourth embodiment of the present invention comprises: the optical information medium according to the first embodiment or variation thereof; and a carrier substrate which is in contact with the bonding part (receiving layer); and a carrier-substrate-side adhesive layer (second adhesive layer) which is in contact with the carrier substrate.

A laminated body of the fifth embodiment of the present invention comprises a substrate and the optical information medium according to the first embodiment or variation thereof which is attached to the substrate.

A printed article of the sixth embodiment of the present invention comprises a substrate containing a printed part in which a printing ink is adhered, and the optical information medium according to the first embodiment or variation thereof which is attached to the substrate.

Advantageous Effects of Invention

By adopting the above-described construction, it becomes possible to provide an optical information medium having more superior design properties and higher counterfeit resistance, which has colorless regions and one or more image parts having non-silver glossy expression such as gold or copper color. This optical information medium is difficult to be formed by the conventional "pressing method", "casting method" or "photopolymer method". Further, there is no limitation for selection of the material of the reflective layer, and thereby it is possible to form the reflective layer from the material having physical strength and chemical resistance equal to or higher than those of aluminum. This is because the glossy expression is provided by coloration of the constituent layers other than the reflective layer. Further, the design properties and counterfeit resistance can be improved by disposing a plurality of colored parts in each of one or more image parts. In addition, different glossy expression under observation from the front and back sides can be obtained by coloring the micro-protrusion/depression structure including part and the mask layer in different color in each of one or more image parts, and thereby the design properties and counterfeit resistance can be further improved.

The optical information medium having the above-described construction can be used as a transfer leaf, a label, a papermaking thread, and the like. Further, it is possible to provide a laminated body and a printed article having superior design properties and high counterfeit resistance by introducing the optical information medium having the above-described construction into a substrate which may have a printed part. Therefore, the above-described optical information medium is useful in various industries.

DESCRIPTION OF EMBODIMENTS

Figure 1:
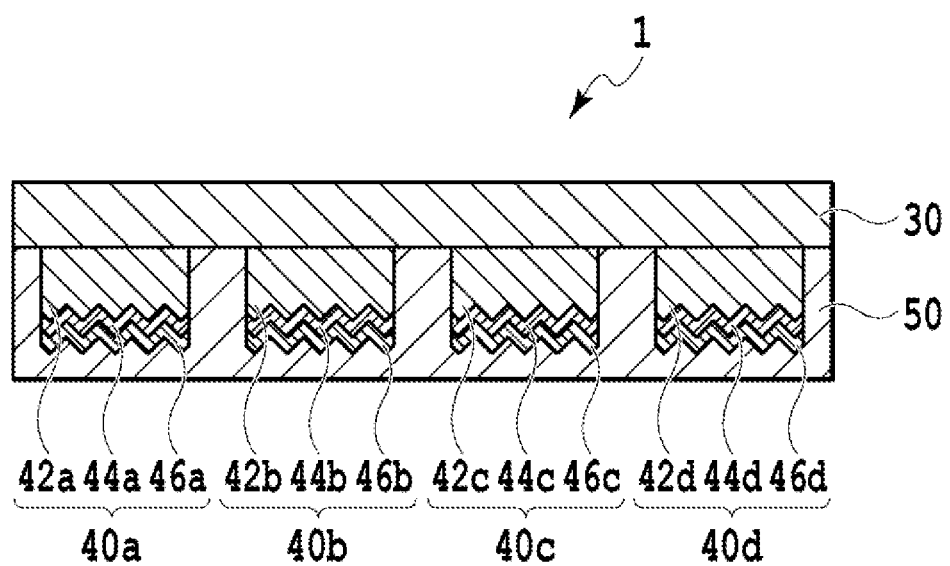
FIG. 1 is a schematic cross-sectional view showing an optical information medium according to the first embodiment of the present invention.

The optical information medium of the first embodiment of the present invention comprises, in this order: a bonding part (receiving layer); at least one image part; and an adhesive layer (protective layer) covering the at least one image part, wherein each of the image parts comprises a micro-protrusion/depression structure including part which has a micro-protrusion/depression structure on at least a part of a surface opposite to the bonding part, a reflective layer, and a mask layer, in the order from the bonding part (receiving layer), the micro-protrusion/depression structure including part is colorless or colored in one or more translucent or opaque color, and the micro-protrusion/depression structure including part of one of the image part is colored in different color from the color of the micro-protrusion/depression structure including part in the other image parts. In this embodiment, the at least one image part may be non-separated one image part, or two or more image parts separated from each other. FIG. 1 shows a schematic cross-sectional view of an optical information medium (1) comprising four image parts (40a-d) separated from each other. The optical information medium (1) comprises a bonding part (30), four image parts (40a-d) formed on the bonding part (30), and an adhesive layer (50) covering the four image parts (40), wherein each of the image parts (40a-d) comprises a micro-protrusion/depression structure including part (42a-d), a reflective layer (44a-d), and a mask layer (46a-d), in this order from the side of the bonding part (30). Besides, the number of the image parts is not limited to 4, but may be 1, 2, 3, or 5 or more. Hereinafter, this embodiment will be explained with reference to the exemplary case where four image parts (40a-d) exist as shown in FIG. 1.

The bonding part (30) has a function to keep the four image part (40a-d) at the predetermined positions. The bonding part (30) desirably has a thickness in a range from 1 μm to 20 μm. The bonding part (30) is preferably colorless. The bonding part (30) has a transmittance of preferably from 10% to 90%, and more preferably from 50% to 95%, within a wavelength range from 400 nm to 700 nm.

The micro-protrusion/depression structure including part (42a-d) in this embodiment is not a layer formed continuously on the surface of the bonding part (30). Each of the micro-protrusion/depression structure including part (42a-d) in this embodiment are independent from each other in each of the image parts (40a-d), and disposed at a desired interval. Further, the micro-protrusion/depression structure including part (42a-d) is colorless, or colored in one or more translucent or opaque color. Variously designed expression can be afforded as compared to the case where the micro-protrusion/depression structure is formed on a unitary layer which has been formed uniformly throughout the whole medium. This is because each of the micro-protrusion/depression structure including part (42a-d) can be separately colored in different color.

The micro-protrusion/depression structure including part (42a-d) comprises a micro-protrusion/depression structure selected from the group consisting of a relief hologram, a diffraction grating, a scattering structure, a directional structure, an interference structure, a blazed grating, a sub-wavelength grating, a micro lens, a polarization element, a Fresnel lens, a lenticular lens, a diffusion structure, and an anti-reflective structure, on the surface on the side of the reflective layer (44a-d). FIG. 1 exemplarily shows the case where the micro-protrusion/depression structure is formed on the whole surface of the micro-protrusion/depression structure including part (42a-d) on the side of the reflective layer (44a-d). However, the micro-protrusion/depression structure may be formed only on part of the surface of the micro-protrusion/depression structure including part (42a-d) on the side of the reflective layer (44a-d). Alternatively, plural types of the micro-protrusion/depression structure may be formed on the surface of one of the micro-protrusion/depression structure including part (42a-d), the surface being on the side of the reflective layer (44a-d). Further, the micro-protrusion/depression structure including part (42a) of one of the image parts (for example, 40a) may be different from the micro-protrusion/depression structure including parts (42b-d) of the other image parts (for example, 42b-d).

In this embodiment, the term "translucent" means a colored state where the incident light into and the reflected light from the reflective layer (44a-d) pass through to the extent that the optical effect caused by the micro-protrusion/depression structure is visible. Further, in this embodiment, the term "opaque" means a colored state where the incident light into and the reflected light from the reflective layer (44a-d) is blocked out to the extent that the optical effect caused by the micro-protrusion/depression structure is not visible. In this embodiment, in each of the four image parts (40a-d), the micro-protrusion/depression structure including part (42a-d) may be colorless, or may be colored in one color. Further, in at least one of the image parts (40a-d), the micro-protrusion/depression structure including part (42a-d) may be colored in two or more color. For example, in at least one of the image parts (40a-d), the micro-protrusion/depression structure including part (42a-d) may have a peripheral area colored in one color, and an internal area surrounded by the peripheral area and colored in one or more color different from the color of the peripheral area. In a preferable constitutional example, the micro-protrusion/depression structure including part (42a) of one of the image parts (for example, 40a) may be differently colored from the micro-protrusion/depression structure including parts (42b-d) of the other image parts (for example, 40b-d). In a more preferable constitutional example, the micro-protrusion/depression structure including part (42a-d) of each of the image parts (40a-d) may be differently colored from the micro-protrusion/depression structure including part (42a-d) of the other image parts (40a-d).

In this embodiment, two micro-protrusion/depression structure including parts (42) being "differently colored" means one of the following conditions: (i) one of the micro-protrusion/depression structure including part being colorless, and the other micro-protrusion/depression structure is colored in one or more color; (ii) if the two micro-protrusion/depression structures are colored in one color, the color of one of the micro-protrusion/depression structure is different from the color of the other micro-protrusion/depression structure; or (iii) if the two micro-protrusion/depression structures are colored in plural color, at least one color existing in one of the micro-protrusion/depression structures is not present in the other micro-protrusion/depression structure.

The micro-protrusion/depression structure including part (42a-d) may have a thickness in a range from 0.5 μm to 30 μm, preferably from 0.1 μm to 10 μm. Besides, in a view point of facilitating the formation of the micro-protrusion/depression structure including part (42a-d), the micro-protrusion/depression structure including part (42a-d) desirably has a thickness three to ten times as large as the maximum height of the micro-protrusion/depression structure existing its surface. Depending on the viscosity (flowability) of the resin in an uncured state which is used in the micro-protrusion/depression structure including part (42a-d), adoption of the thickness within the above-described range allows to prevent flash of the uncured resin and generation of wrinkles during formation, thereby obtaining the micro-protrusion/depression structure including part (42a-d) having a good shape.

The reflective layer (44a-d) is disposed on the micro-protrusion/depression structure including part (42a-d). The reflective layer does not exist in regions where the micro-protrusion/depression structure including part (42a-d) is not present. The surface of the reflective layer (44a-d) on the side of the micro-protrusion/depression structure including part (42a-d) has a protrusion/depression face caused by the micro-protrusion/depression structure of the micro-protrusion/depression structure including part (42a-d). The surface of the reflective layer (44a-d) on the side of the mask layer (46a-d) has a protrusion/depression face which the micro-protrusion/depression structure of the micro-protrusion/depression structure including part (42a-d) is inverted. In other words, the reflective layer (44a-d) provides an optical effect due to the micro-protrusion/depression structure of the micro-protrusion/depression structure including part (42a-d), on both sides. As a result, it becomes possible not only to provide glossy expression caused by combination of the reflective layer (44a-d) and the colors of the micro-protrusion/depression structure including part (42a-d) under observation from the front side, but also to provide colored glossy expression caused by combination of the reflective layer (44a-d) and the colors of the mask layer (46a-d) under observation from the back side. Besides, in regions of the micro-protrusion/depression structure including part (42a-d) where the micro-protrusion/depression structure is not formed, the reflective layer (44a-d) provides regularly reflected light on both front and back sides.

As described below, the reflective layer (44a-d) can be produced by forming a reflective material layer on the whole surface of the optical information medium as a continuous layer, forming a patterned mask layer (46a-d) at the positions corresponding to the micro-protrusion/depression structure including part (42a-d), selectively removing the exposed part of the reflective material layer by etching in which the mask layer (46a-d) is used as an etching mask. The reflective layer (44a-d) preferably has a thickness within a range from 10 nm to 300 nm. As described below, in the case where the reflective layer (44a-d) is formed by a printing method, it is preferable to adjust the thickness after drying within a range from 1 nm to 10 μm.

The reflective layer (44a-d) typically has the same top view shape as that of the micro-protrusion/depression structure including part (42a-d). The term "top view shape" means a shape under observation from the perpendicular direction to the surface of the bonding part (30). However, the reflective layer (44a-d) may be formed only on partial regions of the micro-protrusion/depression structure including part (42a-d). The reflective layer (44a-d) of this type can be formed by paster processing, water-washing sealite processing, laser processing, or the like. Alternatively, a sea-island reflective layer (44a-d) can be obtained by vapor depositing tin or the like to form a reflective material layer having a micro see-island structure, and etching in which the above-described mask layer (46a-d) is used as an etching mask. The term "see-island reflective layer" means a discontinuous layer consisting of plural parts of the reflective material which are separate from each other, or a layer of the reflective material having a plurality of through-holes. Providing the reflective layer (44a-d) only on partial regions of the micro-protrusion/depression structure including part (42a-d) allows to achieve more superior design properties, since it becomes possible to visually observe both of the glossy expression caused by the combination of the reflective layer (44a-d) and the micro-protrusion/depression structure including part (42a-d), and the chromatic expression only due to the color of the micro-protrusion/depression structure including part (42a-d) simultaneously, under observation from the front side.

The reflective layer (44a-d) may have a transmittance of not less than 20% in a range of wavelength of 400 nm to 700 nm. In this case, the effect of the optical element under transmission mode is available. Further, information disposed under the reflective layer becomes visible, for example, information of the printed part (130) on the receiving substrate (110) such as a portrait, characters, patterns, and the like as described below.

The mask layer (46a-d) is formed on the reflective layer (44a-d). The mask layer (46a-d) has the same top view shape as that of the micro-protrusion/depression structure including part (42a-d), including the case where the reflective layer (44a-d) is formed only on partial regions of the micro-protrusion/depression structure including part (42a-d). This is because the mask layer (46a-d) has a function as the etching mask during formation of the reflective layer (44a-d), as described above. The surface of the mask layer (46a-d) opposite to the reflective layer (44a-d) may be flat, or have protrusion/depression to which the micro-protrusion/depression structure of the reflective layer (44a-d) is reflected.

In the variation of this embodiment, the mask layer (46a-d) may be colorless, or colored in one color, in each of the four image parts (40a-d). Further, the mask layer (46a-d) may be colored in two or more color in at least one of the image parts (40a-d). For example, the mask layer (46a-d) may have a peripheral area colored in one color, and an internal area surrounded by the peripheral area and colored in one or more color different from the color of the peripheral area, in at least one of the image parts (40a-d). In a preferred constitutional example, the mask layer (46a) in one of the image parts (for example, 40a) may be differently colored from the mask layers (46b-d) in the other image parts (for example, 40b-d). In a more preferred constitutional example, the mask layer (46a-d) of each of the image parts (40a-d) is differently colored from the mask layers (46a-d) of the other image parts (40a-d). The definition of "differently colored" for the mask layer (46a-d) is similar to that for the micro-protrusion/depression structure including part (42a-d).

The adhesive layer (50) is formed so as to cover the four image parts (40a-d) consisting of the micro-protrusion/depression structure including part (42a-d), the reflective layer (44a-d) and the mask layer (46a-d). That is, the interstices of the four image parts (40*a*-*d*) are filled with the adhesive layer (50). The adhesive layer 50 desirably has a thickness of 1 μm to 20 μm over the top surface of the image parts (40*a*-*d*) (the surface of the mask layer (46*a*-*d*) opposite to the reflective layer (44*a*-*d*)). The adhesive layer (50) is useful for keeping the four image parts (40*a*-*d*) at the predetermined positions, and for isolating the constituting layers of the image parts (40*a*-*d*) from the external environment.

In this embodiment (including variation thereof), the adhesive layer (50) may be typically colorless. It is possible to make the regions other than the image parts (40*a*-*d*) (that is, background) colorless, by making the bonding part (30) and the adhesive layer (50) colorless. In this case, information disposed under the optical information medium (1) is visible in the regions other than the image parts (40*a*-*d*) of the optical information medium (1) of this embodiment, for example, information of the printed part (130) on the receiving substrate (110) such as a portrait, characters, patterns, and the like, as described below. Alternatively, the adhesive layer (50) may be colored, in a desired design. In this case, arbitrary chromatic expression can be provided in the regions other than the image parts (40*a*-*d*) (that is, background), under observation from the front side. The background color in this case can be selected independently from the color of the micro-protrusion/depression structure including part (42*a*-*d*), and therefore allows to provide more superior design properties to the optical information medium (1).

FIG. 1 shows the case where the four image parts (40*a*-*d*) have the same area in top view and the same micro-protrusion/depression structure. However, at least two of the four image parts (40*a*-*d*) may have different area in top view from each other. Alternatively, each of the four image parts (40*a*-*d*) may have different area in top view from each other. Further the micro-protrusion/depression structure of the micro-protrusion/depression structure including part (42*a*) of one of the image parts (for example, 40*a*) may have different shape from the micro-protrusion/depression structure of the micro-protrusion/depression structure including part (42*b*-*d*) of the other image parts (for example, 40*b*-*d*). Alternatively, each of the micro-protrusion/depression structure including part (42*a*) of the image parts (for example, 40*a*) may have differently shaped micro-protrusion/depression structure from each other. These modifications allow to improve flexibility and design properties of the information displayed by the optical information medium (1) of this embodiment.

Figure 2:
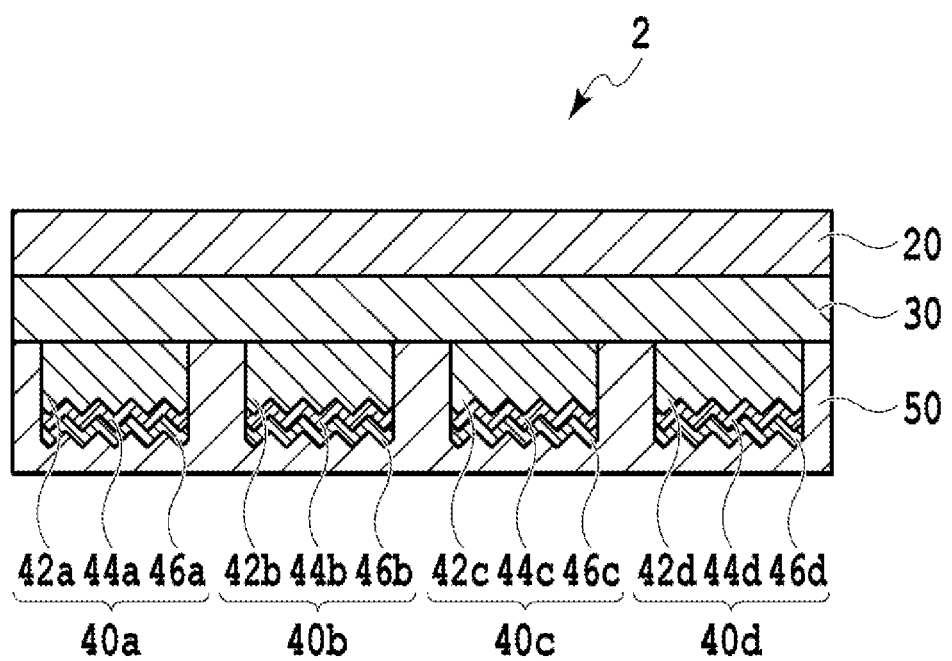
FIG. 2 is a schematic cross-sectional view showing a transfer leaf according to the second embodiment of the present invention.

The transfer leaf of the second embodiment of the present invention comprises: the optical information medium according to the first embodiment or variation thereof; and a carrier substrate which is in contact with the bonding part (receiving layer), wherein it is able to be peeled at an interface between the bonding part (receiving layer) and the carrier substrate. The bonding part (30), adhesive layer (50) and the micro-protrusion/depression structure including part (42*a*-*d*), the reflective layer (44*a*-*d*), and the mask layer (46*a*-*d*) which constitute the micro-protrusion/depression structure including part (42*a*-*d*) are similar to those in the first embodiment. FIG. 2 shows a schematic cross-sectional view of the transfer leaf (2) having four image parts (40*a*-*d*) separated from each other. The transfer leaf (2) comprises a carrier substrate (20), the bonding part (30), the four image parts (40*a*-*d*) formed on the bonding part (30), and the adhesive layer (50) covering the four image parts (40), wherein each of the four image parts (40*a*-*d*) comprises the micro-protrusion/depression structure including part (42*a*-*d*), the reflective layer (44*a*-*d*), and the mask layer (46*a*-*d*) in this order from the side of the bonding part (30).

The carrier substrate (20) acts as a support of the optical information medium (1) before transferring. Also, the carrier substrate (20) can act as a support during formation of the optical information medium (1). In this embodiment, the surface of the carrier substrate (20) on the side of the bonding part (30) may be treated for enhancing releasability on transferring. In the transfer leaf (2) of this embodiment, adhesion between the carrier substrate (20) and the bonding part (30) is set lower than both of adhesion between the bonding part (30) and the adhesive layer (50) and force required in cohesive failure of the bonding part (30) and the adhesive layer (50).

Figure 3:
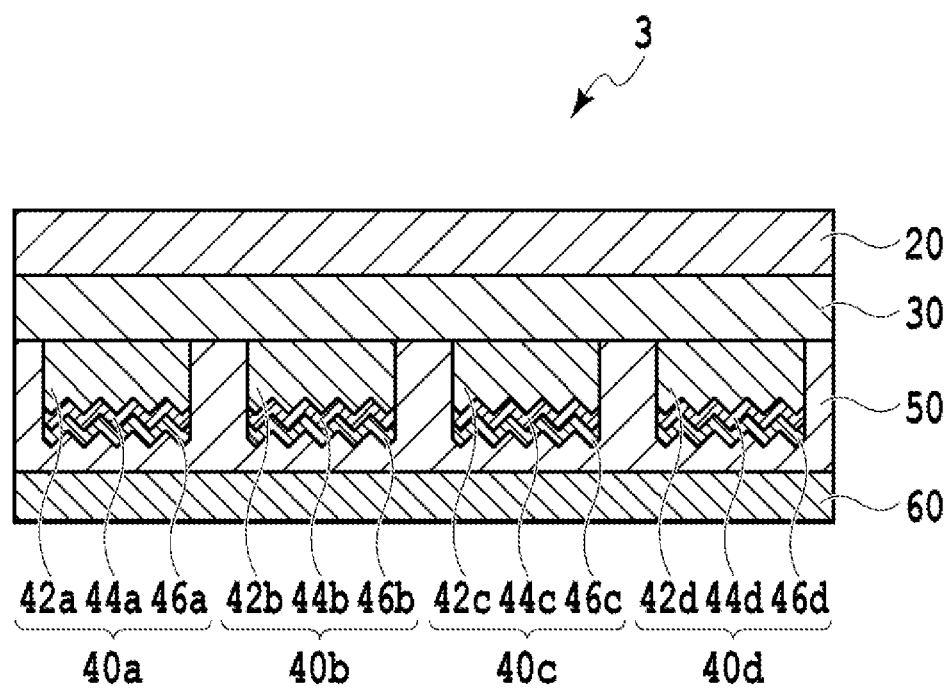
FIG. 3 is a schematic cross-sectional view showing a label according to the third embodiment of the present invention.

The label of the third embodiment of the present invention comprises: the optical information medium according to the first embodiment or variation thereof; and a removable substrate (peel sheet) being in contact with the adhesive layer (protective layer), wherein the adhesive layer (protective layer) has tackiness, and it is able to be peeled at an interface between the adhesive layer (protective layer) and the removable substrate (peel sheet). The bonding part (30), adhesive layer (50) and the micro-protrusion/depression structure including part (42*a*-*d*), the reflective layer (44*a*-*d*), and the mask layer (46*a*-*d*) which constitute the micro-protrusion/depression structure including part (42*a*-*d*) are similar to those in the first embodiment. FIG. 3 shows a schematic cross-sectional view of the label (3) having four image parts (40*a*-*d*) separated from each other. The label (3) comprises a carrier substrate (20), the bonding part (30), the four image parts (40*a*-*d*) formed on the bonding part (30), the adhesive layer (50) covering the four image parts (40), and the removable substrate (60) being in contact with the adhesive layer (50), wherein each of the four image parts (40*a*-*d*) comprises the micro-protrusion/depression structure including part (42*a*-*d*), the reflective layer (44*a*-*d*), and the mask layer (46*a*-*d*) in this order from the side of the bonding part (30). The label (3) can be used to adhere a label body (3') consisting of the optical information medium (1) and the carrier substrate (20) to a desired substrate by first peeling the removable substrate (60), and then bringing the adhesive layer (50) into contact with the desired substrate.

The carrier substrate (20) in this embodiment has similar function to that in the second embodiment. However, the treatment to enhance releasability is not applied to the surface of the carrier substrate (20) on the side of the bonding part (30). This is because the carrier substrate (20) is used as a protective layer for the underlying optical information medium (1). Further, in this embodiment, the carrier substrate (20) is desirably colorless and transparent, for allowing visual observation of the optical information medium (1) from the side of the carrier substrate (20).

The removable substrate (60) in this embodiment has a function to prevent adhesion of the label body (3') due to inadvertent contact before intended adhesion. The surface of the removable substrate (60) on the side of the adhesive layer (50) may be treated to enhance releasability from the adhesive layer (50). In this embodiment, adhesion between the removable substrate (60) and the adhesive layer (50) is set lower than any of: adhesion between the carrier substrate (20) and the bonding part (30); adhesion between the bonding part (30) and the adhesive layer (50); and force required in cohesive failure of the bonding part (30) and the adhesive layer (50).

Figure 4:
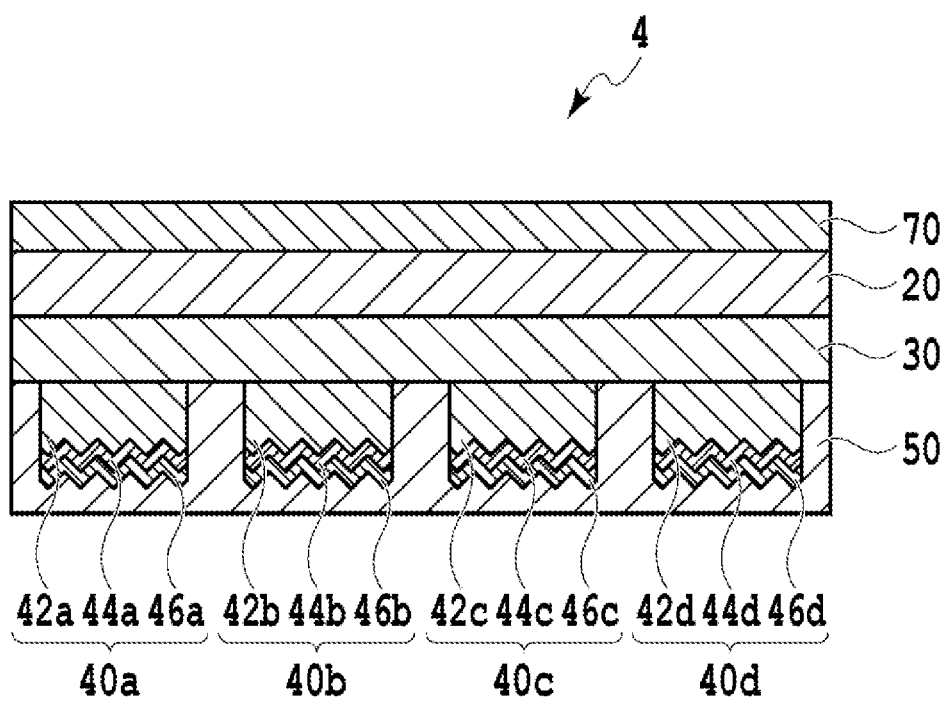
FIG. 4 is a schematic cross-sectional view showing a papermaking thread according to the fourth embodiment of the present invention.

A papermaking thread of the fourth embodiment of the present invention comprises: the optical information medium according to the first embodiment or variation thereof; and a carrier substrate which is in contact with the bonding part (receiving layer); and a carrier-substrate-side adhesive layer (second adhesive layer) which is in contact with the carrier substrate. The bonding part (30), adhesive layer (50) and the micro-protrusion/depression structure including part (42*a-d*), the reflective layer (44*a-d*), and the mask layer (46*a-d*) which constitute the micro-protrusion/depression structure including part (42*a-d*) are similar to those in the first embodiment. The carrier substrate (20) is similar to that in the third embodiment. FIG. 4 shows a schematic cross-sectional view of the papermaking thread (4) having four image parts (40*a-d*) separated from each other. The papermaking thread (4) comprises a carrier-substrate-side adhesive layer (70), a carrier substrate (20), the bonding part (30), the four image parts (40*a-d*) formed on the bonding part (30), the adhesive layer (50) covering the four image parts (40), and the removable substrate (60) being in contact with the adhesive layer (50), wherein each of the four image parts (40*a-d*) comprises the micro-protrusion/depression structure including part (42*a-d*), the reflective layer (44*a-d*), and the mask layer (46*a-d*) in this order from the side of the bonding part (30). When making a substrate, such as paper, from a fibrous material, the papermaking thread (4) can be embedded inside the substrate. Typically, the carrier-substrate-side adhesive layer (70) may be colorless.

Figure 5A:
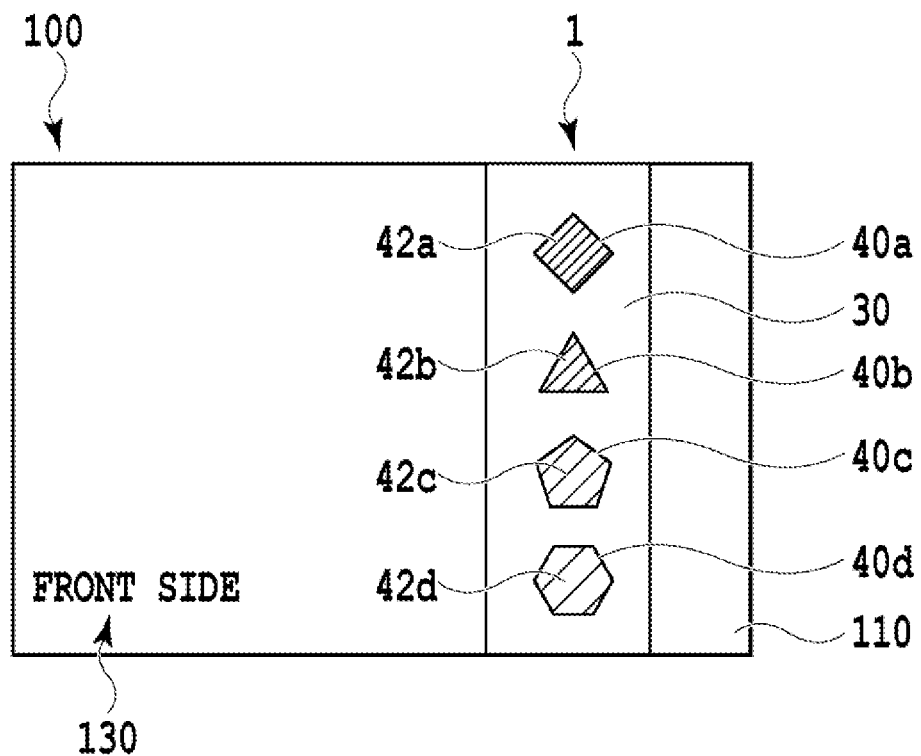
FIG. 5A is a schematic plan view showing the front side of one constitutional example of a printed article according to the sixth embodiment of the present invention which comprises an optical information medium transferred on a substrate.
Figure 5B:
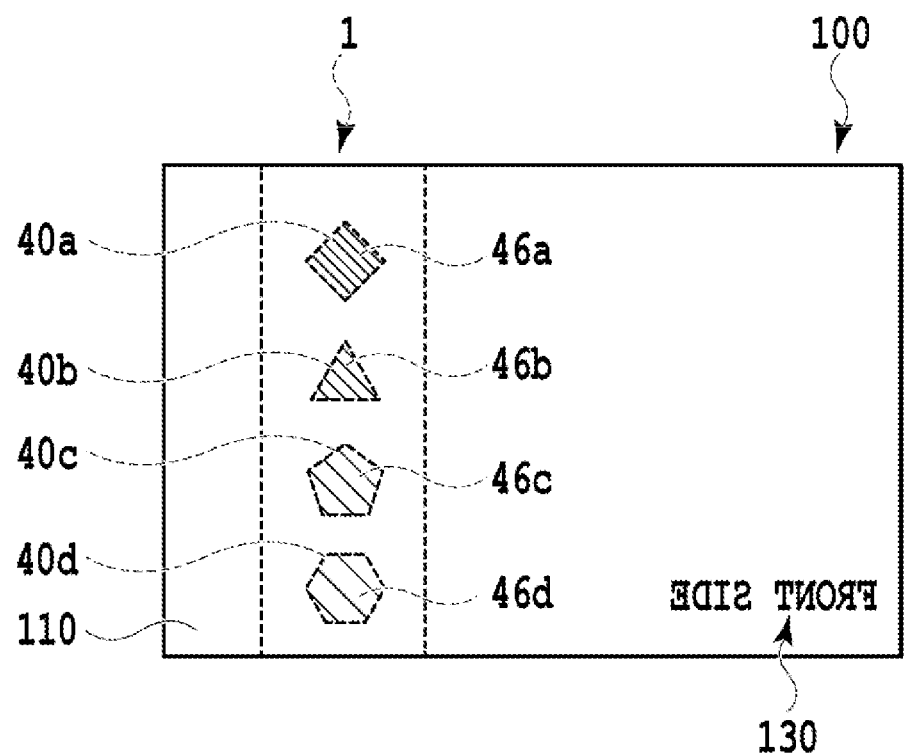
FIG. 5B is a schematic plan view showing the back side of one constitutional example of a printed article according to the sixth embodiment of the present invention which comprises an optical information medium transferred on a substrate.

The laminated body of the fifth embodiment of the present invention comprises a substrate and the optical information medium according to the first embodiment or variation thereof which is attached to the substrate. The printed article of the sixth embodiment of the present invention comprises a substrate containing a printed part in which a printing ink is adhered, and the optical information medium according to the first embodiment or variation thereof which is attached to the substrate. FIGS. 5A and 5B show one constitutional example of the printed article of the sixth embodiment. FIG. 5A is a schematic plan view showing the front side of the printed article, and FIG. 5B is a schematic plan view showing the back side of the printed article. The example shown in FIGS. 5A and 5B is a printed article comprising a receiving substrate (110) including a printed part (130) and an optical information medium (1) having a stripe shape and transferred onto the receiving substrate (110). Here, a constitution that the printed part (130) is omitted from the constitutional example shown in FIGS. 5A and 5B corresponds to the laminated body of the fifth embodiment. Further, the constitutional example shown in FIGS. 5A and 5B can be obtained by transferring the optical information medium (1) onto the receiving substrate (110) using the transfer leaf (2) of the second embodiment.

The "front" face (Front Side) and the "back" face (Reverse Side) in the optical information medium (1), the transfer leaf (2), the label (3), the papermaking thread (4), the laminated body and the printed article (100) are defined with positional relationship to the bonding part (30) and the adhesive layer (50). More specifically, the face near to the bonding part (30) side is "front" and the face near to the adhesive layer (50) side is "back".

FIGS. 5A and 5B show a constitutional example in which the receiving substrate (110) is transparent. Therefore, an image involving glossy expression caused by the reflective layer (44*a-d*) and the micro-protrusion/depression structure including part (42*a-d*) is visible in the four image parts (40*a-d*) of the optical information medium (1), under observation from the front side shown in FIG. 5A. On the other hand, an image involving glossy expression caused by the reflective layer (44*a-d*) and the mask layer (46*a-d*) is visible in the four image parts (40*a-d*) of the optical information medium (1), under observation from the back side shown in FIG. 5B.

Figure 6A:
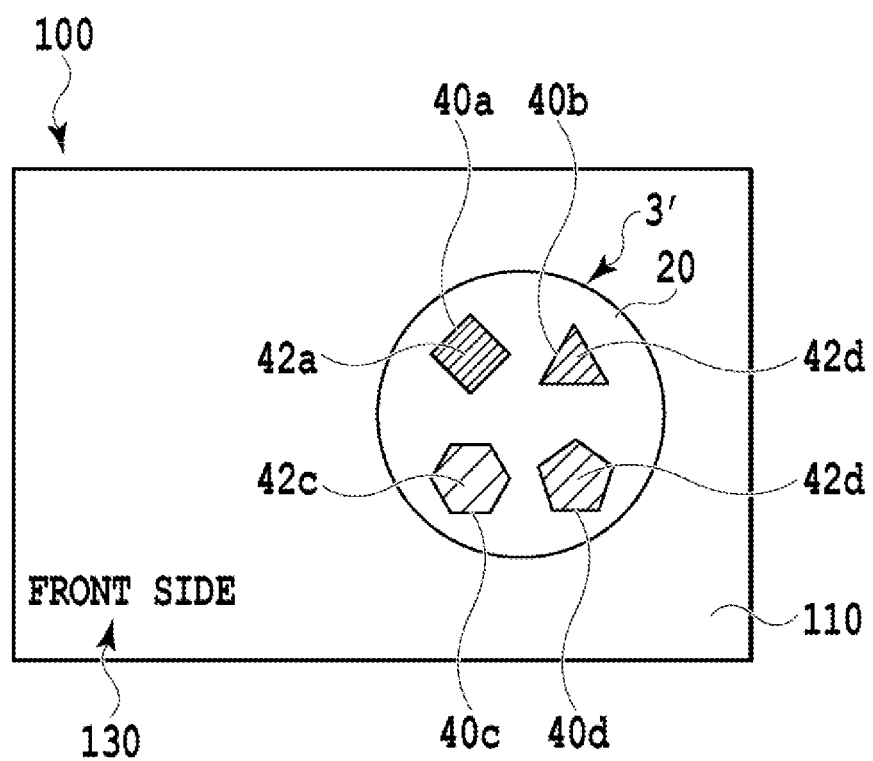
FIG. 6A is a schematic plan view showing the front side of the other constitutional example of a printed article according to the sixth embodiment of the present invention which comprises a label adhered on a substrate.
Figure 6B:
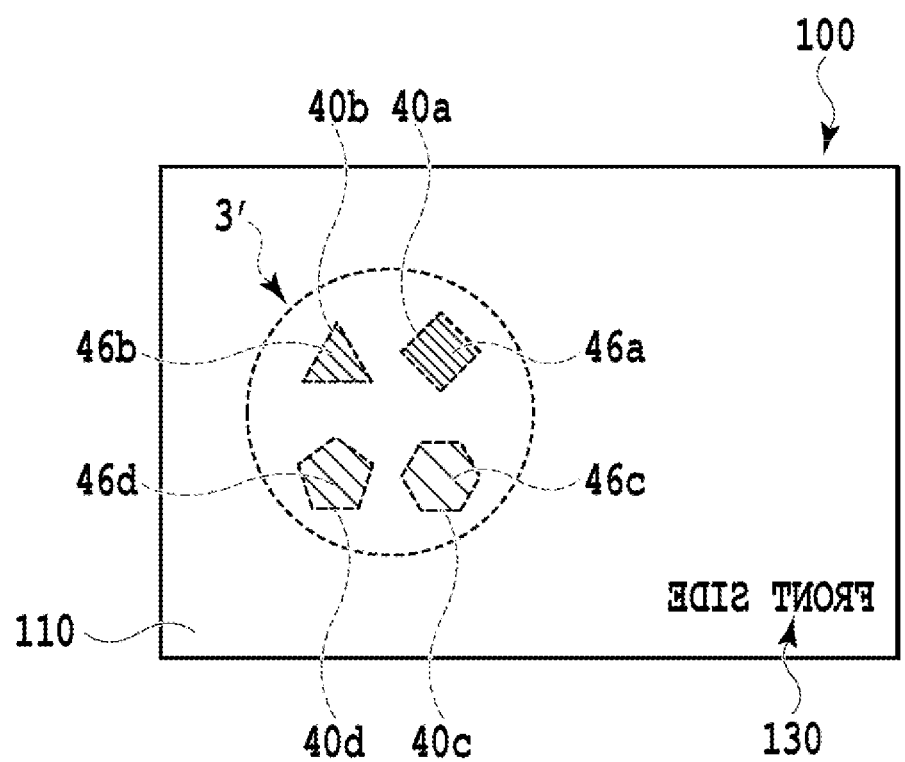
FIG. 6B is a schematic plan view showing the back side of the other constitutional example of a printed article according to the sixth embodiment of the present invention which comprises a label adhered on a substrate.

FIGS. 6A and 6B show another constitutional example of the printed article of the sixth embodiment. FIG. 6A is a schematic plan view showing the front side of the printed article, and FIG. 6B is a schematic plan view showing the back side of the printed article. The constitutional example shown in FIGS. 6A and 6B is the printed article (110) comprising a receiving substrate (110) including a printed part (130) and a label body (3') having a patch (island) shape and adhered onto the receiving substrate (110). The constitutional example shown in FIGS. 6A and 6B can be formed by peeling off the removable substrate (60) from the label (3) of the third embodiment, and adhering the label body (3') onto the receiving substrate (110).

FIGS. 6A and 6B show a constitutional example in which the receiving substrate (110) is transparent. Therefore, an image involving glossy expression caused by the reflective layer (44*a-d*) and the micro-protrusion/depression structure including part (42*a-d*) is visible in the four image parts (40*a-d*) of the label body (3'), under observation from the front side shown in FIG. 6A. On the other hand, an image involving glossy expression caused by the reflective layer (44*a-d*) and the mask layer (46*a-d*) is visible in the four image parts (40*a-d*) of the label body (3'), under observation from the back side shown in FIG. 6B.

Figure 7A:
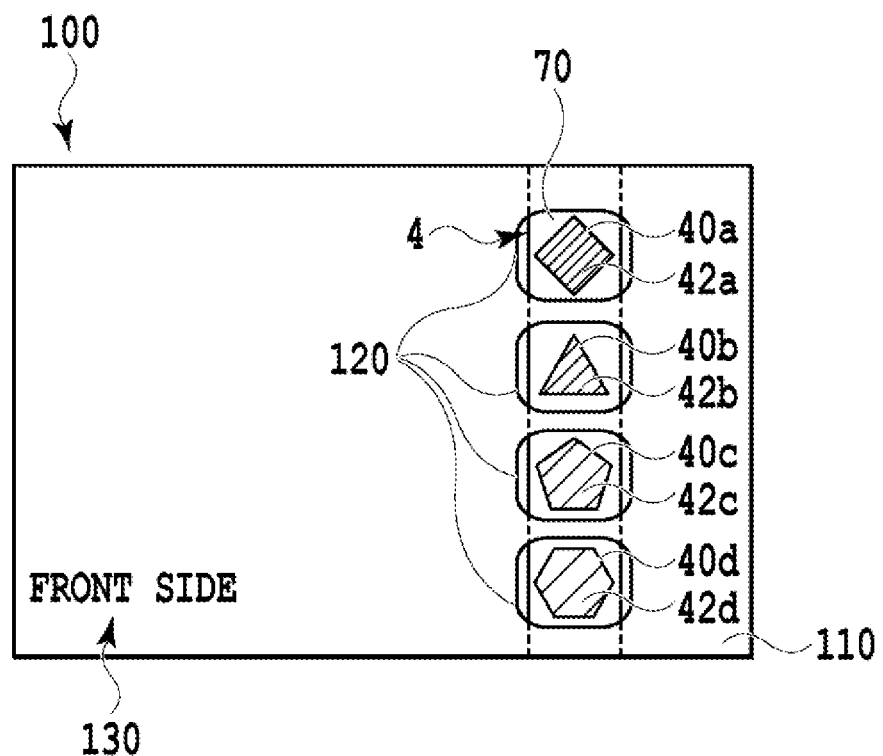
FIG. 7A is a schematic plan view showing the front side of the other constitutional example of a printed article according to the sixth embodiment of the present invention which comprises a papermaking thread embedded inside a substrate.
Figure 7B:
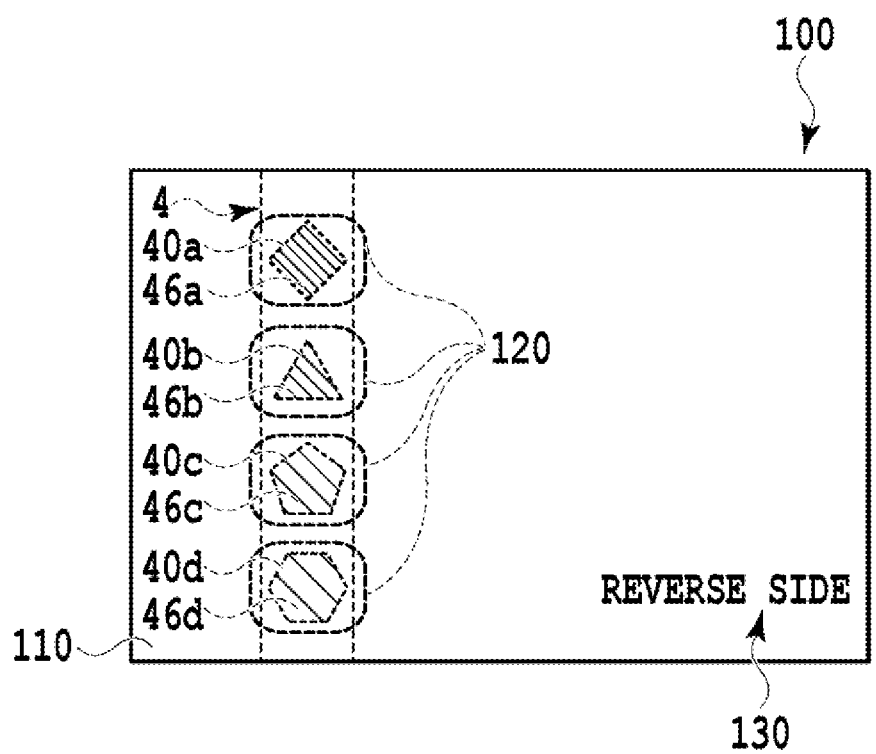
FIG. 7B is a schematic plan view showing the back side of the other constitutional example of a printed article according to the sixth embodiment of the present invention which comprises a papermaking thread embedded inside a substrate.

FIGS. 7A and 7B show another constitutional example of the printed article of the sixth embodiment. FIG. 7A is a schematic plan view showing the front side of the printed article, and FIG. 7B is a schematic plan view showing the back side of the printed article. The constitutional example shown in FIGS. 7A and 7B is the printed article (110) comprising a receiving substrate (110) including a printed part (130) and a papermaking thread (4) embedded inside the receiving substrate (110). Further, the papermaking thread (4) having four image parts (40*a-d*) is illustrated. The constitutional example shown in FIGS. 7A and 7B can be formed by forming the receiving substrate along with embedding the papermaking thread (4) inside, and applying printing ink onto the surface of the receiving substrate (110) to form the printed part (130).

FIGS. 7A and 7B show a constitutional example in which the receiving substrate (110) is opaque, and the papermaking thread (4) is exposed in four receiving substrate windows (120) provided on the front side face of the receiving substrate (110). Therefore, an image involving glossy expression caused by the reflective layer (44*a-d*) and the micro-protrusion/depression structure including part (42*a-d*) is visible in the four image parts (40*a-d*) of the papermaking thread (4), under observation from the front side shown in FIG. 7A. On the other hand, the papermaking thread (4) is not visible under observation from the back side shown in FIG. 7B, due to opacity of the receiving substrate (110).

In the fifth and sixth embodiments, the receiving substrate (110) may be transparent or opaque. In the case where the transparent receiving substrate (110) is used as shown in FIGS. 5A-6B, the image part (40*a-d*) is visible under observation from both front and back sides of the printed article (100). On the other hand, in the case where the opaque receiving substrate (110) is used, the image part (40*a-d*) is visible only under observation from front side of the printed article (100). Besides, in the case where the papermaking thread (4) of the fourth embodiment is used, the receiving substrate (110) is typically opaque. Therefore, the image parts (40*a-d*) are made visible by providing the receiving substrate window (120) at desired positions. Here, FIGS. 7A and 7B show a constitution that the receiving substrate window (120) is provided only on the front side of the receiving substrate (110) to make the image parts (40a-d) visible only from the front side. However, the image parts (40a-d) may be made visible from the back side, by further providing the receiving substrate window (120) on the back side of the receiving substrate (110). In this case, an image involving glossy expression caused by the reflective layer (44a-d) and the mask layer (46a-d) is visible from the back side. The shape and number of the receiving substrate window (120) can be changed as desired.

In addition, FIGS. 5A to 7B show examples in which the printed part (130) is provided at the position separate from the image parts (40a-d). However, the printed part (130) may be disposed at a position so that the printed part (130) is superposed on the image part (40a-d) or at a position so that the printed part (130) surrounds the image part (40a-d).

Further, FIGS. 5A to 7B show examples in which the image parts (40a-d) are registered and fixed to the receiving substrate (110). However, a design (image) having a repeated pattern such as a wall paper may be formed by providing a larger number of image parts.

Hereinafter, each of the constituent layers used in the above-described embodiments will be explained.

(Carrier Substrate (20))

The carrier substrate (20) is preferably a film made from thermoplastic resin. The thermoplastic resin desirably has heat resistance to the extent that no deformation and/or degradation occurs due to heat applied during formation of the optical information medium (1) and the like (especially, heat applied during curing and/or transferring of the respective constituent layers). Non-limiting examples of the useful thermoplastic resin include polyethylene terephthalate (PET) polyethylene naphthalate (PEN), polypropylene (PP), and the like.

The treatment to enhance releasability in the case of the transfer leaf (2) of the second embodiment comprises application of silicone resin or fluorine resin, for example.

(Bonding Part (30))

The bonding part (30) desirably has a function to receive the micro-protrusion/depression structure including part (42a-d) which is thermally transferred by the method described below. Further, the bonding part (30) has a function to keep the micro-protrusion/depression structure including parts (42a-d), which is not a continuous layer but is disposed separately, at the predetermined positions. In view of these points, the bonding part (30) is preferably formed from adhesive resin. Non-limiting examples of the adhesive resin include thermoplastic resin such as polyester resin, acrylic resin, vinyl chloride resin, vinyl resin, polyamide resin, vinyl acetate resin, rubber-type resin, ethylene-vinyl acetate copolymer resin, and vinyl chloride-vinyl acetate copolymer resin, for example.

In the transfer leaf (2) of the second embodiment, the interface between the bonding part (30) and the carrier substrate (20) is separated when the optical information medium (1) consisting of the bonding part (30), the image part (40) and the adhesive layer (50) is transferred onto the receiving substrate (110). In order to facilitate the separation at this interface, a treatment for enhancing releasability to the carrier substrate (20) may be conducted. In addition, the bonding part (30) may be formed from material to function as a releasing layer upon the above-described transferring. For example, after transfer of the micro-protrusion/depression structure including part (42a-d), it may be carried out to further cure the bonding part (30).

(Micro-Protrusion/Depression Structure Including Part (42a-d))

The micro-protrusion/depression structure including part (42a-d) can be formed from thermosetting resin, oxidative-polymerizable resin, reaction curing resin, ultraviolet curing resin, electron beam curing resin, thermoplastic resin, or the like. Non-limiting examples of the thermoplastic resin include acrylic resin, cellulosic resin, polyester resin, vinyl resin, rubber type resin, polyamide resin, thermoplastic polyimide resin, polycarbonate resin, liquid crystalline polymer, and the like.

The micro-protrusion/depression structure including part (42a-d) can be formed by a coating method. Especially, the micro-protrusion/depression structure including part (42a-d) can be obtained at a low cost when using wet coating. Further, a resin coating solution in which the resin is diluted with a solvent may be used in order to adjust the thickness of the obtained micro-protrusion/depression structure including part (42a-d).

Alternatively, the micro-protrusion/depression structure including part (42a-d) can be formed by the following method:

(1) a print-transfer method comprising the steps of
preparing an original plate wherein depressions corresponding to the inversed shape of a micro-protrusion/depression structure including part (42a-d) have been formed,
forming a bonding part (30) onto a carrier substrate (20) to form a laminated body,
applying a resin coating solution to the depressions of the original plate, and
transferring the resin coating solution applied in the depressions to the bonding part (30) of the laminated body to form the micro-protrusion/depression structure including part (42a-d); and (2) a two-stage transfer method comprising the steps of
preparing a mother plate wherein depressions corresponding to a micro-protrusion/depression structure including part (42a-d) have been formed,
forming a bonding part (30) onto a carrier substrate (20) to form a laminated body,
applying a resin coating solution to the depressions of the mother plate, and
transferring the resin coating solution applied in the depressions of the mother plate to a support to form an original plate having an inversed shape of the micro-protrusion/depression structure including part (42a-d),
applying a second resin coating solution to the depressions of the original plate, and
transferring the second resin coating solution applied in the depressions of the original plate to the bonding part (30) of the laminated body to form the micro-protrusion/depression structure including part (42a-d).

The print-transfer method (1) may further comprise the step of curing the resin coating solution applied to the depressions. The two-stage transfer method (2) may further comprise the step of curing the second resin coating solution applied to the depressions of the original plate. If the print-transfer method (1) and two-stage transfer method (2) involving the curing step are used, the micro-protrusion/depression structure including part (42a-d) is desirably formed from material selected from the group consisting of thermosetting resin, oxidative-polymerizable resin, reaction curing resin, ultraviolet curing resin, and electron beam curing resin. The preferred resin for using in the micro-protrusion/depression structure including part (42a-d) is the thermosetting resin. The especially preferred resin is urethane resin and epoxy resin which are capable of curing at the normal temperature.

The urethane resin is normally obtained by reaction between a "isocyanate-reactive compound" and polyisocyanate. The polyisocyanate means a compound having at least two isocyanate groups per molecule. The polyisocyanate comprises difunctional diisocyanate. Very wide variety of products can be made, by selection of the isocyanate-reactive compound and polyisocyanate.

The "isocyanate-reactive compound" comprises (a) any organic compounds having at least two isocyanate-reactive functionalities per molecule, or (b) imino-functional compounds. The "isocyanate-reactive functionality" means a functional group containing a Zerewitnoff active hydrogen. The presence of the Zerewitnoff active hydrogen can be determined by the method described in E. P. Kohler et al., J. Am. Chem. Soc., Vol. 49, pp. 3181-3188 (1927) (see NPL1). Non-limiting examples of the isocyanate-reactive functionality include —COOH, —OH, —NH$_2$, —NH—, CONH$_2$, —SH, and —CONH—. Non-limiting examples of the organic compound having at least two isocyanate-reactive functionalities per molecule include polyols, polyamines, polymercaptans, and polyacids. Suitable imino-functional compound is a compound having at least one terminal imino group per molecule. Preferably, the isocyanate-reactive compound is polyol, and more preferably polyether polyol.

The suitable polyol may be monomers having at least two hydroxyl groups, oligomers having at least two hydroxyl groups, polymers having at least two hydroxyl groups, and mixtures thereof. Non-limiting examples of the oligomers and monomers having at least two hydroxyl groups include castor oil, trimethylol propane, and diol. The polyol includes branched diol (for example, 2-n-butyl-2-ethyl-1,3-propanediol) described in International Publication No. WO 98/53013 (see PTL4).

Examples of polymers suitable as the polyol include polyester polyol, polyacrylate polyol, polycarbonate polyol, polyurethane polyol, melamine polyol, and mixtures and hybrids thereof. Such polymers are generally known by those skilled in the art and commercially available. Non-limiting examples of the suitable polyester polyol, polyacrylate polyol, and mixtures thereof are described in International Publication No. WO 96/20968 and European Patent Laid-Open No. 0688840, for example (see PTL5 and PTL6). Non-limiting examples of the suitable polyurethane polyol are described in International Publication No. WO 96/40813 (see PTL7).

Hydroxyl-functional epoxy resin, alkyds, and dendrimeric polyol described in International Publication No. WO 93/17060 may be used as the isocyanate-reactive compound (see PTL8). Alternatively, the isocyanate-reactive compound may include potentially hydroxyl-functional compounds. Non-limiting examples of the potentially hydroxyl-functional compounds include bicyclic orthoesters (see PTL9), spiro-orthoesters (see PTL9), spiro-orthosilicates (see PTL10), and bicyclic amideacetals (see PTL11).

The urethane resin composition for forming the micro-protrusion/depression structure including part (42a-d) may further comprise a metal-based catalyst for promoting addition reaction between the isocyanate group and the isocyanate-reactive group. Such catalyst is known to those skilled in the art. The catalyst may be present in an amount of generally from 0.001% to 10% by weight, preferably from 0.002% to 5% by weight, and more preferably from 0.01% to 1% by weight, based on the non-volatile components of the urethane resin composition. Suitable metal used in the catalyst includes zinc, cobalt, manganese, zirconium, bismuth, and tin. The urethane resin composition preferably comprises a tin-based catalyst. Commonly known examples of the tin-based catalyst include dimethyltin dilaurate, dimethyltin diversatate, dimethyltin dioleate, dibutyltin dilaurate, dioctyltin dilaurate, and tin octoate.

On the other hand, the term "epoxy resin" is a generic name for thermosetting resin capable of curing by formation of network based on reaction of the epoxy group retained in the polymer. Typically, the epoxy resin can be obtained by mixing a prepolymer before curing by polymerization and a curing agent, followed by thermal curing treatment.

The prepolymer may have various composition, but the most typical one is bisphenol A di(glycidyl ether) which is a reaction product of bisphenol A and two molecules of epichlorohydrin. The curing agent includes various polyamine and acid anhydride.

Non-limiting examples of alicyclic epoxy compounds used for formation of the prepolymer of the epoxy resin include 2-(3,4-epoxy)cylcohexyl-5,5-spiro-(3,4-epoxy)cyclohexane-m-dioxane, 3,4-epoxycyclohexyl-3',4'-epoxycyclohexane carboxylate (EECH), 3,4-epoxycyclohexylalkyl-3',4'-epoxycyclohexane carboxylate, 3,4-epoxy-6-methylcyclohexylmethyl, 3',4'-epoxy-6'-methylcyclohexane carboxylate, vinylcyclohexene dioxide, bis(3,4-epoxycyclohexylmethyl) adipate, bis(3,4-epoxy-6-methylcyclohexylmethyl) adipate, exo-exo bis(2,3-epoxycyclopentyl)ether, endo-exo bis(2,3-epoxycyclopentyl)ether, 2,2-bis(4-(2,3-epoxypropoxy)cyclohexyl)propane, 2,6-bis(2,3-epoxypropoxycyclohexyl-p-dioxane, 2,6-bis(2,3-epoxypropoxy) norbornene, diglycidyl ether of linoleic acid dimer, limonene dioxide, 2,2-bis(3,4-epoxycyclohexyl)propane, dicyclopentadiene dioxide, 1,2-epoxy-6-(2,3-epoxypropoxy)hexahydro-4,7-methanoindan, p-(2,3-epoxy)cyclopentylphenyl-2,3-epoxypropyl ether, 1-(2,3-epopxypropoxy)phenyl-5,6-epoxyhexahydro-4,7-methanoindan, o-(2,3-epoxy)cyclopentylphenyl-2,3-epoxypropyl ether, 1,2-bis[5-(1,2-epoxy)-4,7-hexahydromethanoindanoxyl] ethane, cyclopentenylphenyl glycidyl ether, cyclohexanediol diglycidyl ether, diglycidyl hexahydrophthalate, and mixtures thereof.

Non-limiting examples of aromatic epoxy resin include bisphenol A epoxy resin, bisphenol F epoxy resin, phenol novolac epoxy resin, cresol novolac epoxy resin, biphenol epoxy resin, biphenyl epoxy resin, 4,4'-biphenyl epoxy resin, divinylbenzene oxide resin, 2-glycidylphenyl glycidyl ether resin, and the like, and mixtures thereof.

Non-limiting examples of the curing agent used for curing the prepolymer of the epoxy resin include acid anhydrides such as maleic anhydride and copolymer of maleic anhydride, amine compounds such as dicyandiamide, and phenolic compounds such as phenol novolac and cresol novolac. Besides, the epoxy resin composition may further comprise a curing accelerator. Non-limiting examples of the curing accelerator include imidazoles and their derivatives, tertiary amines, and quaternary ammonium salts, and the like.

Radiation curing resin may be used for forming the micro-protrusion/depression structure including part (42a-d).

Non-limiting examples of the radiation curing resin include monomers having an ethylenically unsaturated bond, oligomers having an ethylenically unsaturated bond, and polymers having an ethylenically unsaturated bond. Non-limiting examples of the monomers having a radically polymerizable ethylenically unsaturated bond include 1,6-hexanediol di(meth)acrylate, neopentyl glycol diacrylate, trimethylolpropane triacrylate, pentaerythritol triacrylate, pentaerythritol tetraacrylate, dipentaerythritol pentaacrylate, and dipentaerythritol hexaacrylate. Non-limiting examples of radiation curing oligomers include epoxy acrylate oligomers, urethane acrylate oligomers, and polyester acrylate oligomers. Non-limiting examples of the radiation curing polymer include urethane-modified acrylic resin, and epoxy-modified acrylic resin.

Other examples of the radiation curing resin include photosetting resin described in Japanese Patent Laid-Open No. S61-98751 (1986), Japanese Patent Laid-Open No. S63-23909 (1988), Japanese Patent Laid-Open No. S63-23910 (1988), and Japanese Patent Laid-Open No. 2007-118563 (see PTL12 to PTL15). Non-reactive polymer may be added to the radiation curing resin composition for the purpose of precise formation of micro-relief pattern. Non-limiting examples of the non-reactive polymer include acrylic resin, polyester resin, urethane resin, and epoxy resin.

In the case of using cationic polymerization initialized by radiation such as light, monomers having an epoxy group, oligomers having an epoxy group, polymers having an epoxy group, or vinyl ether may be used.

A photopolymerization initiator can be added when curing the above-described radiation curing resin with light such as ultraviolet light. The polymerization initiator can be selected dependent on the resin, and may include a radical photopolymerization initiator, a cationic photopolymerization initiator, or combinations thereof (hybrid type).

Non-limiting example of the radical photopolymerization initiator include: benzoin-based compounds such as benzoin, benzoin methyl ether, and benzoin ethyl ether; anthraquinone-based compounds such as anthraquinone and methylanthraquinone; phenylketone-based compounds such as acetophenone, diethoxyacetophenone, benzophenone, Michler's ketone, hydroxyacetophenone, 2-methyl-1-(4-methylthiophenyl)-2-morpholinopropane-1-one, and benzil dimethyl ketal; acylphosphine oxides.

Non-limiting examples of the cationic photopolymerization initiator for the case where a cationically photopolymerizable compound is used include aromatic diazonium salts, aromatic iodonium salts, aromatic sulfonium salts, aromatic phosphonium salts, and mixed-ligand metallic salts. In the case of so-called hybrid material in which radical photopolymerization and cationic photopolymerization are used in combination, it is possible to mix and use the respective photopolymerization initiators. Alternatively, it is also possible to use the aromatic iodonium salts or the aromatic sulfonium salts capable of initiating the both types of polymerization with one type of initiator. The polymerization initiator can be added to the resin composition in an amount from 0.1% to 15% by weight, based on the non-volatile components of the polymerizable resin composition.

The colorant used for coloration of the micro-protrusion/depression structure including part (42*a-d*) includes a dye and a pigment. A plurality of the dyes and/or pigments may be used in combination. In the case where the translucently colored micro-protrusion/depression structure including part (42*a-d*) is formed with the pigment, it is desirable to use the pigment having a particle diameter of 1 nm to 100 nm, in order to prevent scattering and reflection due to the pigment particles. Further, in the case where the micro-protrusion/depression structure including part (42*a-d*) is formed from a curing resin, it is desirable that the dye and pigment do not react with active species (free radical, nucleophile, acid, base, and the like) generated during curing of the resin. Non-limiting examples of the useful dye include azo dyes. Non-limiting examples of the useful pigment include phthalocyanine-based pigments, azo-based pigments, and metal oxides. The colorant is present in an amount of 5% to 50% by weight, preferably 5% to 30% by weight, based on the non-volatile components of the micro-protrusion/depression structure including part (42*a-d*).

Alternatively, the colorant may be a material which is excited by ultraviolet light, visible light, or infrared light to emit fluorescent light or phosphorescent light. It is possible to impart a special visual effect capable of being detected by visual or mechanical observation, by using the fluorescent or phosphorescent colorant. Non-limiting examples of the useful fluorescent colorant include umbelliferone and rhodamine 6G. Non-limiting examples of the useful phosphorescent colorant include zinc sulfide, strontium aluminate.

The resin composition used in forming the micro-protrusion/depression structure including part (42*a-d*) may further comprise an additive, as desired. Non-limiting examples of the additive include a polymerization inhibitor, a leveling agent, an anti-foaming agent, an anti-sag agent, an adhesion promoter, a coated surface modifier, a plasticizer, a nitrogen-containing compound, metal such as aluminum or silver, inorganic oxides such as silica and mica, and a magnetic substance such as magnetite.

(Reflective Layer (44*a-d*))

The reflective layer (44*a-d*) can be formed from metals such as Al, Sn, Cr, Ni, Cu, Au, and Ag, a metallic compound, or the like. As used herein, the term "metals" means a simple substance of metal, or an alloy, and the term "metallic compound" means metallic oxides, metallic sulfides, metallic halides, metallic nitrides, or the like.

Alternatively, the reflective layer (44*a-d*) may be formed by using a transparent material. The transparent material includes an inorganic compound and organic polymers, for example. Exemplary materials of the inorganic compound and organic polymers are shown below. Here, in the following illustration of the material, the figure in parentheses is a refractive index of each material.

In the case where the reflective layer (44*a-d*) is formed from the inorganic compound, the useful compound includes sulfides, chlorides, oxides, and fluorides. Among these materials, the sulfides have relatively high refractive indices, and the fluorides have relatively low refractive indices. Further, the oxides encompass material having from relatively high to relatively low refractive indices. Thus, in the case where the reflective layer (44*a-d*) is formed from the oxides, it is possible to form the reflective layer (44*a-d*) having a wide range of the refractive index.

The sulfides useful for forming the reflective layer (44*a-d*) include CdS (2.6) and ZnS (2.3), for example. The chlorides useful for forming the reflective layer (44*a-d*) include $PdCl_2$ (2.3), for example. The oxides useful for forming the reflective layer (44*a-d*) include $Sb_2O_3$ (2.0), $Fe_2O_3$ (2.7), $TiO_2$ (2.6), $CeO_2$ (2.3), CdO (2.2), $WO_3$ (2.0), SiO (2.0), $Si_2O_3$ (2.5), $In_2O_3$ (2.0), PbO (2.6), $Ta_2O_3$ (2.4), ZnO (2.1), $ZrO_2$ (2.0), MgO (1.6), $SiO_2$ (1.45), $Si_2O_2$ (2.0), $Al_2O_3$ (1.6), and GaO (1.7), for example. The fluorides useful for forming the reflective layer (44*a-d*) include $MgF_2$ (1.4), $CeF_3$ (1), $CaF_2$ (1.3-1.4), and $AlF_3$ (1.6), for example.

In the case where the reflective layer (44*a-d*) is formed from the organic polymers, the useful organic polymers include polyethylene (1.51), polypropylene (1.49), polytetrafluoroethyelene (1.35) polymethyl methacrylate (1.49), and polystyrene (1.60), for example.

These materials can be appropriately selected based on optical properties such as the refractive index, a reflective index, and a transmittance, weathering resistance, interlayer adhesion, and the like, and formed into a form of a thin film. In the case where the reflective layer (44a-d) is formed from the transparent material, the difference in refractive index between the reflective layer (44a-d) and the adjacent layers (the micro-protrusion/depression structure including part (42a-d) and the mask layer (46a-d)) is desirably set to not less than 0.1, preferably not less than 0.5. Sufficient reflectivity can be imparted to the interfaces between the reflective layer (44a-d) and the adjacent layers, by having the above-described difference in refractive index.

In the case where the reflective layer (44a-d) is formed from the metals or metallic compound, commonly known methods such as a vapor deposition method, a sputtering method, and a CVD method can be appropriately used. Thickness, film-forming rate, the number of laminated layers, optical thickness and the like can be controlled by using these methods. Besides, the film of the above-described metals and metallic compound may be formed so as to cover the whole exposed surface of the micro-protrusion/depression structure including part (42a-d) and the bonding part (30), since the reflective layer (44a-d) will be patterned by etching using the mask layer (46a-d) as an etching mask as described below.

On the other hand, the reflective layer (44a-d) can be formed by applying fine powders or sol of the above-described metals, metallic compound, and organic polymers, or a highly bright light-reflective ink obtained by dispersing metallic nanoparticles into organic polymer resin. In this case, caution should be exercised so that the micro-protrusion/depression structure including part (42a-d) is not influenced by the solvent contained in the ink. The highly bright light-reflective ink can be applied by a commonly known printing method such as gravure printing, flexography, and screen printing, or a commonly known coating method such as dip coating or roll coating. The film made by the printing method may be formed so as to cover the whole exposed surface of the micro-protrusion/depression structure including part (42a-d) and the bonding part (30), since the reflective layer (44a-d) will be patterned by etching in which the mask layer (46a-d) is used as an etching mask, as described below.

The etching liquid used for patterning of the reflective layer (44a-d) is appropriately selected, taking into consideration of the materials of the bonding part (30), the micro-protrusion/depression structure including part (42a-d), the reflective layer (44a-d), and the mask layer (46a-d). For example, in the case where the reflective layer (44a-d) is formed from aluminum, an aqueous alkaline solution is typically used as the etching liquid. In this case, the bonding part (30), the micro-protrusion/depression structure including part (42a-d), and the mask layer (46a-d) are formed from materials which is not influenced by the aqueous alkaline solution.

(Mask Layer (46a-d))

The mask layer (46a-d) has a function of an etching mask for patterning of the reflective layer (44a-d), and a function to impart a glossy expression under observation of the optical information medium (1) from the back side. The material constituting the mask layer (46a-d) should have a resistance to the etching liquid used for the patterning of the reflective layer (44a-d). The mask layer (46a-d) may be formed from thermoplastic resin such as polyamide resin, polyamideimide resin, thermoplastic polyimide resin and vinyl resin or ultraviolet curing resin which is cured by ultraviolet light.

The mask layer (46a-d) comprising the thermoplastic resin can be formed by applying a coating liquid comprising the thermoplastic resin only to the desired positions (more specifically, the positions corresponding to the micro-protrusion/depression structure including part (42a-d)) by using a printing method such as screen printing, and gravure printing. On the other hand, the mask layer (46a-d) comprising the ultraviolet curing resin can be formed by: applying a coating liquid so as to cover the whole surface of the reflective layer (44a-d) before patterning by using a method such as roll coating and dip coating; irradiating ultraviolet light only to the desires positions (more specifically, the positions corresponding to the micro-protrusion/depression structure including part (42a-d)) to cure the resin; and finally removing uncured ultraviolet curing resin.

The mask layer (46a-d) may be colorless or colored in one or more color. The mask layer (46a-d) can be colored with the colorant useful for coloration of the micro-protrusion/depression structure including part (42a-d). In the mask layer (46a-d) comprising the ultraviolet curing resin, resistance to ultraviolet light for curing and resistance to active species of the curing reaction are required to the colorant. The colorant is present in an amount of 5% to 50% by weight, preferably 5% to 30% by weight, based on the non-volatile components of the mask layer (46a-d).

(Adhesive Layer (50))

The adhesive layer (50) is a layer having flexibility. The adhesive layer (50) has a function to keep the image part (40), consisting of the micro-protrusion/depression structure including part (42a-d), the reflective layer (44a-d) and the mask layer (46a-d), in the predetermined position in cooperation with the bonding part (30), a function to improve impact strength of the image part (40a-d), and a function to adhere the optical information medium (1) to the predetermined position of the receiving substrate (110).

The adhesive layer (50) can be formed from thermoplastic resin such as polyester resin, acrylic resin, vinyl chloride resin, vinyl resin, polyamide resin, polyvinyl acetate resin, rubber-based resin, ethylene-vinyl acetate copolymer resin, vinyl chloride-vinyl acetate copolymer resin, for example.

Alternatively, the adhesive layer (50) may be formed from flexible thermosetting resin or flexible photosetting resin. Non-limiting examples of the flexible thermosetting resin or flexible photosetting resin include flexible epoxy resin and flexible urethane resin. Flexibility can be imparted to thermosetting resin or photosetting resin by a method to add a plasticizer to the thermosetting resin or photosetting resin or a method to introduce an elastic structure such as flexible backbone or rubber into the backbone of the thermosetting resin or photosetting resin. The useful flexible backbone includes a long aliphatic hydrocarbon chain, and a long alkylene oxide chain. The useful elastic structure includes a hydrocarbon chain containing a non-aromatic carbon-carbon double bond which can be obtained when using a monomer having a conjugated double bond such as butadiene, isoprene or chloroprene.

Besides, values of elongation, tensile stress and tensile modulus can be used as an index of flexibility. The adhesive layer (50) can be considered as flexible when the elongation of the ISO 3167 test piece (thickness 100 mm) formed from the material of the adhesive layer (50) as measured in accordance with the method of ISO 527 is not less than 5%, more preferably not less than 20%. The impact strength of the image part (40a-d), in turn, the impact strength of the optical information medium (1), can be improved by covering the image part (40a-d) with the flexible adhesive layer (50).

(Removable Substrate (60))

The removable substrate (60) is provided to prevent the label body (3') from adhering an unintended face by inadvertent contact of the adhesive layer (50), in the label (3) of the third embodiment. The removable substrate (60) can be formed from paper, fabric, non-woven, or thermoplastic resin such as polyethylene and polypropylene. The surface of the removable substrate (60) which will be in contact with the adhesive layer (50) may be preliminarily subjected to a treatment to enhance releasability, in order to facilitate peeling off from the adhesive layer (50) when using the label (3). The useful treatment to enhance releasability includes application of silicone resin or fluorine resin, for example.

(Carrier-Substrate-Side Adhesive Layer (70))

The carrier-substrate-side adhesive layer (second adhesive layer) (70) has a function to keep the papermaking thread (4) in the predetermined position of the receiving substrate (110) in cooperation with the adhesive layer (50), in the papermaking thread (4) of the fourth embodiment. The receiving substrate (110) in this case includes paper, non-woven, and the like. The carrier-substrate-side adhesive layer (70) can be formed from a material similar to that of the adhesive layer (50).

(Receiving Substrate (110))

The receiving substrate (110) receive the optical information medium (1) transferred from the transfer leaf (2), the label body (3') in which the removable substrate (60) has been removed from the label (3), or the papermaking thread (4), in the laminated body of the fifth embodiment. The receiving substrate (110) may carry the printed part (130) on its single or both face(s). In such a case, the printed article (100) of the sixth embodiment is obtained.

The receiving substrate (110) may be transparent or opaque. Non-limiting examples of the material for forming the transparent receiving substrate (110) include polyesters such as PET and PEN, polyolefins such as PP, and poly(meth)acrylates such as polymethyl methacrylate (PMMA). Non-limited examples of the opaque receiving substrate (110) include paper, woven fabric, and non-woven.

In the case where the papermaking thread (4) of the fourth embodiment is used, the receiving substrate (110) is preferably paper or non-woven. The receiving substrate (110) may have one or more of receiving substrate windows (120) in which no fibrous material exists, at the position corresponding to the image part (40a-d) in the papermaking thread (4). The receiving substrate windows (120) may be provided on the side of the carrier-substrate-side adhesive layer (70) of the papermaking thread (4), so that the glossy expression caused by the reflective layer (44a-d) and the micro-protrusion/depression structure including part (42a-d) is visually observable. Alternatively, the receiving substrate windows (120) may be provided on the side of the adhesive layer (50) of the papermaking thread (4), so that the glossy expression caused by the reflective layer (44a-d) and the mask layer (46a-d) is visually observable. In addition, both of the above-described glossy expressions may be visually observable by providing the receiving substrate windows (120) on the both side of the receiving substrate (110). The receiving substrate windows (120) can be formed by any technique known in the art, such as a method for providing a protrusion to a papermaking roll.

Further, the printed part (130) can be formed by applying any ink known in the art to the receiving substrate (110) by any technique known in the art. Non-limiting examples of the useful technique include ink-jet printing, screen printing, intaglio printing, letterpress printing, litho printing. FIGS. 5A-7B show constitutional examples in which the printed part (130) is disposed at the position separate from the optical information medium (1), label body (3'), and papermaking thread (4). However, no particular limitation exists in the position where the printed part (130) is disposed. For example, the printed part (130) may be disposed on the lower part of the optical information medium shown in FIGS. 5A and 5B, on the lower part of the label body shown in FIGS. 6A and 6B, or on the periphery of the receiving substrate windows (120) shown in FIGS. 7A and 7B, so as to surround the image part (40a-d).

Figure 8:
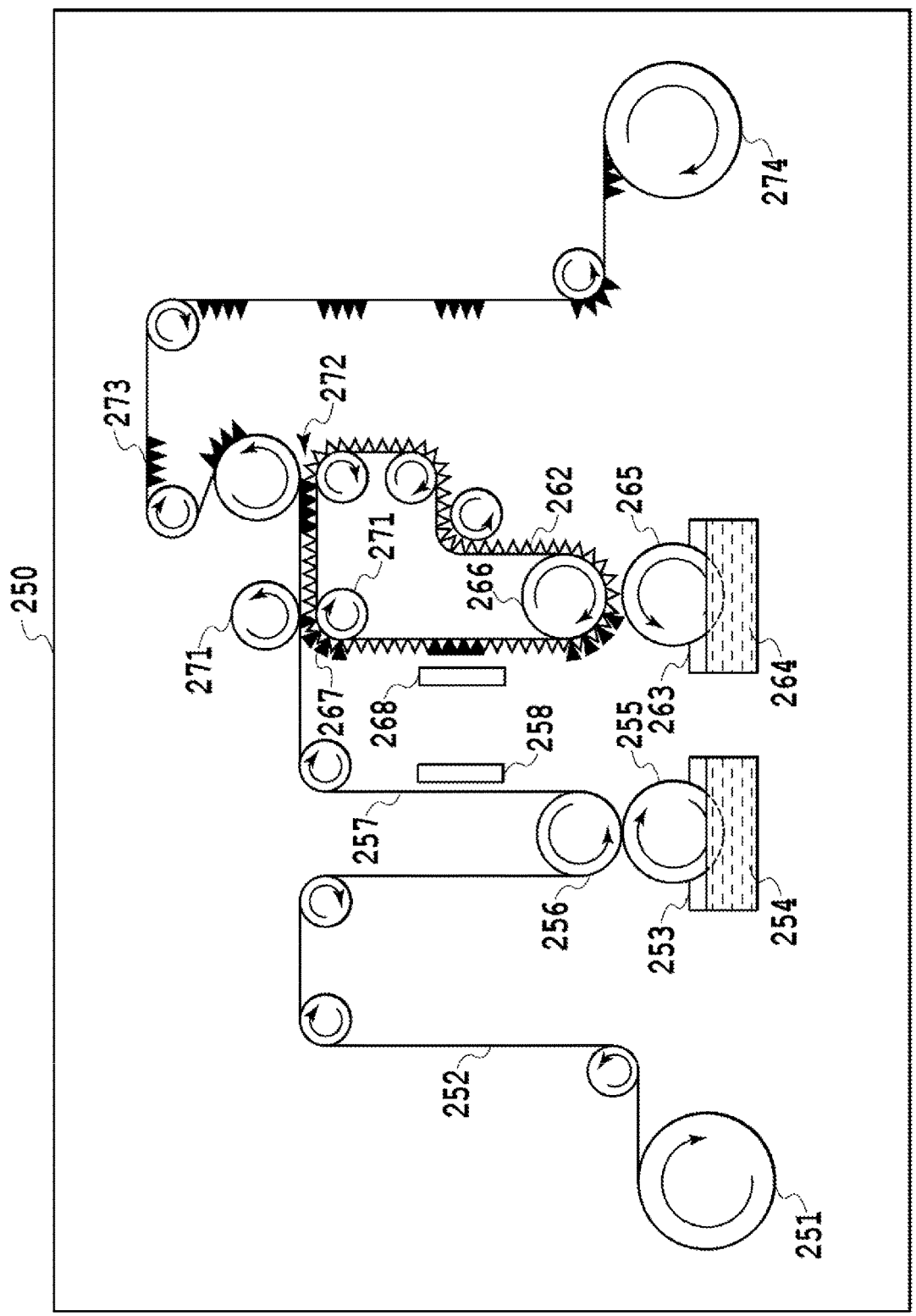
FIG. 8 is a schematic diagram of one example of the device for using production of an optical information medium according to the first embodiment of the present invention.

Next, one example of a machine (250) and a method will be explained, which are used for continuous production of the bonding part (30) and the micro-protrusion/depression structure including part (42a-d) in the optical information medium (1) of the first embodiment, with reference to FIG. 8. The method shown in FIG. 8 is a variation of the above-described two-stage transfer method, the molding film (262) corresponding to the original plate.

A laminating film (252) is wound off from a laminating film-winding roll (251). The laminating film (252) may be finally cut to utilize it as the carrier substrate (20). Alternatively, in the case where the bonding part (30) is self-supporting, the laminating film (252) may be a temporary support. Next, the laminating film (252) pass between a bonding ink applying cylinder (255) and a bonding ink pressing cylinder (256). The bonding ink applying cylinder (255) is rotated with immersed in a bonding ink (254) in a bonding ink reservoir (253), thereby the bonding ink (254) being applied onto the whole peripheral face of the bonding ink applying cylinder (255). Thus, the bonding ink (254) is transferred from the bonding ink applying cylinder (255) to the laminating film (252). Subsequently, the laminating film (252) onto which the bonding ink has been transferred is conveyed to a bonding ink drying part (258). Here, the bonding ink (254) is dried to obtain a bonding-part-formed laminating film (257) having a bonding part (30).

On the other hand, a resin layer having a molding structure which has an inversed shape of that of the micro-protrusion/depression structure including part (42a-d) has been formed on one face (outer face) of the molding film (262). The molding film (262) is passed between a molding resin ink applying cylinder (265) and a molding resin ink pressing cylinder (266) such that the outer face is on the side of the molding resin ink applying cylinder (265). The molding resin ink applying cylinder (265) has depressions (not shown) corresponding to the position to form the micro-protrusion/depression structure including part (42a-d). Then, the molding resin ink applying cylinder (265) is rotated with immersed in a molding resin ink (264) in a molding resin ink reservoir (263), thereby the molding resin ink (264) being carried in the depressions of the molding resin ink applying cylinder (265). The molding resin ink (264) which is adhered on the position other than the depressions of the molding resin ink applying cylinder (265) may be removed by any technique known in the art, such as a doctor blade (not shown). Subsequently, the molding resin ink (264) adhered on the molding resin ink applying cylinder (265) is transferred on to the above-described resin layer of the molding film (262) to form a micro-protrusion/depression structure including part-forming molding film (267) to which uncured micro-protrusion/depression structure including parts (42a-d) are attached. Subsequently, the micro-protrusion/depression structure including part-forming molding film (267) is conveyed to a molding resin ink curing part (268). In the molding resin ink curing part (268), the uncured molding resin ink (264) on the micro-protrusion/depression structure including part-forming molding film (267) is cured to form the micro-protrusion/depression structure including part (42a-d).

Then, the micro-protrusion/depression structure including part-forming molding film (267) and the bonding-part-formed laminating film (257) is brought into contact, with a pair of micro-protrusion/depression structure including part-laminating cylinders (271). If necessary, pressure and/or heat may be applied to the micro-protrusion/depression structure including part-forming molding film (267) and the bonding-part-formed laminating film (257), by the pair of micro-protrusion/depression structure including part-laminating cylinders (271). As a result, the micro-protrusion/depression structure including part (42a-d) on the micro-protrusion/depression structure including part-forming molding film (267) is transferred to the bonding part (30) on the bonding-part-formed laminating film (257). Subsequently, the molding film (262) is separated from the micro-protrusion/depression structure including part (42a-d)-transferred bonding-part-formed laminating film (273), in the laminating film peeling part (272). The molding film is forwarded into a nip between the molding resin ink applying cylinder (265) and the molding resin ink pressing cylinder (266), and will be used for subsequent formation of the micro-protrusion/depression structure including part (42a-d). On the other hand, the micro-protrusion/depression structure including part (42a-d)-transferred bonding-part-formed laminating film (273) is wound on a lamination film winding roll (274).

Besides, FIG. 8 shows the case having one transfer station consisting of the molding film (262) (the micro-protrusion/depression structure including part-forming molding film (267)), the molding resin ink reservoir (263), the molding resin ink (264), the molding resin ink applying cylinder (265), the molding resin ink pressing cylinder (266), the molding resin ink curing part (268), the pair of micro-protrusion/depression structure including part-laminating cylinders (271), and the laminating film peeling part (272). However, a plural types of micro-protrusion/depression structure including part (42a-d) having different color and/or different micro-structure may be formed continuously, by providing a plurality of transfer stations between the bonding ink drying part (258) and the lamination film winding roll (274).

Hereinafter, the materials used in the method shown in FIG. 8 will be explained in detail.

(Molding Film (262))

The molding film (262) for forming the micro-protrusion/depression structure comprises a plastic film of PET, PEN, PP, or the like, and a resin layer having a molding structure which has an inversed shape of that of the micro-protrusion/depression structure. The resin layer can be formed by the commonly known method, such as "pressing method", "casting method" and "photopolymer method". Further, in this method, the molding film (262) is used only for forming the micro-protrusion/depression structure including part (42a-d) by application and curing of the molding resin ink (264), and does not relates to formation of the reflective layer (44a-d) by vapor deposition of metal and the like. In other words, the resin layer does not need to have an adhesion to the material for forming the reflective layer (44a-d) such as metal. Thus, the surface of the molding film (262) may be subjected to a releasing treatment for facilitating peel-off of the cured body of the molding resin ink (264). The releasing treatment can be carried out by adding silicon compound, fluorine compound, or inorganic filler, or the like.

(Bonding Ink Drying Part (258))

For example, an oven carrying out heating and air-blowing can be used as the bonding ink drying part (258).

(Molding Resin Ink Curing Part (268))

An oven carrying out heating and air-blowing can be used as the molding resin ink curing part (268), in the case where the micro-protrusion/depression structure including part (42a-d) comprises thermosetting resin. On the other hand, a combination of an oven for removing volatile components in the molding resin ink (264) by heating and air-blowing, and a device for irradiating ultraviolet light or electron beam for curing the resin can be used as the molding resin ink curing part (268), in the case where the micro-protrusion/depression structure including part (42a-d) comprises ultraviolet curing resin or electron beam curing resin.

(Bonding Ink (254))

The bonding ink (254) is a composition comprising the above-described adhesive resin for constituting the bonding part (30), solvent, and the like.

(Molding Resin Ink (264))

The molding resin ink (264) is a composition comprising the above-described resin composition for constituting the micro-protrusion/depression structure including part (42a-d), solvent, and the like.

EXAMPLES

Example 1

First, a bonding part (30) and a micro-protrusion/depression structure including part (42a-d) were formed by the method shown in FIG. 8. A PET film on which a releasing layer consisting of acrylic-based resin is coated was prepared as a laminating film (252). A bonding ink (254) comprising acrylic-based adhesive resin was loaded into a bonding ink reservoir (253). The laminating film (252) was would off from a laminating film-winding roll (251), and passed between a bonding ink applying cylinder (255) and a bonding ink pressing cylinder (256), to transfer the bonding ink (254) by applying pressure with the two cylinder (255, 256). Subsequently, the bonding ink (254) is dried in the bonding ink drying part (258) using a hot-air oven, to obtain the bonding part (30).

On the other hand, a molding film (262) was obtained by coating urethane-based resin onto a PET film, drying the urethane-based resin to form a resin layer, and transferring an inversed shape of the desired micro-protrusion/depression structure by the "pressing method". A molding resin ink (264) comprising urethane-based resin and an orange colorant was loaded into a molding resin ink reservoir (263). The molding resin ink (264) was transferred from a molding resin ink applying cylinder (265) having patterned depressions to the molding film (262), by pressing in register with a molding resin ink pressing cylinder (266). A micro-protrusion/depression structure including part-forming molding film (267) was obtained by drying and curing in a molding resin ink curing part (268) using a hot-air oven.

The micro-protrusion/depression structure including part (42a-d-Or) was transferred onto the bonding-part-formed laminating film (257) by bringing the bonding-part-formed laminating film (257) and the micro-protrusion/depression structure including part-forming molding film (267) into contact while pressing by micro-protrusion/depression structure including part-laminating cylinders (271), and the molding film (262) was peeled off from the micro-protrusion/depression structure including part-formed laminating film (273). The micro-protrusion/depression structure including part (42a-d-Or)-formed laminating film (273) was wound on a lamination film winding roll (274). Then, the micro-protrusion/depression structure including part-formed laminating film (273) was cut to obtain an intermediate product having a stripe shape in which a carrier substrate (20), the bonding part (30) and the micro-protrusion/depression structure including part (42a-d-Or) were laminated in this order. Here, the carrier substrate (20) was the PET film having the releasing layer consisting of the acrylic-based resin, which had been used as the laminating film (252).

Then, aluminum metal having a thickness of 55 nm was vapor deposited onto the whole surface of the intermediate product on the side of the micro-protrusion/depression structure including part (42a-d-Or) to form an aluminum layer. Subsequently, a composition comprising polyamideimide-based resin and a reddish-brown colorant was applied only on the position corresponding to the micro-protrusion/depression structure including part (42a-d-Or) to form the mask layer (46a-d-RB). Subsequently, the intermediate product was immersed into a sodium hydroxide solution to selectively etch off a reflective layer using the mask layer (46a-d-RB) as an etching mask, to form patterned reflective layers (44a-d). After etching off, the intermediate product was washed with a hydrochloric acid solution and water and dried with hot air. Then, acrylic-based resin was applied onto the dried intermediate product to form an adhesive layer (50), to obtain a transfer leaf (2) of the second embodiment. The transfer leaf (2) had four image parts (40a-d) which were separated from each other. Each of the image parts (40a-d) had the micro-protrusion/depression structure including part (42a-d-Or) which was separated from each other and colored in orange color, the reflective layer (44a-d) which was separated from each other, and the mask layer (46a-d-RB) which was separated from each other and colored in reddish-brown color. Besides, only the colorless adhesive layer is present in the interstice between the image parts (40a-d).

Figure 9A:
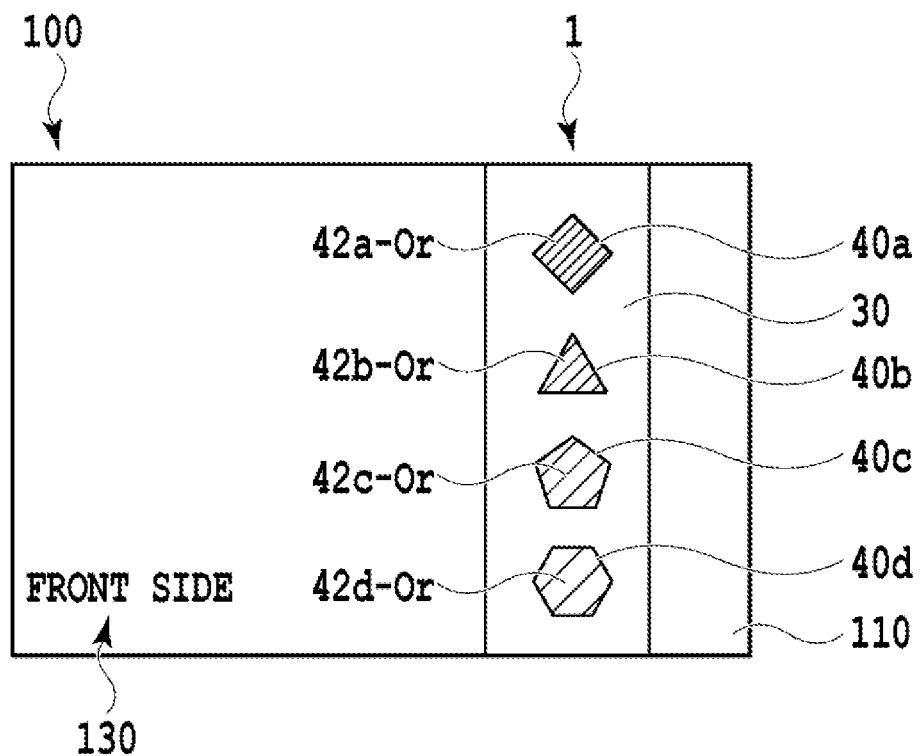
FIG. 9A is a schematic plan view showing the front side of the printed article of Example 1 which comprises an optical information medium transferred on a transparent substrate.
Figure 9B:
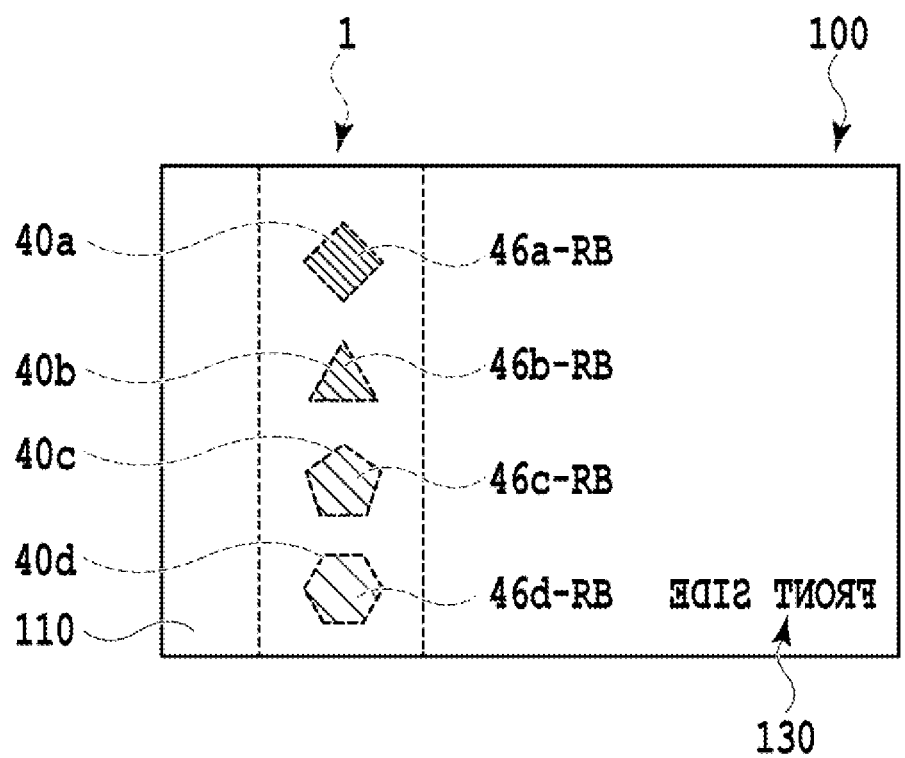
FIG. 9B is a schematic plan view showing the back side of the printed article of Example 1 which comprises an optical information medium transferred on a transparent substrate.

The resultant transfer leaf (2) was heated and pressed to a transparent polypropylene receiving substrate (110) having a printed part (130), with an up-down type heat-transfer device to which a hot stamp was attached, followed by peel-off of the carrier substrate (20), to obtain a printed article (100) shown in FIGS. 9A and 9B. In the printed article (100), the optical information medium (1) having a stripe shape was transferred on the front surface shown in FIG. 9A.

As shown in FIG. 9A, the four image parts (40a-d) were visually observed, when the printed article (100) was observed from the front side. The four image parts (40a-d) exhibited gold glossy expression caused by the reflective layer (44a-d) consisting of aluminum metal and the micro-protrusion/depression structure including part (42a-d-Or) colored in orange color. A region other than the four image parts (40a-d) was observed as a colorless and transparent region.

As shown in FIG. 9B, the four image parts (40a-d) were visually observed through the transparent receiving substrate (110), when the printed article (100) was observed from the back side. The four image parts (40a-d) exhibited copper glossy expression caused by the reflective layer (44a-d) consisting of aluminum metal and the mask layer (46a-d-RB) colored in reddish-brown color. A region other than the four image parts (40a-d) was observed as a colorless and transparent region.

As described above, without the use of a single layer having an orange colored micro-structure, the optical information medium (1) and printed article (100) having the same were obtained, in which the gold glossy expression under observation from the front side and the copper glossy expression under observation from the back side were visually observed, both of them being separated by the colorless and transparent region. Further, the reflective layer (44a-d) of this example had physical strength and chemical resistance comparable to the reflective layer of the prior art providing silver glossy expression, since the reflective layer is formed from aluminum metal.

Example 2

A micro-protrusion/depression structure including part (42a-R) was formed on the predetermined position of the bonding part (30) in accordance with the same procedure as Example 1, except that a PET film not having the releasing layer consisting of acrylic-based resin was used as the lamination film (252), and a molding resin ink (264) comprising urethane-based resin and a red colorant was used.

Then, a micro-protrusion/depression structure including part (42b-Bl) was formed on the predetermined position in accordance with the same procedure as Example 1, except that the PET film on which the micro-protrusion/depression structure including part (42a-R) had been formed, and a molding resin ink (264) comprising the urethane-based resin and a blue colorant were used, by means of the device similar to that shown in FIG. 8 except that the bonding ink applying cylinder (255), the bonding ink pressing cylinder (256) and the bonding ink reservoir were omitted.

Subsequently, a micro-protrusion/depression structure including part (42c-Y) was formed on the predetermined position in accordance with the same procedure as that for formation of the micro-protrusion/depression structure including part (42b-Bl), except that a molding resin ink (264) comprising the urethane-based resin and a yellow colorant were used. Further, a micro-protrusion/depression structure including part (42d-G) was formed on the predetermined position in accordance with the same procedure as that for formation of the micro-protrusion/depression structure including part (42b-Bl), except that a molding resin ink (264) comprising the urethane-based resin and a green colorant were used.

Then, an aluminum metal layer having a thickness of 55 nm was formed on the whole surface of the micro-protrusion/depression structure including part-formed laminating film (273) having four types of micro-protrusion/depression structure including parts (42a-d), in accordance with the same procedure as Example 1. Then, the micro-protrusion/depression structure including part-formed laminating film (273) was cut to obtain an intermediate product having a stripe shape in which a carrier substrate (20), the bonding part (30) and the micro-protrusion/depression structure including part (42a-d) were laminated in this order. Here, the carrier substrate (20) was the PET film not having the releasing layer consisting of acrylic-based resin, which had been used as the laminating film (252).

Subsequently, a mask layer (46a-Pi) was formed by applying a composition comprising polyamideimide-based resin and a pink colorant only to the position corresponding to the micro-protrusion/depression structure including part (42a-R).

A mask layer (46b-Cy) was formed by applying a composition comprising the polyamideimide-based resin and a cyan colorant only to the position corresponding to the micro-protrusion/depression structure including part (42b-Bl), in accordance with the same structure as described above. Further, a mask layer (46c-Br) was formed by applying a composition comprising the polyamideimide-based resin and a brown colorant only to the position corresponding to the micro-protrusion/depression structure including part (42c-Y). Further, a mask layer (46d-M) was formed by applying a composition comprising the polyamideimide-based resin and a magenta colorant only to the position corresponding to the micro-protrusion/depression structure including part (42d-G).

Subsequently, a reflective layer (44a-d) was obtained by selective etching with the sodium hydroxide solution in which the mask layer (46a-d) was used as an etching mask, in accordance with the same procedure as Example 1. Washing, drying, and formation of the adhesive layer (50) were carried out in accordance with the same procedure as Example 1. A removable substrate (60) consisting of nonwoven was adhered on the surface of the adhesive layer (50) of the resultant laminated body to form a label (3) of the third embodiment. The label (3) had four image parts (40a-d) separated from each other. Each of the image parts (40a-d) had: the micro-protrusion/depression structure including part (42a-R, 42b-Bl, 42c-Y, or 42d-G) which was separate from each other and colored in red, blue, yellow or green color respectively; the aluminum reflective layer (44a-d) separated from each other; and the mask layer (46a-Pi, 46b-Cy, 46c-Br, or 46d-M) which was separate from each other and colored in pink, cyan, brown or magenta color respectively. Besides, only the colorless adhesive layer is present in the interstice between the image parts (40a-d).

Figure 10A:
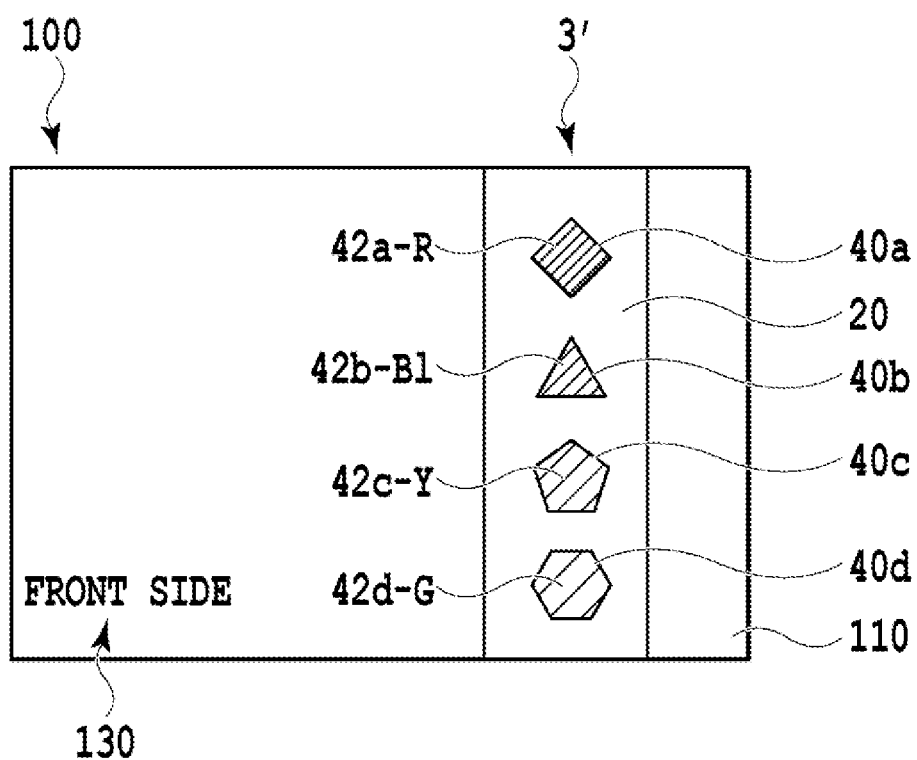
FIG. 10A is a schematic plan view showing the front side of the printed article of Example 2 which comprises a label adhered on a transparent substrate.
Figure 10B:
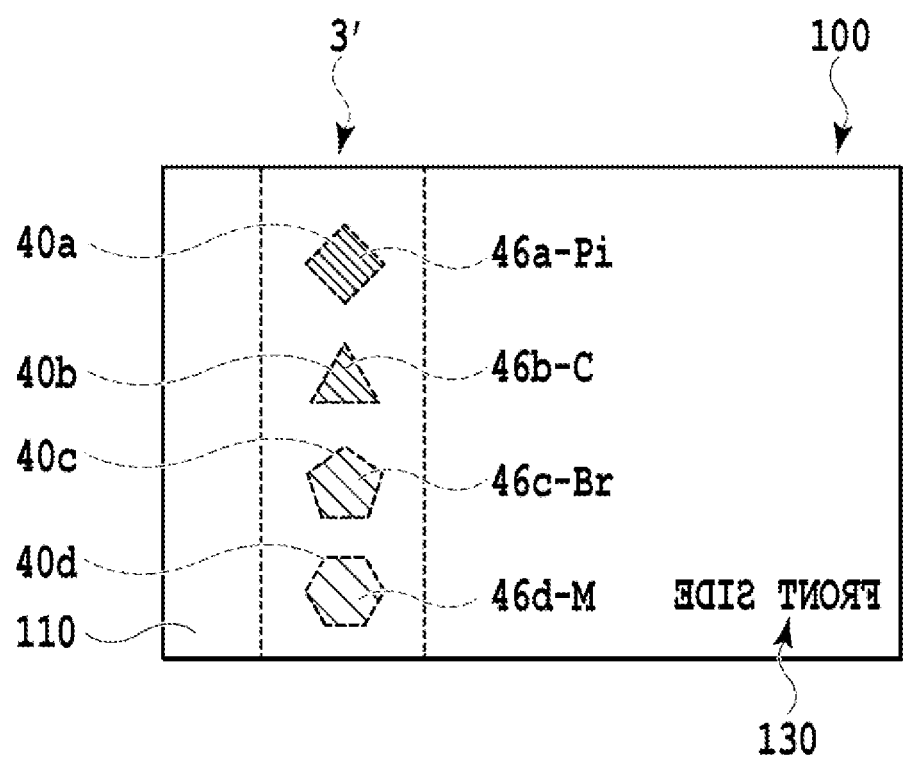
FIG. 10B is a schematic plan view showing the back side of the printed article of Example 2 which comprises a label adhered on a transparent substrate.

The removable substrate (60) of the resultant label (3) was removed, followed by adhesion to a transparent PET receiving substrate (110) having a printed part (130) to obtain a printed article (100) shown in FIGS. 10A and 10B. In the printed article (100), the label body (3') having a stripe shape was adhered on the front side surface shown in FIG. 10A.

As shown in FIG. 10A, the four image parts (40a-d) were visually observed, when the printed article (100) was observed from the front side. The four image parts (40a-d) exhibited non-silver glossy expression caused by the reflective layer (44a-d) consisting of aluminum metal and the micro-protrusion/depression structure including parts (42a-d) colored in different color from each other. A region other than the four image parts (40a-d) was observed as a colorless and transparent region.

As shown in FIG. 10B, the four image parts (40a-d) were visually observed through the transparent receiving substrate (110), when the printed article (100) was observed from the back side. The four image parts (40a-d) exhibited non-silver glossy expression caused by the reflective layer (44a-d) consisting of aluminum metal and the mask layer (46a-d) colored in different color from each other. A region other than the four image parts (40a-d) was observed as a colorless and transparent region.

As described above, without the use of a single layer having a single-colored micro-structure, the optical information medium (1) and printed article (100) having the same were obtained, in which a plurality of non-silver glossy expression under observation from the front side and a plurality of non-silver glossy expression under observation from the back side were observed, both of them being separated by the colorless and transparent region. Further, the reflective layer (44a-d) of this example had physical strength and chemical resistance comparable to the reflective layer of the prior art providing silver glossy expression, since the reflective layer is formed from aluminum metal.

Example 3

Micro-protrusion/depression structure including parts (42a-R, 42b-R and 42d-R) were formed on the predetermined positions of the bonding part (30) in accordance with the same procedure as Example 1, except that a molding resin ink (264) comprising the urethane-based resin and a red colorant was used.

Then, micro-protrusion/depression structure including parts (42b-Bl, 42c-Bl, and 42d-Bl) were formed on the predetermined positions in accordance with the same procedure as Example 1, except that the PET film on which the micro-protrusion/depression structure including parts (42a-R, 42b-R and 42d-R) had been formed, and a molding resin ink (264) comprising the urethane-based resin and a blue colorant were used, by means of the device similar to that shown in FIG. 8 except that the bonding ink applying cylinder (255), the bonding ink pressing cylinder (256) and the bonding ink reservoir were omitted.

Subsequently, micro-protrusion/depression structure including parts (42b-Y, 42c-Y, and 42d-Y) were formed on the predetermined positions in accordance with the same procedure as that for formation of the micro-protrusion/depression structure including part (42b-Bl), except that a molding resin ink (264) comprising the urethane-based resin and a yellow colorant were used. Further, a micro-protrusion/depression structure including part (42a-G and 42d-G) was formed on the predetermined positions in accordance with the same procedure as described above, except that a molding resin ink (264) comprising the urethane-based resin and a green colorant were used. Further, a micro-protrusion/depression structure including part (42c-Cl) was formed on the predetermined position in accordance with the same procedure as described above, except that a molding resin ink (264) comprising the urethane-based resin but not containing any colorant were used.

Then, an aluminum metal layer having a thickness of 55 nm was formed on the whole surface of the micro-protrusion/depression structure including part-formed laminating film (273) having four types of micro-protrusion/depression structure including parts (42a-d), in accordance with the same procedure as Example 1. Then, the micro-protrusion/depression structure including part-formed laminating film (273) was cut to obtain an intermediate product having a patch shape in which a carrier substrate (20), the bonding part (30) and the micro-protrusion/depression structure including part (42a-d) were laminated in this order. Here, the carrier substrate (20) was the PET film having the releasing layer consisting of the acrylic-based resin, which had been used as the laminating film (252).

Subsequently, mask layers (46a-Pi and 46b-Pi) were formed by applying a composition comprising polyamideimide-based resin and a pink colorant only to the predetermined positions.

Mask layers (46a-Cy, 46b-Cy, and 46d-Cy) were formed by applying a composition comprising the polyamideimide-based resin and a cyan colorant only to the predetermined positions, in accordance with the same structure as described above. Further, mask layers (46a-B, 46c-Br and 46d-Br) was formed by applying a composition comprising the polyamideimide-based resin and a brown colorant only to the predetermined positions. Further, mask layers (46a-M, 46c-M, and 46d-M) were formed by applying a composition comprising the polyamideimide-based resin and a magenta colorant only to the predetermined positions. Subsequently, a mask layer (46c-Cl) was formed by applying a composition comprising the polyamideimide-based resin but not containing any colorant only to the predetermined position.

Subsequently, a reflective layer (44a-d) was obtained by selective etching with the sodium hydroxide solution in which the mask layer (46a-d) was used as an etching mask, in accordance with the same procedure as Example 1. Washing, drying, and formation of the adhesive layer (50) were carried out in accordance with the same procedure as Example 1, to form a transfer leaf (2) of the second embodiment.

The first image part (40a) had the micro-protrusion/depression structure including part having two differently colored regions (42a-R and 42a-G), the aluminum reflective layer (44a), and the mask layer having four differently colored regions (46a-Pi, 46a-Cy, 46a-Br, and 46a-M). The second image part (40b) had the micro-protrusion/depression structure including part having three differently colored regions (42b-R, 42b-Bl and 42b-Y), the aluminum reflective layer (44b), and the mask layer having four regions colored in two different color (46b-Pi and 46b-Cy). The third image part (40c) had the micro-protrusion/depression structure including part having three regions colored in two different color and one colorless region (42c-Bl, 42c-Y and 42c-Cl), the aluminum reflective layer (44c), and the mask layer having three regions colored in two different color and one colorless region (46c-Br, 46c-M, and 46c-Cl). The fourth image part (40d) had the micro-protrusion/depression structure including part having five regions colored in three different color (42d-R, 42d-Bl and 42d-G), the aluminum reflective layer (44d), and the mask layer having four regions colored in three different color (46d-Cy, 46d-Br, and 46d-M). Besides, only the colorless adhesive layer (50) was present in the interstice between the image parts (40a-d).

Figure 11A:
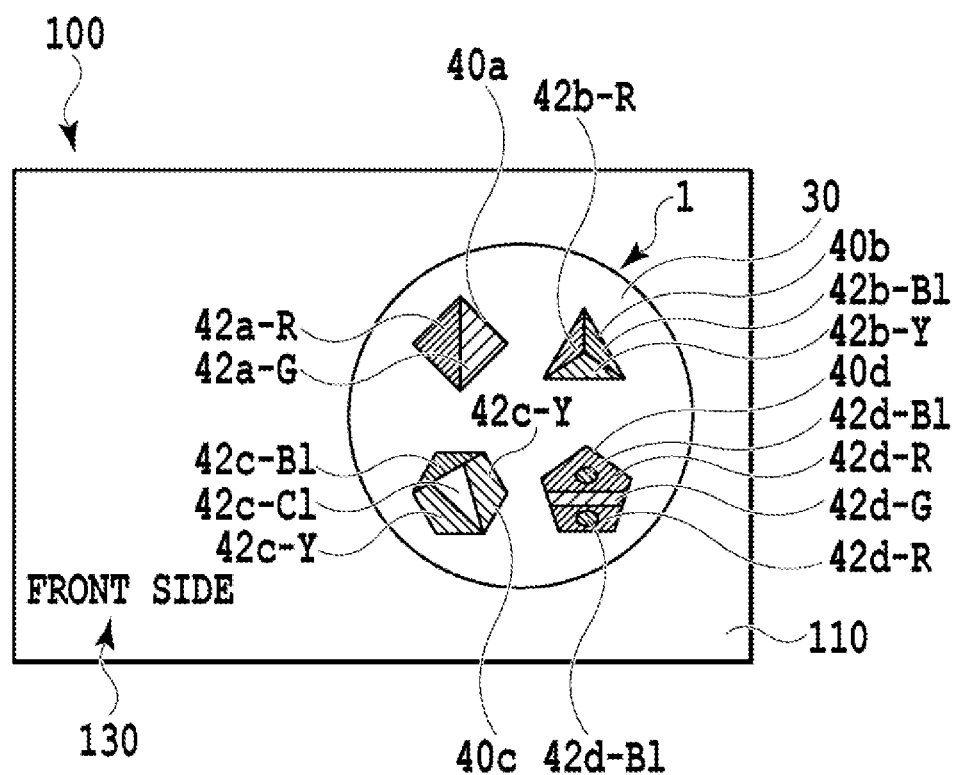
FIG. 11A is a schematic plan view showing the front side of the printed article of Example 3 which comprises an optical information medium transferred on a transparent substrate.
Figure 11B:
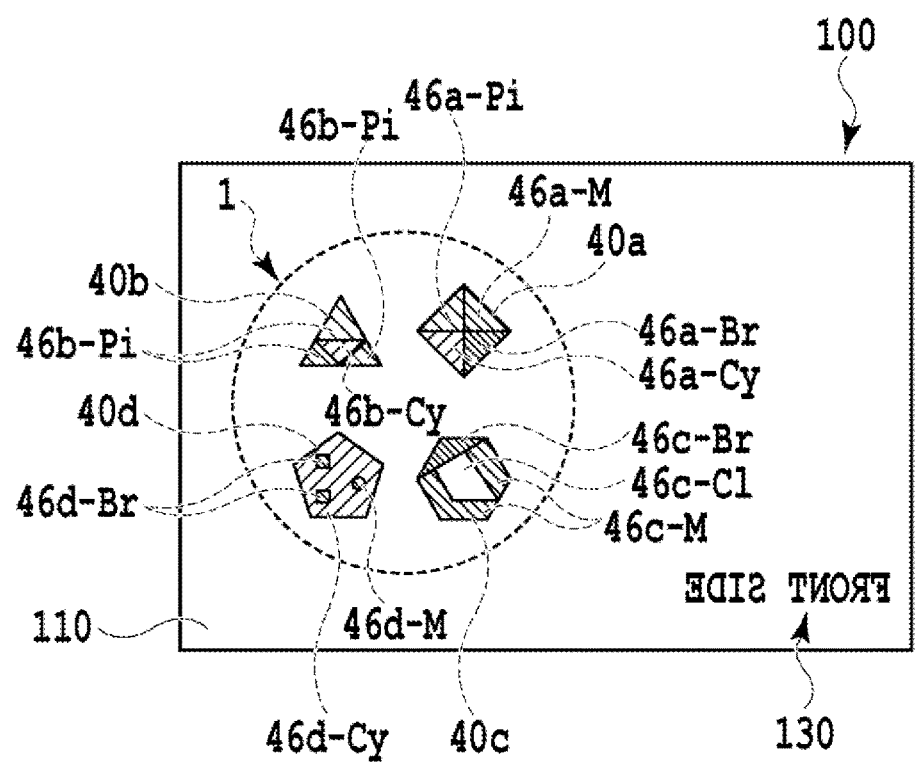
FIG. 11B is a schematic plan view showing the back side of the printed article of Example 3 which comprises an optical information medium transferred on a transparent substrate.

The resultant transfer leaf (2) was heated and pressed to a transparent polypropylene receiving substrate (110) having a printed part (130) in accordance with the same procedure as Example 1, followed by peel-off of the carrier substrate (20), to obtain a printed article (100) shown in FIGS. 11A and 11B. In the printed article (100), the optical information medium (1) having a patch shape was transferred on the front surface shown in FIG. 11A.

As shown in FIG. 11A, the four image parts (40a-d) were visually observed, when the printed article (100) was observed from the front side. The four image parts (40a-d) exhibited multi-colored glossy expression caused by the reflective layer (44a-d) consisting of aluminum metal and the multi-colored micro-protrusion/depression structure including part (42a-d). A region other than the four image parts (40a-d) was observed as a colorless and transparent region. Here, in the third image part (40c), the region in which the colorless micro-protrusion/depression structure including part (42c-Cl) exhibited silver glossy expression. As described above, the present invention can provide an image having the conventional silver glossy expression and differently colored glossy expression.

As shown in FIG. 11B, the four image parts (40a-d) were visually observed through the transparent receiving substrate (110), when the printed article (100) was observed from the back side. The four image parts (40a-d) exhibited multi-color glossy expression caused by the reflective layer (44a-d) consisting of aluminum metal and the multi-colored mask layer (46a-d). A region other than the four image parts (40a-d) was observed as a colorless and transparent region. Like the observation from the front side, in the third image part (40c), the region in which the colorless mask layer (46c-Cl) exhibited silver glossy expression. As described above, the present invention can provide an image having the conventional silver glossy expression and different colored glossy expression, also under observation from the back side.

As described above, without the use of a single layer having a single-colored micro-structure, the optical information medium (1) and printed article (100) having the same were obtained, in which multi-color glossy expression including silver under observation from the front side and multi-color glossy expression including silver under observation from the back side were observed, both of them being separated by the colorless and transparent region. Further, the reflective layer (44a-d) of this example had physical strength and chemical resistance comparable to the reflective layer of the prior art providing silver glossy expression, since the reflective layer is formed from aluminum metal.

Example 4

Micro-protrusion/depression structure including parts (42a-R, 42b-R and 42c-R) were formed on the predetermined positions of the bonding part (30) by using a molding resin ink (264) comprising the urethane-based resin and a red colorant, in accordance with the same procedure as Example 2.

Micro-protrusion/depression structure including parts (42a-Bl, 42b-Bl and 42c-Bl) were formed on the predetermined positions by using a molding resin ink (264) comprising the urethane-based resin and a blue colorant, in accordance with the same procedure as Example 2. Subsequently, a micro-protrusion/depression structure including part (42b-Y) was formed on the predetermined position by using a molding resin ink (264) comprising the urethane-based resin and a yellow colorant, in accordance with the same procedure as Example 2. Further, Micro-protrusion/depression structure including parts (42a-G and 42d-G) were formed on the predetermined positions by using a molding resin ink (264) comprising the urethane-based resin and a green colorant, in accordance with the same procedure as Example 2. Further, Micro-protrusion/depression structure including parts (42c-Cl and 42d-Cl) were formed on the predetermined positions by using a molding resin ink (264) comprising the urethane-based resin but not containing any colorant, in accordance with the same procedure as Example 3.

Then, an aluminum metal layer having a thickness of 55 nm was formed on the whole surface of the micro-protrusion/depression structure including part-formed laminating film (273) having four types of micro-protrusion/depression structure including parts (42a-d), in accordance with the same procedure as Example 2. Then, the micro-protrusion/depression structure including part-formed laminating film (273) was cut to obtain an intermediate product having a patch shape in which a carrier substrate (20), the bonding part (30) and the micro-protrusion/depression structure including part (42a-d) were laminated in this order. Here, the carrier substrate (20) was the PET film not having the releasing layer consisting of acrylic-based resin, which had been used as the laminating film (252).

Subsequently, mask layers (46a-Pi and 46c-Pi) were formed by applying a composition comprising polyamideimide-based resin and a pink colorant only to the predetermined positions. Mask layers (46a-Cy and 46c-Cy) were formed by applying a composition comprising the polyamideimide-based resin and a cyan colorant only to the predetermined positions in accordance with the above-described procedure. Mask layers (46b-Br, 46c-Br and 46c-Br) were formed by applying a composition comprising the polyamideimide-based resin and a brown colorant only to the predetermined positions. A mask layers (46d-M) was formed by applying a composition comprising the polyamideimide-based resin and a magenta colorant only to the predetermined position. Subsequently, mask layers (46a-Cl, 46b-Cl and 46*d*-Cl) were formed by applying a composition comprising the polyamideimide-based resin but not containing any colorant only to the predetermined positions.

Subsequently, a reflective layer (44*a*-*d*) was obtained by selective etching with the sodium hydroxide solution in which the mask layer (46*a*-*d*) was used as an etching mask, in accordance with the same procedure as Example 2. Washing, drying, formation of the adhesive layer (50), and adhesion of the removable substrate (60) were carried out in accordance with the same procedure as Example 2, to form a label (3) of the third embodiment.

The first image part (40*a*) had the micro-protrusion/depression structure including part having two differently colored regions (42*a*-R and 42*a*-G), the aluminum reflective layer (44*a*), and the mask layer having two differently colored regions and one colorless region (46*a*-Pi, 46*a*-Cy, and 46*a*-Cl). The second image part (40*b*) had the micro-protrusion/depression structure including part having three differently colored regions (42*b*-R, 42*b*-Bl and 42*b*-Y), the aluminum reflective layer (44*b*), and the mask layer having one single-colored region and three colorless regions (46*b*-Br and 46*b*-Cl). The third image part (40*c*) had the micro-protrusion/depression structure including part having three regions colored in two different color and one colorless region (42*c*-R, 42*c*-Y and 42*c*-Cl), the aluminum reflective layer (44*c*), and the mask layer having five regions colored in three different color (46*c*-Cy, 46*c*-Br, and 46*c*-M). The fourth image part (40*d*) had the micro-protrusion/depression structure including part having one single-colored region and four colorless regions (42*d*-R and 42*d*-Cl), the aluminum reflective layer (44*d*), and the mask layer having three regions colored in two different color and one colorless region (46*d*-Br, 46*d*-M, and 46*d*-Cl). Besides, only the colorless adhesive layer is present in the interstice between the image parts (40*a*-*d*).

Figure 12A:
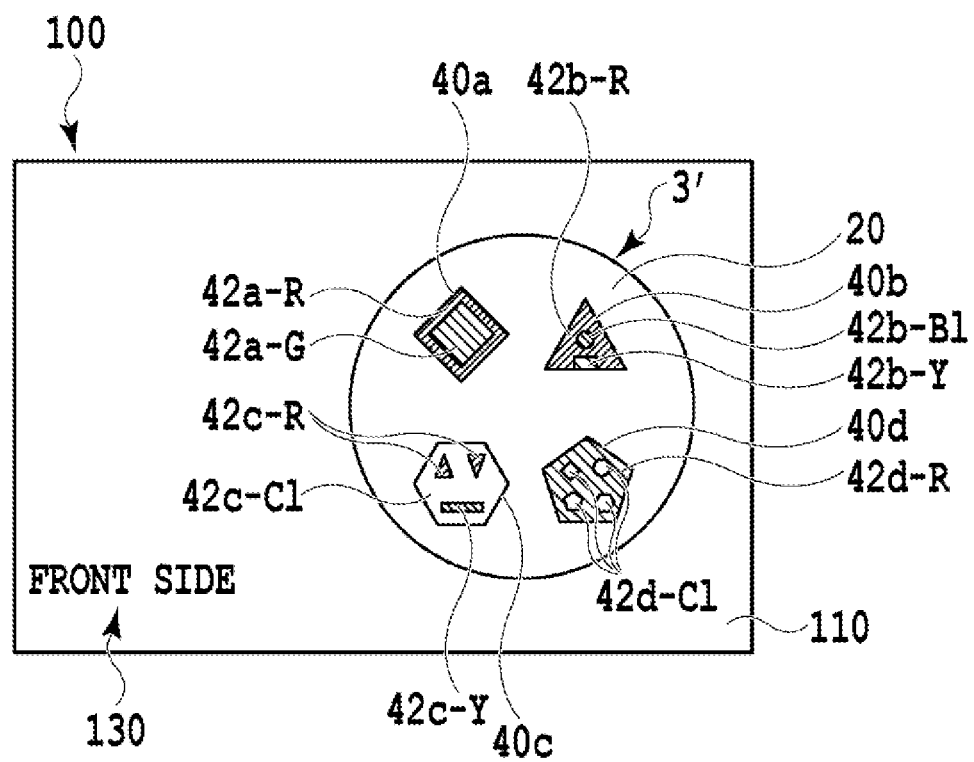
FIG. 12A is a schematic plan view showing the front side of the printed article of Example 4 which comprises a label adhered on a transparent substrate.
Figure 12B:
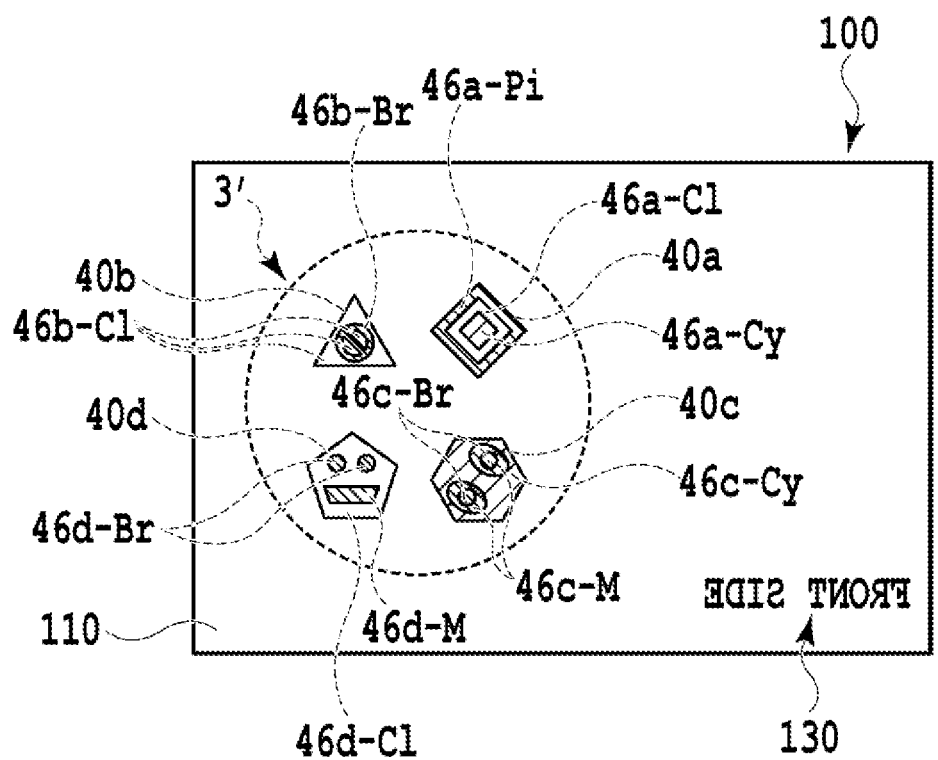
FIG. 12B is a schematic plan view showing the back side of the printed article of Example 4 which comprises a label adhered on a transparent substrate.

The removable substrate (60) of the resultant label (3) was removed, followed by adhesion to a transparent PET receiving substrate (110) having a printed part (130), to obtain a printed article (100) shown in FIGS. 12A and 12B. In the printed article (100), the label body (3') having a patch shape was adhered on the front side surface shown in FIG. 12A.

As shown in FIG. 12A, the four image parts (40*a*-*d*) were visually observed, when the printed article (100) was observed from the front side. The four image parts (40*a*-*d*) exhibited multi-colored glossy expression caused by the reflective layer (44*a*-*d*) consisting of aluminum metal and the multi-colored micro-protrusion/depression structure including part (42*a*-*d*). A region other than the four image parts (40*a*-*d*) was observed as a colorless and transparent region. Here, the first image part (40*a*) had two-colored glossy expression caused by a peripheral area consisting of the red micro-protrusion/depression structure including part (42*a*-R) and an internal area consisting of the green micro-protrusion/depression structure including part (42*a*-G). Further, the third image part (40*c*) had a peripheral area consisting of the colorless micro-protrusion/depression structure including part (42*c*-Cl) and exhibiting silver glossy expression, and an internal area consisting of the red and yellow micro-protrusion/depression structure including parts (42*c*-R and 42*c*-Y) and exhibiting non-silver glossy expression. As described above, the present invention is possible to provide an image having the internal area exhibiting one or more color within the peripheral area exhibiting one color.

As shown in FIG. 12B, the four image parts (40*a*-*d*) were visually observed through the transparent receiving substrate (110), when the printed article (100) was observed from the back side. The four image parts (40*a*-*d*) exhibited multi-color glossy expression caused by the reflective layer (44*a*-*d*) consisting of aluminum metal and the multi-colored mask layer (46*a*-*d*). A region other than the four image parts (40*a*-*d*) was observed as a colorless and transparent region. Like the observation from the front side, the first image part (40*a*) exhibited two-colored glossy expression caused by a peripheral area consisting of the pink mask layer (46*a*-Pi) and an internal area consisting of the cyan and colorless mask layers (46*a*-Cy and 46*a*-Cl). Further, the fourth image part (40*d*) had a peripheral area consisting of the colorless mask layer (46*d*-Cl) and exhibiting silver glossy expression, and an internal area consisting of the brown and magenta mask layers (46*d*-Br and 46*d*-M) and exhibiting non-silver glossy expression. As described above, the present invention can provide an image having the conventional silver glossy expression and the other colored glossy expression.

Example 5

Micro-protrusion/depression structure including parts (42*a*-R and 42*c*-R) were formed on the predetermined positions of the bonding part (30) by using a molding resin ink (264) comprising the urethane-based resin and a red colorant, in accordance with the same procedure as Example 2.

Then, Micro-protrusion/depression structure including parts (42*b*-Y and 42*d*-Y) were formed on the predetermined positions by using a molding resin ink (264) comprising the urethane-based resin and a yellow colorant, in accordance with the same procedure as Example 2.

Then, an aluminum metal layer having a thickness of 55 nm was formed on the whole surface of the micro-protrusion/depression structure including part-formed laminating film (273) having four types of micro-protrusion/depression structure including parts (42*a*-*d*), in accordance with the same procedure as Example 2. Then, the micro-protrusion/depression structure including part-formed laminating film (273) was cut to obtain an intermediate product having a stripe shape in which a carrier substrate (20), the bonding part (30) and the micro-protrusion/depression structure including part (42*a*-*d*) were laminated in this order. Here, the carrier substrate (20) was the PET film not having the releasing layer consisting of acrylic-based resin, which had been used as the laminating film (252).

Subsequently, mask layers (46*a*-*d*) were formed by applying a composition comprising polyamideimide-based resin but not containing any colorant only to the positions corresponding to the micro-protrusion/depression structure including part (42*a*-*d*).

Subsequently, a reflective layer (44*a*-*d*) was obtained by selective etching with the sodium hydroxide solution in which the mask layer (46*a*-*d*) was used as an etching mask, in accordance with the same procedure as Example 2. Washing and drying were carried out in accordance with the same procedure as Example 2.

A composition comprising acrylic-based resin and a blue colorant was applied onto the whole surface of the side of the image parts (40*a*-*d*) of the intermediate product after drying, to form a blue adhesive layer (50-B). Then, a composition comprising the acrylic-based resin but not containing any colorant was applied onto the whole surface of the side of the carrier substrate (20) of the intermediate product to form a carrier-substrate-side adhesive layer (70), to obtain a papermaking thread (4) of the fourth embodiment.

The resultant papermaking thread (4) was embedded into a cotton dispersion, to produce a laminated body of the fifth embodiment which comprises the papermaking thread (4) in a cotton receiving substrate (110). Here, the front surface of the cotton receiving substrate (110) had receiving substrate windows (120) for exposing the image parts (40a-d) at the positions corresponding to the image parts (40a-d) of the papermaking thread (4). Printed parts (130) were formed by printing onto the front and back surfaces of the laminated body (cotton receiving substrate (110)), to obtain a printed article (100) of the sixth embodiment.

Figure 13A:
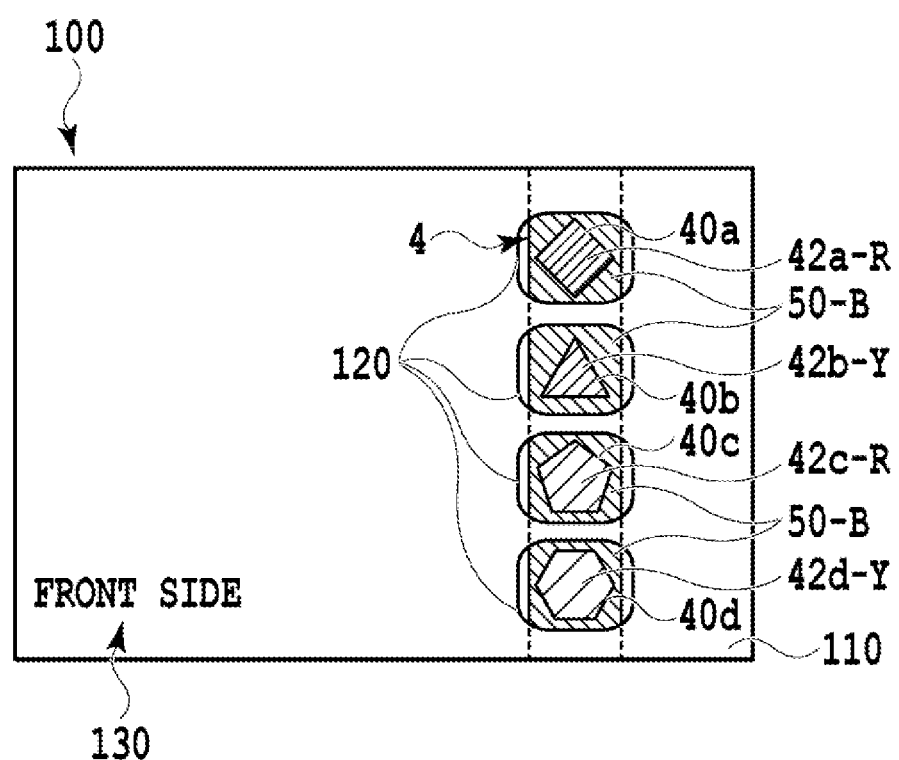
FIG. 13A is a schematic plan view showing the front side of the printed article of Example 5 which comprises a papermaking thread embedded inside an opaque substrate.

As shown in FIG. 13A, the four image parts (40a-d) separated from each other were visually observed, when the printed article (100) was observed from the front side. Two of the image parts (40a and 40c) exhibited non-silver glossy expression caused by the reflective layer (44a and 44c) consisting of aluminum metal and the red micro-protrusion/depression structure including part (42a-R and 42c-R). On the other hand, two of the image parts (40b and 40d) exhibited non-silver glossy expression caused by the reflective layer (44b and 44d) consisting of aluminum metal and the yellow micro-protrusion/depression structure including part (42b-Y and 42d-Y). The region other than the four image parts (40a-d) was observed as a nonglossy blue region caused by the blue adhesive layer (50-B). The lack of gloss was caused by absence of the reflective layer (44a-d) in the region other than the image parts (40a-d).

Figure 13B:
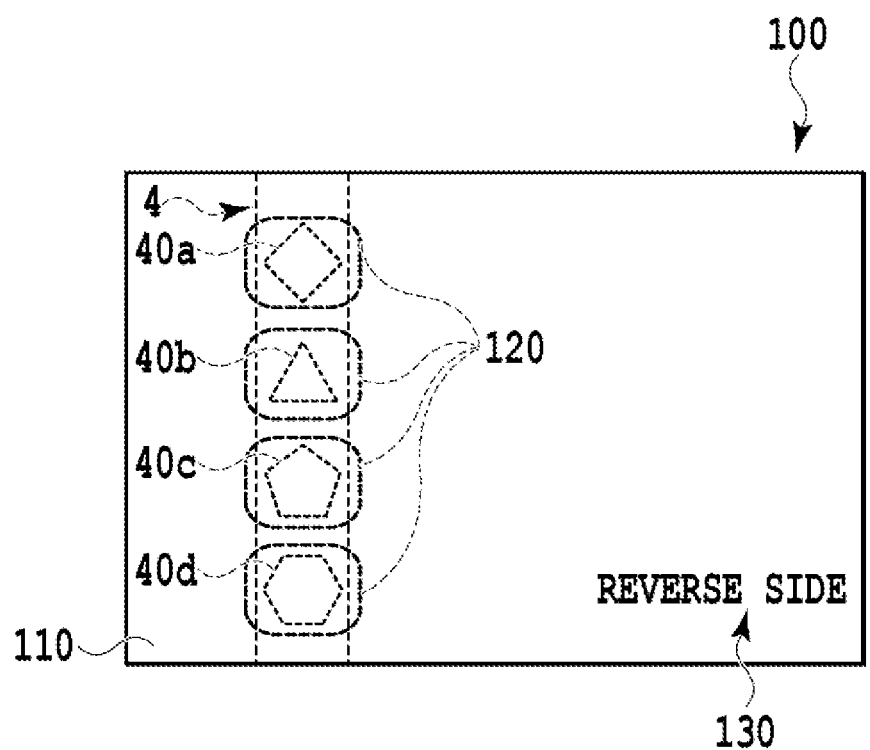
FIG. 13B is a schematic plan view showing the back side of the printed article of Example 5 which comprises a papermaking thread embedded inside an opaque substrate.

On the other hand, as shown in FIG. 13B, the four image parts (40a-d) were not visible under observation of the printed article (100) from the back side, due to opacity of the cotton receiving substrate (110). Besides, under observation of the printed article (100) from the back side with a strong light source being placed on the front side of the printed article (100), black regions at the positions corresponding to the four image parts (40a-d) were visually observed within the non-glossy blue region caused by the blue adhesive layer (50-B). This was because transmitted light was blocked by the reflective layers (44a-d), in the image parts (40a-d).

Example 6

A bonding part (30) was formed in accordance with the same procedure as Example 1.

Then, a micro-protrusion/depression structure including part (42a-Or) was formed at the predetermined position with a molding resin ink comprising urethane-based resin and an orange colorant in accordance with the same procedure as Example 1, except that a molding film (262) having an inversed shape of a diffraction grating structure.

Then, a micro-protrusion/depression structure including part (42b-Cl) was formed at the predetermined position with: the PET film on which the micro-protrusion/depression structure including part (42a-Or) had been formed; a device similar to that shown in FIG. 8 except that the bonding ink applying cylinder (255), the bonding ink pressing cylinder (256) and the bonding ink reservoir (253) were omitted; a molding film (262) having an inversed shape of a non-directional scattering structure; and a molding resin ink comprising the urethane-based resin but not containing any colorant. The micro-protrusion/depression structure including part (42b-Cl) had a different area in the top view from that of the micro-protrusion/depression structure including part (42a-Or).

Then, a micro-protrusion/depression structure including part (42c-RB) was formed at the predetermined position with a molding film (262) having an inverse shape of a directional scattering structure, and a molding resin ink (264) comprising the urethane-based resin and a reddish-brown colorant. The micro-protrusion/depression structure including part (42c-RB) had a different area in the top view from the area of both of the micro-protrusion/depression structure including part (42b-Cl) and the micro-protrusion/depression structure including part (42a-Or).

Then, an aluminum metal layer having a thickness of 55 nm was formed on the whole surface of the micro-protrusion/depression structure including part-formed laminating film (273) having three types of micro-protrusion/depression structure including parts (42a-c), in accordance with the same procedure as Example 1. Then, the micro-protrusion/depression structure including part-formed laminating film (273) was cut to obtain an intermediate product having a stripe shape in which a carrier substrate (20), the bonding part (30) and the micro-protrusion/depression structure including part (42a-c) were laminated in this order. Here, the carrier substrate (20) was the PET film having the releasing layer consisting of the acrylic-based resin, which had been used as the laminating film (252).

Subsequently, mask layers (46a-c) were formed by applying a composition comprising polyamideimide-based resin but not containing any colorant only to the positions corresponding to the micro-protrusion/depression structure including part (42a-c).

Figure 14:
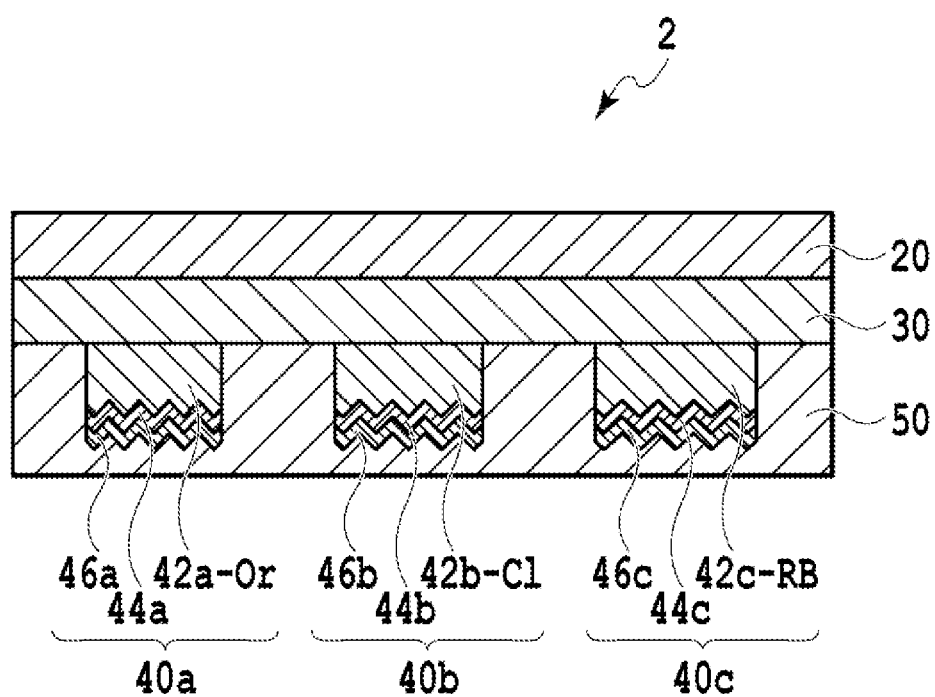
FIG. 14 is a schematic cross-sectional view showing the transfer leaf of Example 6.

Subsequently, a reflective layer (44a-c) was obtained by selective etching with the sodium hydroxide solution in which the mask layer (46a-c) was used as an etching mask, in accordance with the same procedure as Example 1. Washing, drying, and formation of the adhesive layer (50) were carried out in accordance with the same procedure as Example 1, to obtain the transfer leaf (2) of the second embodiment shown in FIG. 14. The first image part (40a) had the orange micro-protrusion/depression structure including part (42a-Or) having the diffraction grating structure on its surface. The second image part (40b) had the colorless micro-protrusion/depression structure including part (42b-Cl) having the non-directional scattering structure on its surface. The third image part (40c) had the reddish-brown micro-protrusion/depression structure including part (42c-RB) having the directional scattering structure on its surface.

Figure 15A:
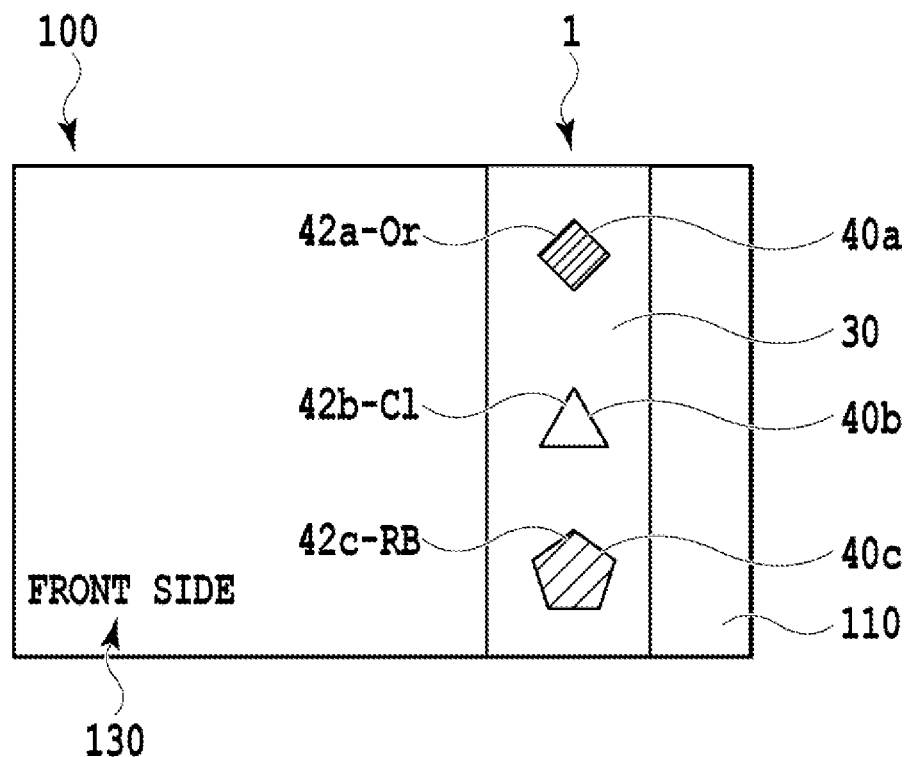
FIG. 15A is a schematic plan view showing the front side of the printed article of Example 6 which comprises an optical information medium transferred on an opaque substrate.
Figure 15B:
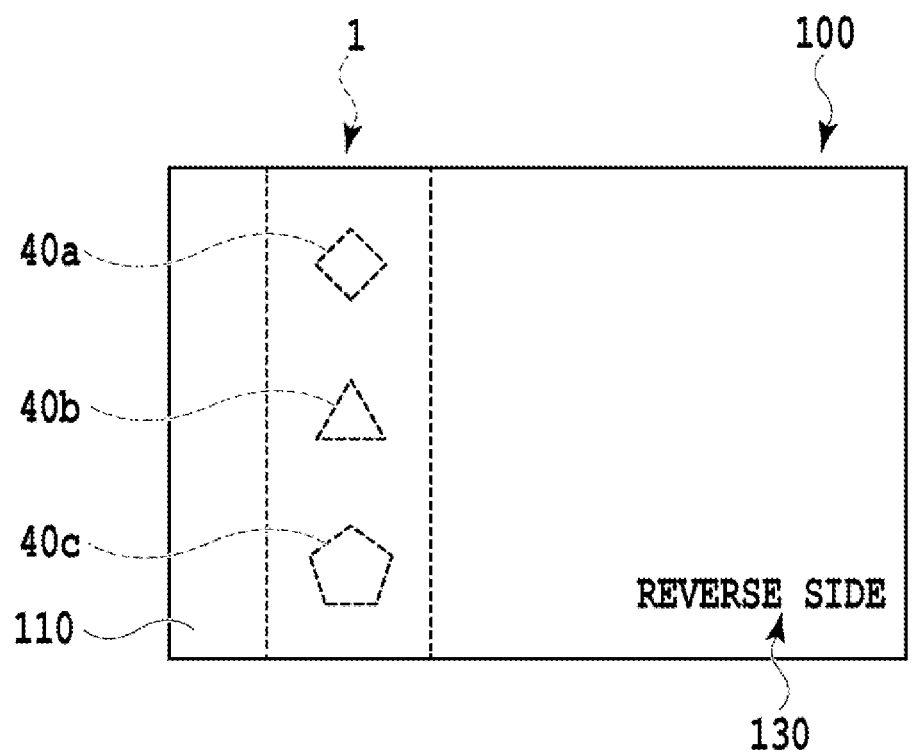
FIG. 15B is a schematic plan view showing the back side of the printed article of Example 6 which comprises an optical information medium transferred on an opaque substrate.

The resultant transfer leaf (2) was heated and pressed to an opaque cotton receiving substrate (110) having a printed part (130) in accordance with the same procedure as Example 1, followed by peel-off of the carrier substrate (20), to obtain a printed article (100) shown in FIGS. 15A and 15B. In the printed article (100), the optical information medium (1) having a stripe shape was transferred on the front surface shown in FIG. 15A.

As shown in FIG. 15A, the three image parts (40a-c) were visually observed, when the printed article (100) was observed from the front side. The first image part (40a) generally exhibited gold glossy expression and the observed hue was changed along with the change of the observation angle. This effect was caused by the diffraction grating structure of the surface of the orange micro-protrusion/depression structure including part (42a-Or). The second image part (40b) generally exhibited silver glossy expression but the intensity and hue of the reflected light were not changed even though the observation angle was changed. This effect was caused by the non-directional scattering structure of the surface of the colorless micro-protrusion/depression structure including part (42b-Cl). The third image part (40c) generally exhibited copper glossy expression but the intensity of the reflected light increased at a certain observation angle when the observation angle was changed. This effect was caused by the directional scattering structure of the surface of the reddish-brown micro-protrusion/depression structure including part (42c-RB). Further, the first to third image parts (40a-c) had different area from each other.

On the other hand, as shown in FIG. 15B, the three image parts (40a-c) were not visible under observation of the printed article (100) from the back side, due to opacity of the cotton receiving substrate (110). Besides, under observation of the printed article (100) from the back side with a strong light source being placed on the front side of the printed article (100), black regions at the positions corresponding to the four image parts (40a-d) were visually observed within the non-glossy blue region caused by the blue adhesive layer (50-B). This was because transmitted light was blocked by the reflective layers (44a-c), in the image parts (40a-c).

Comparative Example

Figure 16:
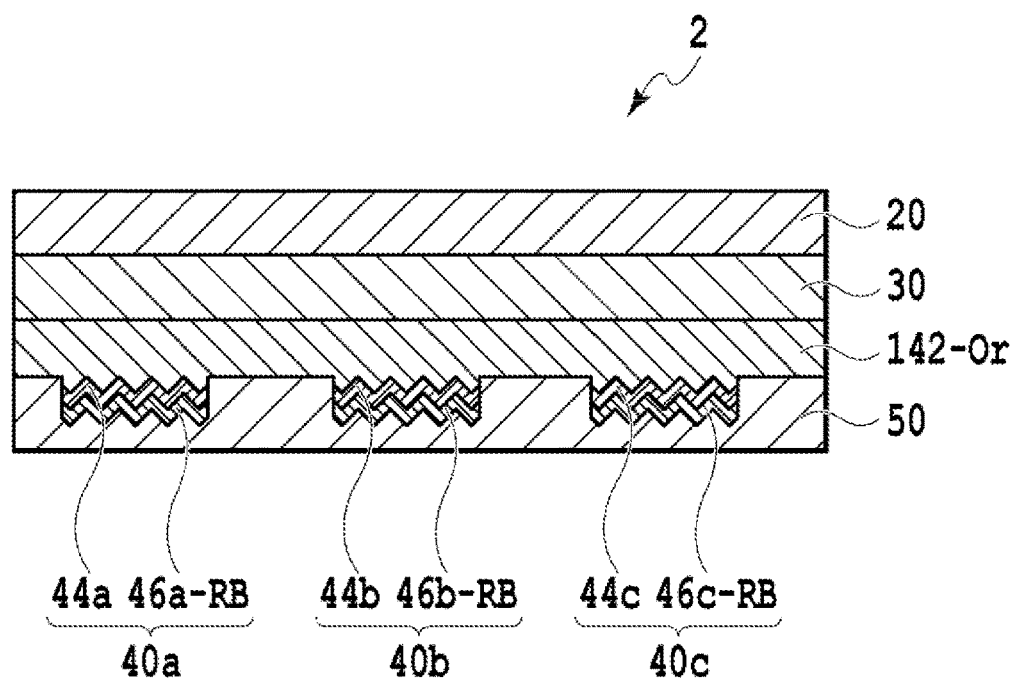
FIG. 16 is a schematic cross-sectional view showing the transfer leaf used in Comparative Example.

A PET film on which a releasing layer consisting of acrylic-based resin was coated was prepared as a carrier substrate (20). A composition comprising acrylic-based adhesive resin was coated onto the releasing layer and dried, to form a bonding part (30). A composition comprising urethane-based resin and an orange colorant was coated onto the surface of the bonding part (30) and dried, to form a resin layer. A micro-protrusion/depression structure was formed on a part of the resin layer by the "pressing method", to form an orange continuous micro-protrusion/depression structure containing layer (142-Or). An aluminum layer was formed onto the orange continuous micro-protrusion/depression structure containing layer (142-Or) by a vapor deposition method. A composition comprising polyamideimide-based resin and a reddish-brown colorant was coated at the position corresponding to the above-described micro-protrusion/depression structure and dried, to form mask layers (46a-RB, 46b-RB and 46c-RB). Then, the intermediate product was immersed into a sodium hydroxide solution to selectively etch off the reflective layer with the mask layers (46a-RB, 46b-RB and 46c-RB) as an etching mask to form patterned reflective layers 44a-c). After etching off, the intermediate product was washed with a hydrochloric acid solution and water and dried with hot air. Then, acrylic-based resin was applied onto the dried intermediate product to form an adhesive layer (50), to obtain a transfer leaf (2) shown in FIG. 16.

Figure 17A:
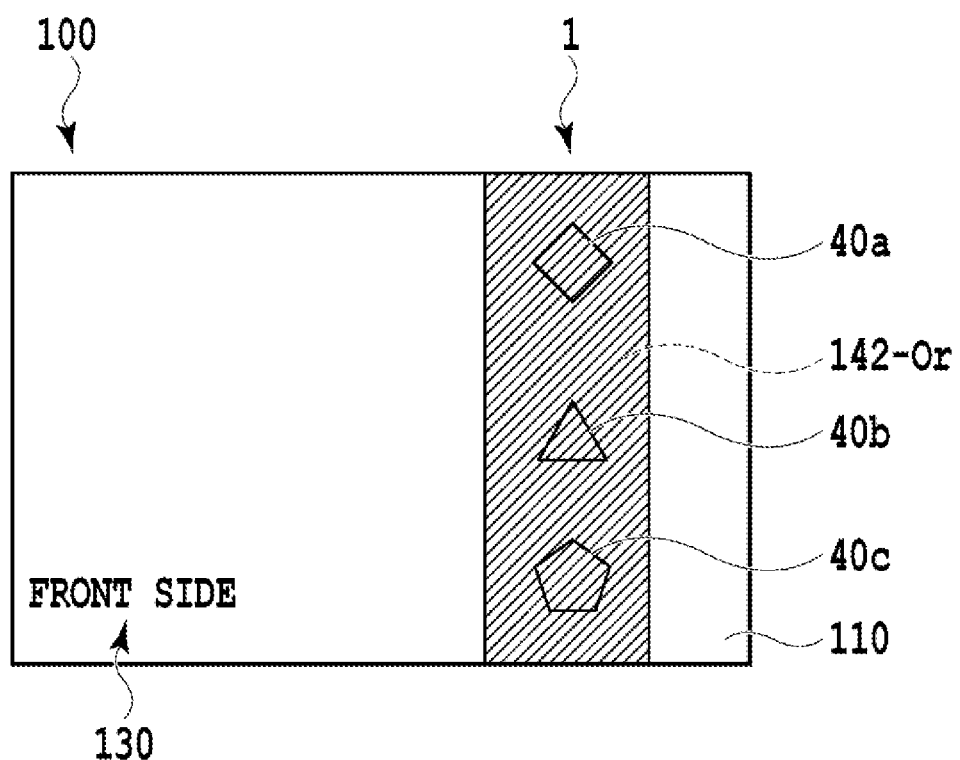
FIG. 17A is a schematic plan view showing the front side of the printed article obtained in Comparative Example.
Figure 17B:
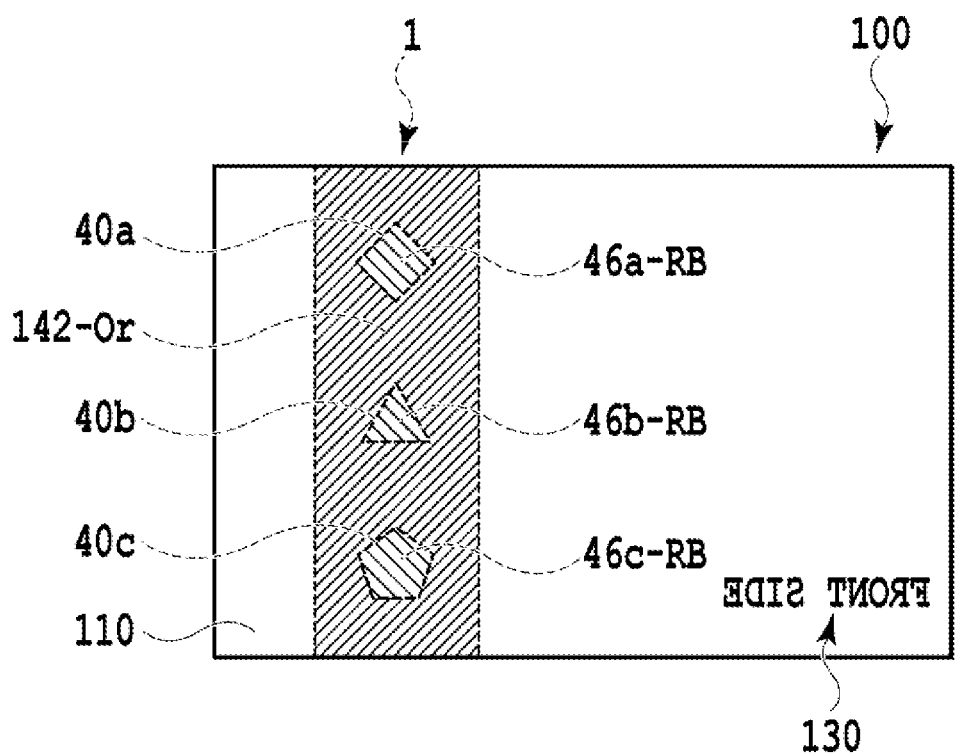
FIG. 17B is a schematic plan view showing the back side of the printed article obtained in Comparative Example.

The resultant transfer leaf (2) was heated and pressed to a transparent polypropylene receiving substrate (110) having a printed part (130), with an up-down type heat-transfer device to which a hot stamp was attached, followed by peel-off of the carrier substrate (20), to obtain a printed article (100) shown in FIGS. 17A and 17B. In the printed article (100), the optical information medium (1) having a stripe shape was transferred on the front surface shown in FIG. 17A.

As shown in FIG. 17A, the three image parts (40a-c) were visually observed, when the printed article (100) was observed from the front side. The three image parts (40a-c) exhibited gold glossy expression caused by the reflective layer (44a-d) consisting of aluminum metal and the orange micro-protrusion/depression structure including part (142-Or). However, a region other than the three image parts (40a-c) exhibited non-glossy orange. The appearance as if the reflective layer was made from gold cannot be provided, since the image parts (40a-c) having gold glossy expression was present in a non-glossy orange background.

On the other hand, as shown in FIG. 17B, the three image parts (40a-c) were visually observed through the transparent receiving substrate (110), when the printed article (100) was observed from the back side. The three image parts (40a-c) exhibited copper expression caused by the reflective layer (44a-d) consisting of aluminum metal and the reddish-brown mask layer (46a-d-RB) colored in reddish-brown color. However, a region other than the three image parts (40a-c) exhibited non-glossy orange. The appearance as if the reflective layer was made from copper cannot be provided, since the image parts (40a-c) having copper glossy expression was present in a non-glossy orange background.

Example 7

A transfer leaf (2) was obtained by repeating the procedure of Example 1, except that an unseparated single image part (40) was formed. The image part (40) of the resultant transfer leaf (2) comprised the micro-protrusion/depression structure including part comprising the urethane-based resin and the orange colorant (42-Or), the reflective layer (44) consisting of aluminum, and the mask layer comprising the polyamideimide-based resin and the reddish-brown colorant (46-RB) in this order.

Figure 18A:
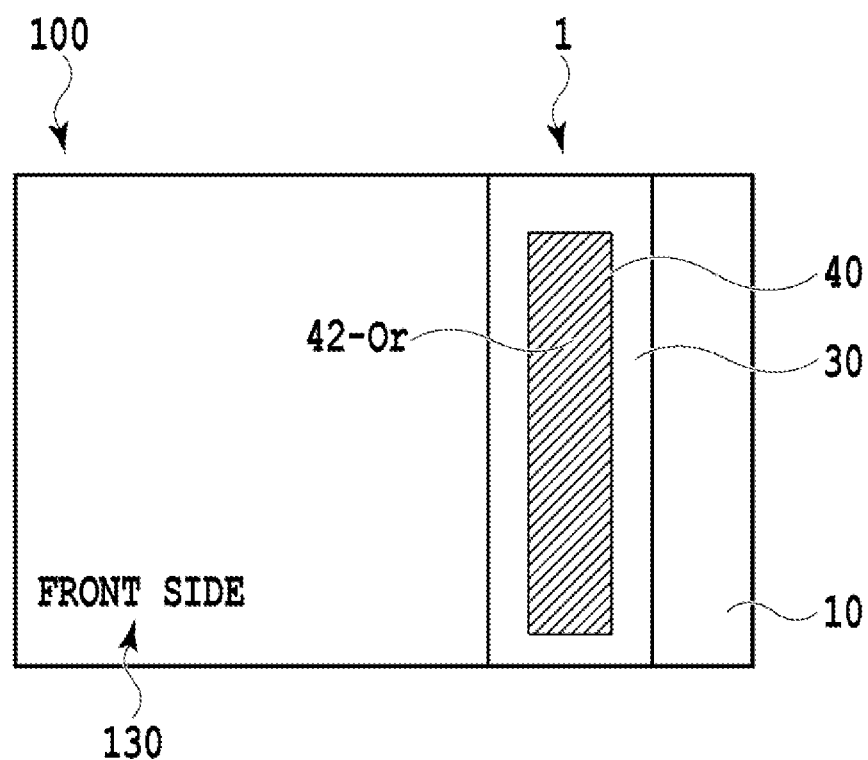
FIG. 18A is a schematic plan view showing the front side of the printed article of Example 7 which comprises an optical information medium comprising a non-separated one image part and transferred on a transparent substrate.
Figure 18B:
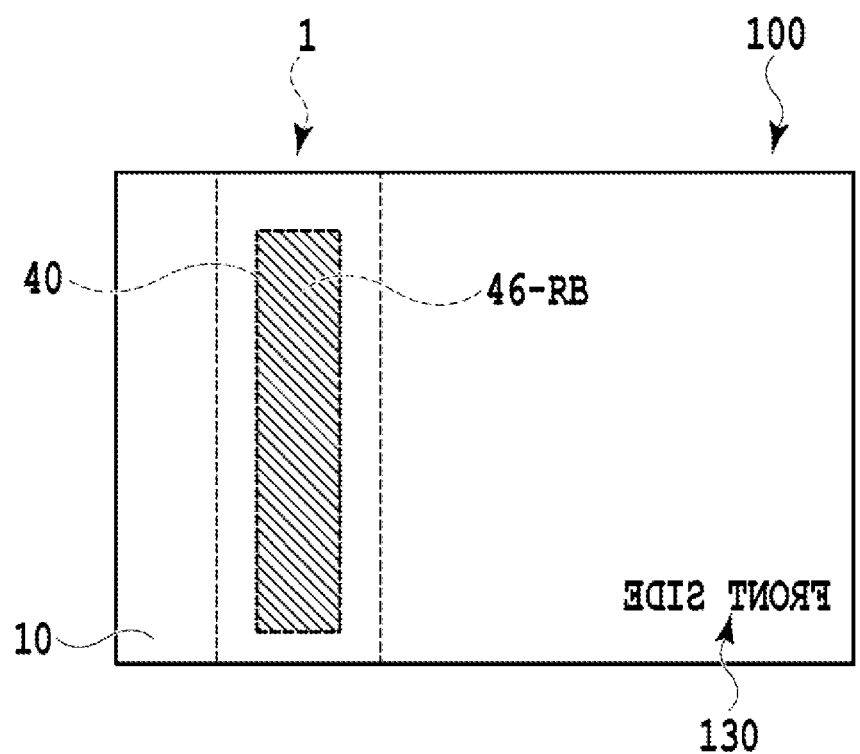
FIG. 18B is a schematic plan view showing the back side of the printed article of Example 7 which comprises an optical information medium comprising a non-separated one image part and transferred on a transparent substrate.

The resultant transfer leaf (2) was heated and pressed to a transparent polypropylene receiving substrate (110) having a printed part (130), with an up-down type heat-transfer device to which a hot stamp was attached, followed by peel-off of the carrier substrate (20), to obtain a printed article (100) shown in FIGS. 18A and 18B. In the printed article (100), the optical information medium (1) having a stripe shape was transferred on the front surface shown in FIG. 18A.

As shown in FIG. 18A, the non-separated unitary image part (40) was visually observed, when the printed article (100) was observed from the front side. The unitary image part (40) exhibited gold glossy expression caused by the reflective layer (44) consisting of aluminum metal and the orange micro-protrusion/depression structure including part (42-Or). A region other than the image part (40) was observed as a colorless and transparent region.

On the other hand, as shown in FIG. 18B, the non-separated unitary image part (40) was visually observed through the transparent receiving substrate (110), when the printed article (100) was observed from the back side. The unitary image part (40) exhibited copper glossy expression caused by the reflective layer (44) consisting of aluminum metal and the reddish-brown mask layer (46-RB). A region other than the four image parts (40a-d) was observed as a colorless and transparent region.

As described above, without the use of a single layer having an orange colored micro-structure, the optical information medium (1) and printed article (100) having the same were obtained, in which the gold glossy expression under observation from the front side and the copper glossy expression under observation from the back side were observed, both of them being contained inside the colorless and transparent region. Further, the reflective layer (44a-d) of this example had physical strength and chemical resistance comparable to the reflective layer of the prior art providing silver glossy expression, since the reflective layer is formed from aluminum metal.

Example 8

A micro-protrusion/depression structure including part (42-R) was formed on the predetermined position of the bonding part (30) in accordance with the same procedure as Example 1, except that a molding resin ink (264) comprising the urethane-based resin and a red colorant was used.

Then, a micro-protrusion/depression structure including part (42-Bl) was formed at the predetermined position with: the PET film on which the micro-protrusion/depression structure including part (42-R) had been formed; a device similar to that shown in FIG. 8 except that the bonding ink applying cylinder (255), the bonding ink pressing cylinder (256) and the bonding ink reservoir (253) were omitted; and a molding resin ink comprising the urethane-based resin and a blue colorant.

Then, a micro-protrusion/depression structure including part (42-Cl) was formed at the predetermined position, in accordance with the above-described procedure, except that a molding resin ink (264) comprising the urethane-based resin but not containing any colorant. The micro-protrusion/depression structure including parts (42-R, 42-Bl and 42-Cl) colored in respective color constituted a non-separated unitary micro-protrusion/depression structure including part (42).

Then, an aluminum metal layer having a thickness of 55 nm was formed on the whole surface of the micro-protrusion/depression structure including part-formed laminating film (273) having the micro-protrusion/depression structure including parts (42), in accordance with the same procedure as Example 1. Then, the micro-protrusion/depression structure including part-formed laminating film (273) was cut to obtain an intermediate product having a patch shape in which a carrier substrate (20), the bonding part (30) and the micro-protrusion/depression structure including part (42) were laminated in this order. Here, the carrier substrate (20) was the PET film having the releasing layer consisting of the acrylic-based resin, which had been used as the laminating film (252).

A mask layer (46-Pi) was formed by applying a composition comprising polyamideimide-based resin and a pink colorant only to the predetermined position.

A mask layer (46-Cy) was formed by applying a composition comprising the polyamideimide-based resin and a cyan colorant only to the predetermined position, in accordance with the above-described procedure. Subsequently, a mask layer (46-Cl) was formed by applying a composition comprising the polyamideimide-based resin but not containing any colorant only to the predetermined position. The mask layers (46-Pi, 46-Cy and 46-Cl) colored in respective color constituted a non-separated unitary mask layer (46). The mask layer (46) was positioned above the micro-protrusion/depression structure including part (42), and has the same shape as the micro-protrusion/depression structure including part (42).

Subsequently, a reflective layer (44) was obtained by selective etching with the sodium hydroxide solution in which the mask layer (46) was used as an etching mask, in accordance with the same procedure as Example 1. The micro-protrusion/depression structure including part (42), the reflective layer (44), and the mask layer (46) which were obtained as described above constituted a non-separated unitary image part (40). Then, washing, drying, and formation of the adhesive layer (50) were carried out in accordance with the same procedure as Example 1, to form a transfer leaf (2) of the second embodiment.

The image part (40) had the micro-protrusion/depression structure including part (42-R, 42-Bl, and 42-Cl) having two differently colored regions and one colorless region, the aluminum reflective layer (44), and the mask layer (46-Pi, 46-Cy, and 46-Cl) having two differently colored regions and one colorless region. Besides, only the colorless adhesive layer (50) was present in a region other than the image part (40).

Figure 19A:
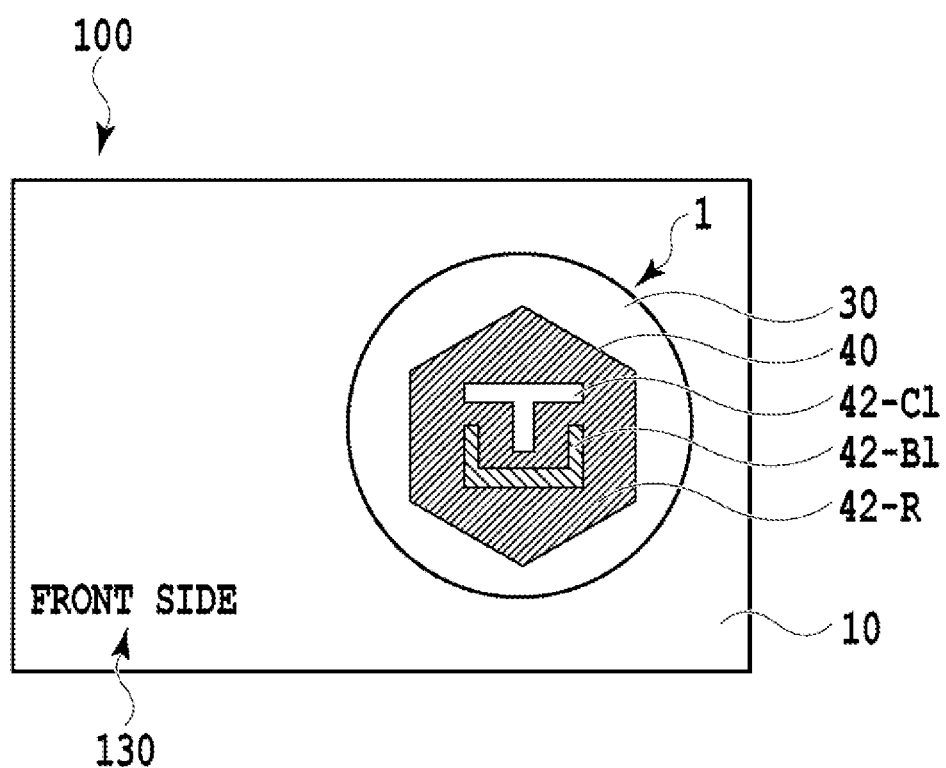
FIG. 19A is a schematic plan view showing the front side of the printed article of Example 8 which comprises an optical information medium comprising a non-separated one image part and transferred on a transparent substrate.
Figure 19B:
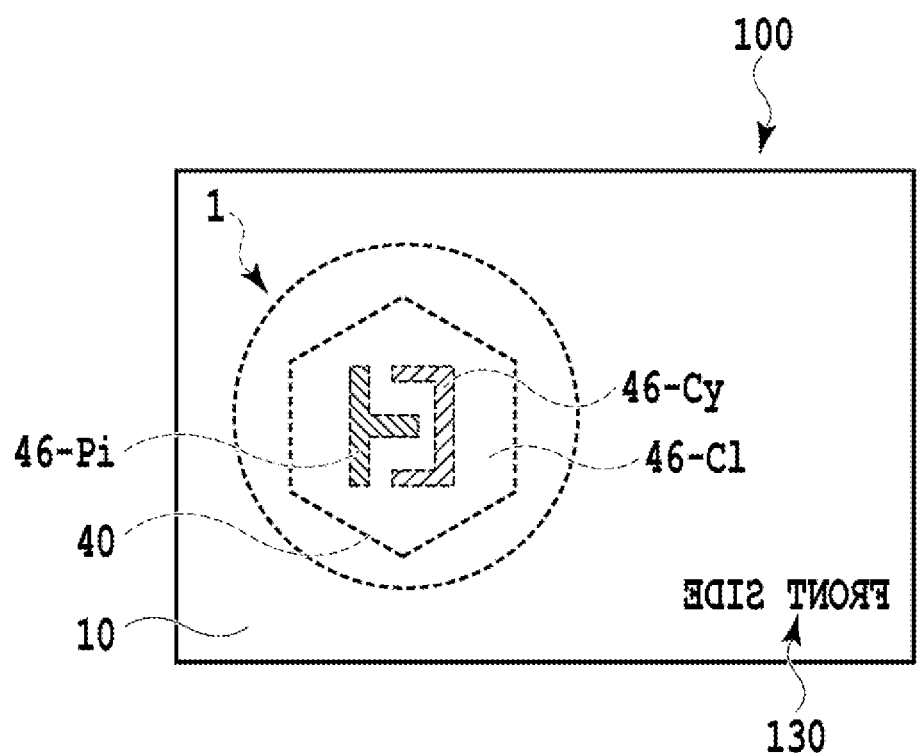
FIG. 19B is a schematic plan view showing the back side of the printed article of Example 8 which comprises an optical information medium comprising a non-separated one image part and transferred on a transparent substrate.

The resultant transfer leaf (2) was heated and pressed to a transparent polypropylene receiving substrate (110) having a printed part (130) in accordance with the same procedure as Example 1, followed by peel-off of the carrier substrate (20), to obtain a printed article (100) shown in FIGS. 19A and 19B. In the printed article (100), the optical information medium (1) having a patch shape was transferred on the front surface shown in FIG. 19A.

As shown in FIG. 19A, the non-separated unitary image part (40) was visually observed, when the printed article (100) was observed from the front side. The image part (40) exhibited multi-colored glossy expression caused by the reflective layer (44) consisting of aluminum metal and the multi-colored micro-protrusion/depression structure including part (42), and silver glossy expression in the region where the colorless micro-protrusion/depression structure including part (42-Cl) was provided. A region other than the image part (40) was observed as a colorless and transparent region. As described above, the present invention can provide an image having the conventional silver glossy expression and differently colored glossy expression.

As shown in FIG. 19B, the non-separated unitary image part (40) was visually observed through the transparent receiving substrate (110), when the printed article (100) was observed from the back side. The image part (40) exhibited multi-colored glossy expression caused by the reflective layer (44) consisting of aluminum metal and the multi-colored mask layer (46), and silver glossy expression in the region where the colorless mask layer (46-Cl) was provided. A region other than the image part (40) was observed as a colorless and transparent region. As described above, the present invention can provide an image having the conventional silver glossy expression and differently colored glossy expression, also under observation from the back side.

As described above, without the use of a single layer having a single-colored micro-structure, the optical information medium (1) and printed article (100) having the same were obtained, in which multi-color glossy expression including silver under observation from the front side and multi-color glossy expression including silver under observation from the back side were observed, both of them being contained inside the colorless and transparent region. Further, the reflective layer (44a-d) of this example had physical strength and chemical resistance comparable to the reflective layer of the prior art providing silver glossy expression, since the reflective layer is formed from aluminum metal.

Example 9

A micro-protrusion/depression structure including parts (42-Bl) was formed on the predetermined position of the bonding part (30) by using a molding resin ink (264) comprising the urethane-based resin and a blue colorant, in accordance with the same procedure as Example 2.

Then, a micro-protrusion/depression structure including part (42-Y) was formed at the predetermined position with a molding resin ink comprising the urethane-based resin and a yellow colorant, in accordance with the same procedure as Example 2. A micro-protrusion/depression structure including part (42-Cl) was formed at the predetermined position, with a molding resin ink (264) comprising the urethane-based resin but not containing any colorant, in accordance with the same procedure as Example 3. The micro-protrusion/depression structure including parts (42-Bl, 42-Y and 42-Cl) colored in respective color constituted a non-separated unitary micro-protrusion/depression structure including part (42).

Then, an aluminum metal layer having a thickness of 55 nm was formed on the whole surface of the micro-protrusion/depression structure including part-formed laminating film (273) having the micro-protrusion/depression structure including parts (42), in accordance with the same procedure as Example 2. Then, the micro-protrusion/depression structure including part-formed laminating film (273) was cut to obtain an intermediate product having a patch shape in which a carrier substrate (20), the bonding part (30) and the micro-protrusion/depression structure including part (42) were laminated in this order. Here, the carrier substrate (20) was the PET film not having the releasing layer consisting of acrylic-based resin, which had been used as the laminating film (252).

Then, a mask layer (46-Pi) was formed by applying a composition comprising polyamideimide-based resin and a pink colorant only to the predetermined position. A mask layer (46-Cy) was formed by applying a composition comprising the polyamideimide-based resin and a cyan colorant only to the predetermined position, in accordance with the above-described procedure. Further, a mask layer (46-Cl) was formed by applying a composition comprising the polyamideimide-based resin but not containing any colorant only to the predetermined position. The mask layers (46-Pi, 46-Cy and 46-Cl) colored in respective color constituted a non-separated unitary mask layer (46). The mask layer (46) was positioned above the micro-protrusion/depression structure including part (42), and has the same shape as the micro-protrusion/depression structure including part (42).

Subsequently, a reflective layer (44) was obtained by selective etching with the sodium hydroxide solution in which the mask layer (46) was used as an etching mask, in accordance with the same procedure as Example 2. The micro-protrusion/depression structure including part (42), the reflective layer (44), and the mask layer (46) which were obtained as described above constituted a non-separated unitary image part (40). Then, washing, drying, formation of the adhesive layer (50), and adhesion of the removable substrate (60) were carried out in accordance with the same procedure as Example 2, to form a label (3) of the third embodiment.

The image part (40) had the micro-protrusion/depression structure including part (42-R, 42-Bl, and 42-Cl) having two differently colored regions and one colorless region, the aluminum reflective layer (44), and the mask layer (46-Pi, 46-Cy, and 46-Cl) having two differently colored regions and one colorless region. Besides, only the colorless adhesive layer (50) was present in a region other than the image part (40).

Figure 20A:
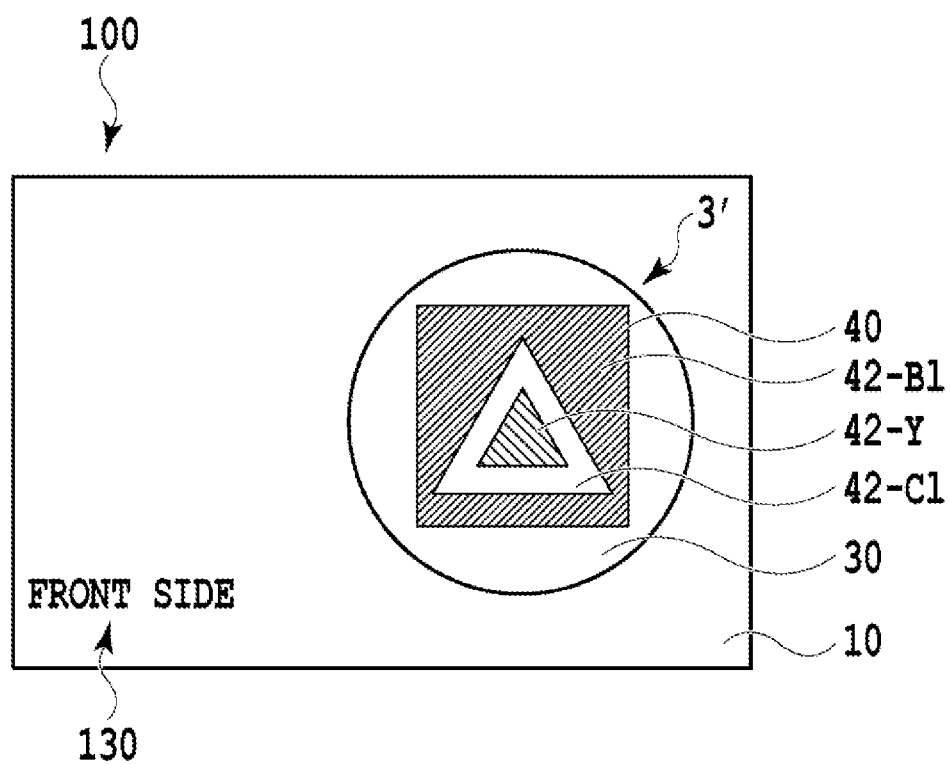
FIG. 20A is a schematic plan view showing the front side of the printed article of Example 9 which comprises a label comprising a non-separated one image part and transferred on a transparent substrate.
Figure 20B:
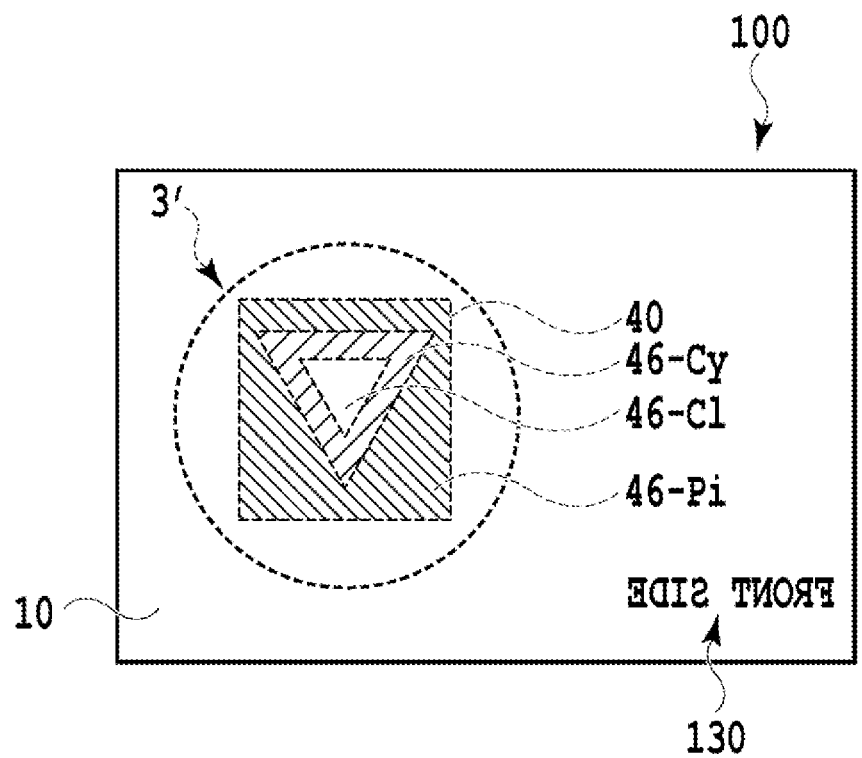
FIG. 20B is a schematic plan view showing the back side of the printed article of Example 9 which comprises a label comprising a non-separated one image part and transferred on a transparent substrate.

The removable substrate (60) of the resultant label (3) was removed, followed by adhesion to a transparent PET receiving substrate (110) having a printed part (130), to obtain a printed article (100) shown in FIGS. 20A and 20B. In the printed article (100), the label body (3') having a patch shape was adhered on the front side surface shown in FIG. 20A.

As shown in FIG. 20A, the non-separated one image part (40) was visually observed, when the printed article (100) was observed from the front side. The image part (40) exhibited multi-colored glossy expression caused by the reflective layer (44) consisting of aluminum metal and the multi-colored micro-protrusion/depression structure including part (42), and silver glossy expression in the region where the colorless micro-protrusion/depression structure including part (42-Cl) was provided. A region other than the image part (40) was observed as a colorless and transparent region. As described above, the present invention can provide an image having an internal area exhibiting one or more color within a peripheral area exhibiting one color.

On the other hand, as shown in FIG. 20B, the non-separated one image part (40) was visually observed through the transparent receiving substrate (110), when the printed article (100) was observed from the back side. The image part (40) exhibited multi-colored glossy expression caused by the reflective layer (44) consisting of aluminum metal and the multi-colored mask layer (46), and silver glossy expression in the region where the colorless mask layer (46-Cl) was provided. A region other than the image part (40) was observed as a colorless and transparent region. As described above, the present invention can provide an image having the conventional silver glossy expression and differently colored glossy expression, also under observation from the back side.

Example 10

A micro-protrusion/depression structure including parts (42-R) was formed on the predetermined position of the bonding part (30) by using a molding resin ink (264) comprising the urethane-based resin and a red colorant, in accordance with the same procedure as Example 2.

Then, a micro-protrusion/depression structure including part (42-Y) was formed at the predetermined position with a molding resin ink comprising the urethane-based resin and a yellow colorant, in accordance with the same procedure as Example 2. The micro-protrusion/depression structure including parts (42-R and 42-Y) colored in respective color constituted a non-separated unitary micro-protrusion/depression structure including part (42).

Then, an aluminum metal layer having a thickness of 55 nm was formed on the whole surface of the micro-protrusion/depression structure including part-formed laminating film (273) having the micro-protrusion/depression structure including parts (42), in accordance with the same procedure as Example 2. Then, the micro-protrusion/depression structure including part-formed laminating film (273) was cut to obtain an intermediate product having a patch shape in which a carrier substrate (20), the bonding part (30) and the micro-protrusion/depression structure including part (42) were laminated in this order. Here, the carrier substrate (20) was the PET film not having the releasing layer consisting of acrylic-based resin, which had been used as the laminating film (252).

Then, a non-separated unitary mask layer (46) was formed by applying a composition comprising polyamideimide-based resin but not containing any colorant only to the predetermined position. The mask layer (46) was positioned above the micro-protrusion/depression structure including part (42), and has the same shape as the micro-protrusion/depression structure including part (42).

Subsequently, a reflective layer (44) was obtained by selective etching with the sodium hydroxide solution in which the mask layer (46) was used as an etching mask, in accordance with the same procedure as Example 2. The micro-protrusion/depression structure including part structure including part (42), the reflective layer (44), and the mask layer (46) which were obtained as described above constituted a non-separated unitary image part (40). Then, washing and drying were carried out in accordance with the same procedure as Example 2.

A composition comprising acrylic-based resin and a blue colorant was applied onto the whole surface of the side of the image part (40) of the intermediate product after drying, to form a blue adhesive layer (50-B). Then, a composition comprising the acrylic-based resin but not containing any colorant was applied onto the whole surface of the side of the carrier substrate (20) of the intermediate product to form a carrier-substrate-side adhesive layer (70), to obtain a papermaking thread (4) of the fourth embodiment.

The resultant papermaking thread (4) was embedded into a cotton dispersion, to produce a laminated body of the fifth embodiment which comprises the papermaking thread (4) in a cotton receiving substrate (110). Here, the front surface of the cotton receiving substrate (110) had receiving substrate windows (120*a-c*) for exposing parts of the image part (40) of the papermaking thread (4). Printed parts (130) were formed by printing onto the front and back surfaces of the laminated body (cotton receiving substrate (110)), to obtain a printed article (100) of the sixth embodiment.

Figure 21A:
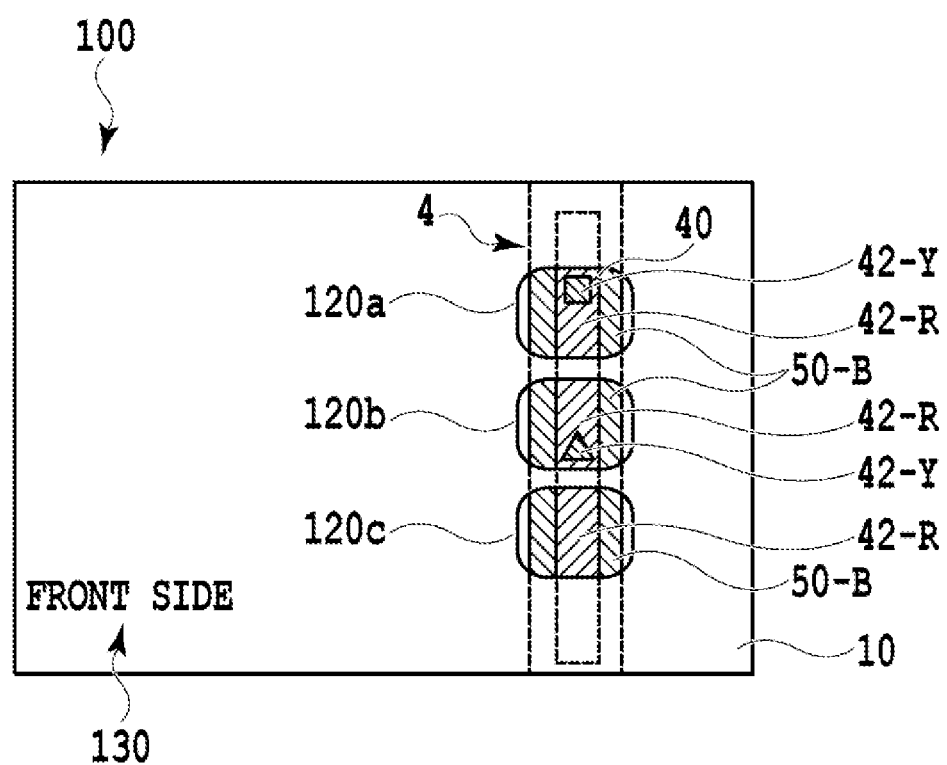
FIG. 21A is a schematic plan view showing the front side of the printed article of Example 10 which comprises a papermaking thread comprising a non-separated one image part and embedded inside an opaque substrate.

As shown in FIG. 21A, the non-separated one image part (40) was visually observed through the receiving substrate window (120), when the printed article (100) was observed from the front side. In the first and second receiving substrate windows (120*a* and 120*b*), the image part (40) was observed with non-silver glossy expression caused by the reflective layer (44) consisting of aluminum metal and the two differently colored micro-protrusion/depression structure including parts (42-R and 42-Y). On the other hand, in the third receiving substrate window (120*c*), the image part (40) was observed with non-silver glossy expression caused by the reflective layer (44) consisting of aluminum metal and the micro-protrusion/depression structure including part (42-R) colored in red color. In addition, in all of the receiving substrate windows (120*a-c*), a region other than the image part (40) was observed as a non-glossy blue region caused by the blue adhesive layer (50-B). The lack of gloss was caused by absence of the reflective layer (44) in the region other than the image part (40).

Figure 21B:
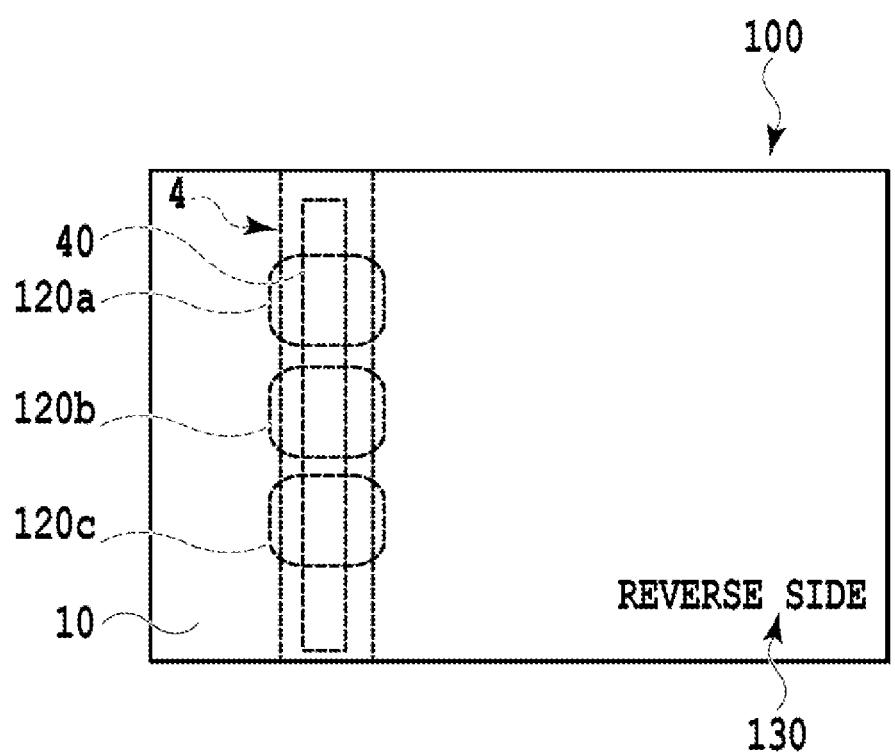
FIG. 21B is a schematic plan view showing the back side of the printed article of Example 10 which comprises a papermaking thread comprising a non-separated one image part and embedded inside an opaque substrate.

On the other hand, as shown in FIG. 21B, the image part (40) was not visible under observation of the printed article (100) from the back side, due to opacity of the cotton receiving substrate (110). Besides, under observation of the printed article (100) from the back side with a strong light source being placed on the front side of the printed article (100), black regions at the positions corresponding to the image part (40) was visually observed within the non-glossy blue region caused by the blue adhesive layer (50-B). This was because transmitted light was blocked by the reflective layer (44) in the image part (40).

Example 11

A bonding part (30) was formed in accordance with the same procedure as Example 1. Then, a micro-protrusion/depression structure including part (42-Or) was formed from a molding resin ink (264) comprising the urethane-based resin and an orange colorant at the predetermined position, in accordance with the same procedure as Example 1, except that a molding film (262) having an inversed shape of a diffraction grating structure was used.

Then, a micro-protrusion/depression structure including part (42-Cl) was formed at the predetermined position with: the PET film on which the micro-protrusion/depression structure including part (42-Or) had been formed; a device similar to that shown in FIG. 8 except that the bonding ink applying cylinder (255), the bonding ink pressing cylinder (256) and the bonding ink reservoir (253) were omitted; a molding film (262) having an inversed shape of a non-directional scattering structure; and a molding resin ink comprising the urethane-based resin but not containing any colorant. The micro-protrusion/depression structure including part (42-Cl) had a different area in the top view from that of the micro-protrusion/depression structure including part (42-Or).

Then, a micro-protrusion/depression structure including part (42-RB) was formed at the predetermined position with a molding film (262) having an inverse shape of a directional scattering structure, and a molding resin ink (264) comprising the urethane-based resin and a reddish-brown colorant. The micro-protrusion/depression structure including part (42-RB) had a different area in the top view from the area of both of the micro-protrusion/depression structure including part (42-Cl) and the micro-protrusion/depression structure including part (42-Or). The micro-protrusion/depression structure including parts of the respective color (42-Or, 42-RB and 42-Cl) constituted a non-separated unitary micro-protrusion/depression structure including part (42).

Then, an aluminum metal layer having a thickness of 55 nm was formed on the whole surface of the micro-protrusion/depression structure including part-formed laminating film (273) having the micro-protrusion/depression structure including parts (42), in accordance with the same procedure as Example 1. Then, the micro-protrusion/depression structure including part-formed laminating film (273) was cut to obtain an intermediate product having a stripe shape in which a carrier substrate (20), the bonding part (30) and the micro-protrusion/depression structure including part (42) were laminated in this order. Here, the carrier substrate (20) was the PET film having the releasing layer consisting of the acrylic resin, which had been used as the laminating film (252).

Then, a non-separated unitary mask layer (46) was formed by applying a composition comprising polyamideimide-based resin but not containing any colorant to the predetermined position. The mask layer (46) was positioned above the micro-protrusion/depression structure including part (42), and has the same shape as the micro-protrusion/depression structure including part (42).

Subsequently, a reflective layer (44) was obtained by selective etching with the sodium hydroxide solution in which the mask layer (46) was used as an etching mask, in accordance with the same procedure as Example 1. The micro-protrusion/depression structure including part (42), the reflective layer (44), and the mask layer (46) which were obtained as described above constituted a non-separated unitary image part (40). Then, washing, drying and formation of the adhesive layer (50) were carried out in accordance with the same procedure as Example 1, to form a transfer leaf (2) of the second embodiment shown in FIG. 14. The image part (40) had the orange micro-protrusion/depression structure including part (42-Or) having the diffraction grating structure on its surface, the colorless micro-protrusion/depression structure including part (42-Cl) having the non-directional scattering structure on its surface, and the reddish-brown micro-protrusion/depression structure including part (42-BR) having the directional scattering structure on its surface.

Figure 22A:
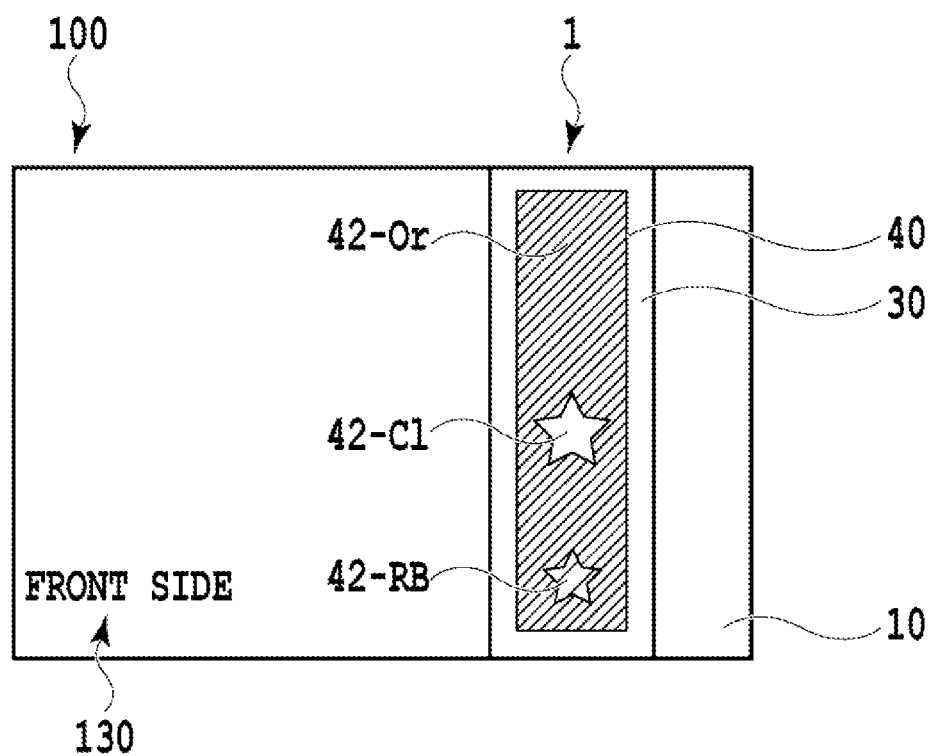
FIG. 22A is a schematic plan view showing the front side of the printed article of Example 11 which comprises an optical information medium comprising a non-separated one image part and transferred on an opaque substrate.
Figure 22B:
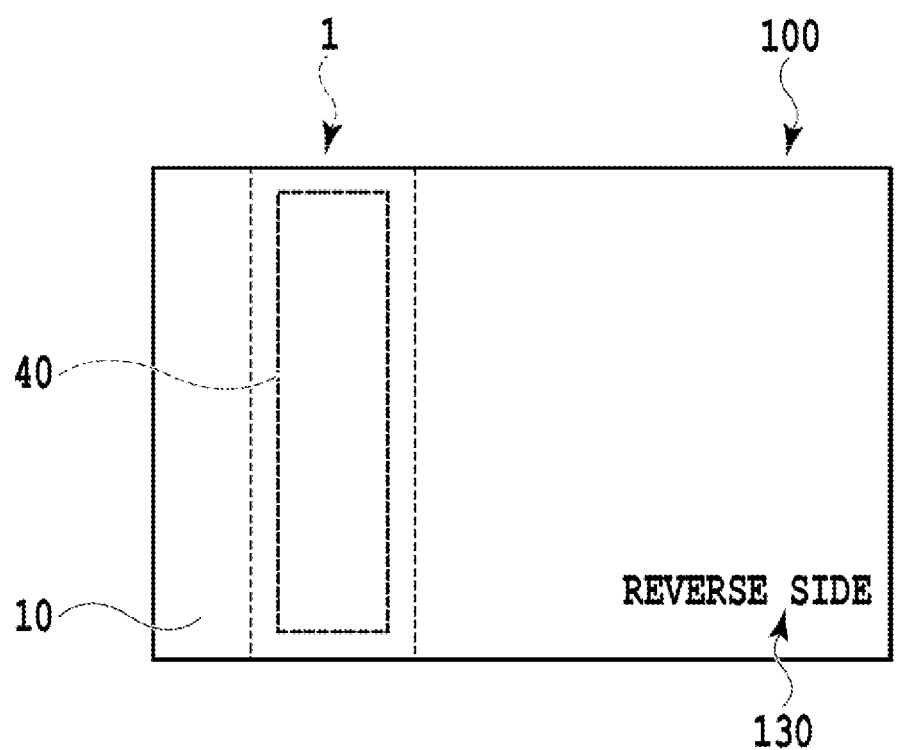
FIG. 22B is a schematic plan view showing the back side of the printed article of Example 11 which comprises an optical information medium comprising a non-separated one image part and transferred on an opaque substrate.

The resultant transfer leaf (2) was heated and pressed to an opaque cotton receiving substrate (110) having a printed part (130) in accordance with the same procedure as Example 1, followed by peel-off of the carrier substrate (20), to obtain a printed article (100) shown in FIGS. 22A and 22B. In the printed article (100), the optical information medium (1) having a patch shape was transferred on the front surface shown in FIG. 22A.

As shown in FIG. 22A, the non-separated one image part (40) was visually observed, when the printed article (100) was observed from the front side. The region of the image part (40) in which the orange micro-protrusion/depression structure including part (42-Or) had been formed generally exhibited gold glossy expression and the observed hue was changed along with the change of the observation angle. This effect was caused by the diffraction grating structure of the surface of the orange micro-protrusion/depression structure including part (42-Or). The region of the image part (40) in which the colorless micro-protrusion/depression structure including part (42-Cl) had been formed generally exhibited silver glossy expression but the intensity and hue of the reflected light were not changed even though the observation angle was changed. This effect was caused by the non-directional scattering structure of the surface of the colorless micro-protrusion/depression structure including part (42-Cl). The region of the image part (40) in which the reddish-brown micro-protrusion/depression structure including part (42-RB) had been formed generally exhibited copper glossy expression but the intensity of the reflected light increased at a certain observation angle when the observation angle was changed. This effect was caused by the directional scattering structure of the surface of the reddish-brown micro-protrusion/depression structure including part (42-RB). Further, the above-described three regions had different area from each other.

On the other hand, as shown in FIG. 22B, the image part (40) was not visible under observation of the printed article (100) from the back side, due to opacity of the cotton receiving substrate (110). Besides, under observation of the printed article (100) from the back side with a strong light source being placed on the front side of the printed article (100), a black region at the position corresponding to the image part (40) was visually observed. This was because transmitted light was blocked by the reflective layers (44), in the image part (40). The black regions observable under these conditions also had different area from each other.

REFERENCE SIGNS LIST

1 Optical information medium
2 Transfer leaf
3 Label
3' Label body
4 Papermaking thread
20 Carrier substrate
30 Bonding part (Receiving layer)
40(a,b,c,d) Image part
  42(a,b,c,d) Micro-protrusion/depression structure including part
  44(a,b,c,d) Reflective layer
  46(a,b,c,d) Mask layer
50 Adhesive layer (Protective layer)
60 Removable substrate (Peel sheet)
70 Carrier-substrate-side adhesive layer (Second adhesive layer)
100 Printed article
110 Receiving substrate
120(a,b,c) Receiving substrate window
130 Printed part
142 Continuous micro-protrusion/depression structure containing layer
250 Producing machine
251 Laminating film-winding roll
252 Laminating film
253 Bonding ink reservoir
254 Bonding ink
255 Bonding ink applying cylinder
256 Bonding ink pressing cylinder
257 Bonding-part-formed laminating film
258 Bonding ink drying part
262 Molding film
263 Molding resin ink reservoir
264 Molding resin ink
265 Molding resin ink applying cylinder
266 Molding resin ink pressing cylinder
267 Micro-protrusion/depression structure including part-forming molding film
268 Molding resin ink curing part
271 Micro-protrusion/depression structure including part-laminating cylinder
272 Laminating film peeling part
273 Micro-protrusion/depression structure including part-transferred bonding-part-formed laminating film
274 Lamination film winding roll
-Cl Colorless (Clear)
-Or Orange
-RB Reddish-brown
-R Red
-Bl Blue
-Y Yellow
-G Green
-Pi Pink
-Cy Cyan
-Br Brown
-M Magenta

The invention claimed is:

1. An optical information medium comprising, in this order:
a bonding part, the bonding part being colorless;
at least one image part; and
an adhesive layer covering the at least one image part, wherein:
each image part comprises a micro-protrusion/depression structure including part comprising a micro-protrusion/depression structure on at least a part of a surface opposite to the bonding part, a reflective layer, and a mask layer, in the order from the bonding part to the adhesive layer;
the micro-protrusion/depression structure including part is colorless or colored in one or more translucent or opaque colors, and
the micro-protrusion/depression structure including part of at least one image part is colored in one or more translucent or opaque colors with a colorant.

2. The optical information medium according to claim 1, wherein the at least one image part is a non-separated unitary image part.

3. The optical information medium according to claim 1, comprising two or more image parts, wherein at least one image part is separated from at least one other image part.

4. The optical information medium according to claim 1, wherein the micro-protrusion/depression structure including part is colorless or colored in one color, in each image part.

5. The optical information medium according to claim 1, wherein the micro-protrusion/depression structure including part is colored in two or more colors, in at least one image part.

6. The optical information medium according to claim 1, wherein the micro-protrusion/depression structure including part comprises a peripheral area colored in one color, and an internal area surrounded by the peripheral area and colored in one or more colors different from the color of the peripheral area, in at least one image part.

7. The optical information medium according to claim 1, comprising two or more image parts, wherein the micro-protrusion/depression structure including part in one image part is colored in a color different from a color of the micro-protrusion/depression structure including part in at least one other image part.

8. The optical information medium according to claim 1, wherein the mask layer is colorless or colored in one or more colors, in each image part.

9. The optical information medium according to claim 8, comprising two or more image parts, wherein the mask layer in one image part is colored in a color different from a color of the mask layer in at least one other image part.

10. The optical information medium according to claim 8, wherein the mask layer is colored in two or more colors, in at least one image part.

11. The optical information medium according to claim 8, wherein the mask layer comprises a peripheral area colored in one color, and an internal area surrounded by the peripheral area and colored in one or more colors different from the color of the peripheral area, in at least one image part.

12. The optical information medium according to claim 1, wherein the adhesive layer is colored in one or more translucent or opaque colors.

13. The optical information medium according to claim 3, wherein at least two of the image parts have different areas.

14. The optical information medium according to claim 1, comprising two or more image parts, wherein the micro-protrusion/depression structure of the micro-protrusion/depression structure including part in one image part is different from the micro-protrusion/depression structure of the micro-protrusion/depression structure including part in at least one other image part.

15. A transfer leaf comprising:
the optical information medium according to claim 1; and
a carrier substrate which is in contact with the bonding part;
wherein the carrier substrate is peelable at an interface between the bonding part and the carrier substrate.

16. A label comprising:
the optical information medium according to claim 1; and
a removable substrate being in contact with the adhesive layer;
wherein the adhesive layer has tackiness, and the removable substrate is peelable at an interface between the adhesive layer and the removable substrate.

17. A papermaking thread comprising:
the optical information medium according to claim 1;
a carrier substrate which is in contact with the bonding part; and
a second adhesive layer that is in contact with the carrier substrate.

18. A laminated body comprising a substrate and the optical information medium according to claim 1 that is attached to the substrate.

19. A printed article comprising:
a substrate comprising a printed part to which a printing ink is adhered;
and the optical information medium according to claim 1 that is attached to the substrate.

20. The optical information medium according to claim 1, wherein the adhesive layer is colorless.

* * * * *